(12) United States Patent
Hirakawa et al.

(10) Patent No.: US 8,761,504 B2
(45) Date of Patent: Jun. 24, 2014

(54) SPATIO-SPECTRAL SAMPLING PARADIGM FOR IMAGING AND A NOVEL COLOR FILTER ARRAY DESIGN

(75) Inventors: Keigo Hirakawa, Cambridge, MA (US); Patrick J. Wolfe, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1417 days.

(21) Appl. No.: 12/516,908

(22) PCT Filed: Nov. 29, 2007

(86) PCT No.: PCT/US2007/085946
§ 371 (c)(1),
(2), (4) Date: Dec. 7, 2009

(87) PCT Pub. No.: WO2008/067472
PCT Pub. Date: Jun. 5, 2008

(65) Prior Publication Data
US 2010/0085452 A1    Apr. 8, 2010

Related U.S. Application Data

(60) Provisional application No. 60/861,718, filed on Nov. 29, 2006.

(51) Int. Cl.
*G06K 9/00* (2006.01)
*G03F 3/08* (2006.01)
*H04N 3/14* (2006.01)
*H04N 5/335* (2011.01)
*H04N 9/04* (2006.01)

(52) U.S. Cl.
USPC ............ 382/167; 348/273; 382/162; 358/518

(58) Field of Classification Search
USPC ................... 348/220.1, 230.1, 234, 241, 285; 382/254, 277, 280, 162
See application file for complete search history.

(56) References Cited

U.S. PATENT DOCUMENTS

| 3,971,065 A | 7/1976 | Bayer |
| 4,054,906 A | 10/1977 | Yamanaka |

(Continued)

FOREIGN PATENT DOCUMENTS

EP    1289310 A2    3/2003

OTHER PUBLICATIONS

R. Kimmel, "Demosaicing: Image reconstruction from color ccd samples," IEEE Trans. Image Processing, vol. 8, pp. 1221-1228, Sep. 1999. 32 SIngle-Sensor Imaging: Methods and Applications for Digital Cameras.

(Continued)

*Primary Examiner* — Michelle Entezari
(74) *Attorney, Agent, or Firm* — Lando & Anastasi LLP

(57) ABSTRACT

Presented are new alternatives to the Bayer pattern for spatial subsampling in color imaging. One aspect relates to a new design paradigm for spatio-spectral sampling The proposed scheme offers the potential to significantly reduce hardware complexity in a wide variety of applications, while at the same time improving output color image quality. In some embodiments, a framework for CFA design in presented. In one embodiment the physical characteristics of the CFA are generated so that the spectral radii of luminance and chrominance channels are maximized. The physical characteristics of CFA design are constrained to require physically realizable CFA(s). Alternatively, certain physical characteristics can be emphasized to generate easier to manufacture CFA(s). By reinterpreting the interactions between the stimuli, display CFA, and CSF in terms of amplitude modulation, an alternative CFA coding scheme that modulates the chrominance signals to a higher frequency relative to common schemes is provided in some embodiments.

15 Claims, 29 Drawing Sheets

(56) References Cited

U.S. PATENT DOCUMENTS

| | | | |
|---|---|---|---|
| 4,104,679 A * | 8/1978 | Kitamura et al. | 348/237 |
| 4,642,678 A | 2/1987 | Cok | |
| 4,683,490 A * | 7/1987 | Strolle et al. | 348/609 |
| 5,148,278 A * | 9/1992 | Wischermann | 348/609 |
| 5,280,347 A * | 1/1994 | Shiraishi et al. | 348/223.1 |
| 5,357,352 A * | 10/1994 | Eschbach | 358/518 |
| 6,005,582 A * | 12/1999 | Gabriel et al. | 345/586 |
| 6,577,341 B1 * | 6/2003 | Yamada et al. | 348/272 |
| 6,895,121 B2 | 5/2005 | Joshi et al. | |
| 7,120,305 B2 | 10/2006 | Berkner | |
| 7,391,901 B2 | 6/2008 | de Queiroz et al. | |
| 8,107,123 B2 * | 1/2012 | Ono et al. | 358/1.9 |
| 2004/0165097 A1 * | 8/2004 | Drowley et al. | 348/340 |
| 2005/0122291 A1 * | 6/2005 | May | 345/83 |
| 2005/0244068 A1 | 11/2005 | Nakachi et al. | |
| 2006/0088207 A1 | 4/2006 | Schneiderman | |
| 2006/0098869 A1 * | 5/2006 | Chen | 382/167 |
| 2006/0181618 A1 * | 8/2006 | Kameyama | 348/234 |
| 2007/0009176 A1 | 1/2007 | Lim et al. | |
| 2007/0058050 A1 * | 3/2007 | Innocent | 348/222.1 |
| 2007/0064151 A1 * | 3/2007 | Chang et al. | 348/470 |
| 2007/0153019 A1 * | 7/2007 | Nakasone et al. | 345/589 |
| 2007/0229863 A1 * | 10/2007 | Ono et al. | 358/1.9 |
| 2008/0166064 A1 | 7/2008 | Fu | |
| 2010/0092082 A1 | 4/2010 | Hirakawa et al. | |

OTHER PUBLICATIONS

R. Lukac, K. N. Plataniotis, D. Hatzinakos, and M. Aleksic, "A novel cost effective demosaicing approach", IEEE Trans. Consum. Electron., vol. 50. pp. 256-261, Feb. 2004.

R. Lukac and K. N. Platanoitis, "Normalized color-ratio modeling for cfa interpolation," IEEE Trans. Consum. Electroln., vol. 50, pp. 737-745, May 2004.

E. Dubois, "Filter design for adaptive frequency-domain bayer demosaicking," in Proc. Int. Conf. Image Processing, 2006.

M. J. T. Smith and T. P. B. III,, "A procedure for designing exact reconstruction filter banks for tree structured subband coders," in Proc. Int. Conf. Acoustics, Speech, SIgnal Processing, (San Diego, CA) pp. 27. 1.1-27. 1.4. Mar. 1984.

G. J. McLachelan and T. Krishnan, The EM Algorithm and Extentions. John Wiley & Sons, Inc. 1997.

Hirakawa K et al: "Joint demosaicing and denoising" IEEE Transacations on image processing USA, vol. 15, No. 8, Aug. 2006, pp. 2146-2157, XP002469895 ISSN: 1057-7149 p. 2148, right-hand column section IV figure 5.

Ping Wah Wong et al: "image processing considerations for digital photography" COMCON'97 Proceedings, IEEE San Jose, CA, USA, Los Alamitos, CA, USA, IEEE Comput. Soc, US, Feb. 23, 1997, pp. 280-285, XP010219550 ISBN: 0-8186-7804-6 figure 2.

Rajeev Ramanath, Wesley E. Snyder, : "Adaptive Demosaicking" Journal of Electronic Imaging, SPIE/IS & T, US, vol. 12, No. 4, Oct. 2003, pp. 633-642, XP001178696 ISSN: 1017-9909 abstract section 7.

Parulski K A: "Color Filters and Processing Alternatives for One-Chip Cameras" Aug. 1, 1985.

Lidan Miao et al: "The Design and Evaluation of a Generic Method for Generating Mosaicked Multispectal Filter Arrays"; vol. 15, No. 9, Sep. 2006.

Wei Zhu et al: "Color filter arrays based on mutually exclusive blue noise patterns": Journal of Visual Communicaiton and Image Representation Academic Press USA,vol. 10, No. 3, Sep. 1999.

Chen et al., Color Filter Array Demosaicking using Wavelet-Based Subband Synthesis, School of Electronic Engineering, IEEE, 2005, pp. 1-4.

Hirakawa et al. Adaptive Honogeneity-Directed Demosiacing Algorithm, IEEE Transactions of Image Processing, vol. 14, No. 3, Mar. 2005, pp. 360-369.

Chang et al., Spatially Adaptive Wavelet Thresholding with Context Modeling for Image Denoising, IEEE Transactions of Image Processing, vol. 9, No. 9, Sep. 2000 pp. 1522-1531.

Hirakawa et al. An Empirical Bayes Em-Wavelet Unification for Simulanteous Denoising, Interpolation, and/or Demosaicing, IEEE, pp. 1453-1456, 2006.

Hirakawa et al. A Framework Forwavelet-Based Analysis and Processing of Color Filter Array Imageswith Applications to Denoising and Demosaicing, IEEE, pp. 597-600, 2007.

Zhang et al. Lossless Compression of Color Mosaic Images, IEEE Transactions on Image Processing, vol. 15, No. 6, 1379-1388, Jun. 2000.

B.K. Gunturk, Y. Altunbasak, and R.M. Mersereau, "Color plane interpolation using alternating projections," IEEE Trans. Image Processing, vol. 11, No. 9, pp. 997-1013, Sep. 2002.

X. Zhang and B.A. Wandell, "A spatial extension of CIELAB for digital color image reproduction," in Soc. Inform. Display Symp. Tech. Dig., vol. 27, 1996, pp. 731-734.

Adapting to Unknown Smoothness via Wavelet Shrinkage via Wavelet Shrinkage Author(s): David L. Donoho and Iain M. Johnstone, Jul. 20, 1994.

B. K. Gunturk, J. Glotzbach, Y. Altunbasak, R. W. Schafter, and R.M. Mersereau, "Demosaicking: Color filter array interpolation in single chip digital cameras." IEEE Signal Processing Magazine, vol. 22, No. 1, pp. 44-54, Jan. 2005.

J. Portilla, V. Strela, M. J. Wainwright, and E. P. Simoncelli, "Imanage denoising using scale mixture of Gaussians in the wavelet domain." IEEE Trans. Imanage Processing, vol. 12, No. 11, pp. 1338-1351. Nov. 2003.

S. B. Chang, B. Yu, and M. Vetterli, "Spatially adaptive wavelet thresholding with context modeling for image denoising," IEEE Trans. Image Processing, vol. 9, No. 9, pp. 1522-1531, 2000.

R. Lukac and K. N. Plataniotis, "Color filter arrays: Design and performance analysis:" IEEE Trans. on Consumer Electronics, vol. 51, pp. 1260-1267, Nov. 2005.

K. Parulski and K. E. Spaulding, Digital Color Imaging Handbook, ch. Color image processing for digital cameras pp. 728-757. CRC Press. Boca Raton, FL 2002.

M. Parmar and S. J. Reeves, "A perceptually based design methodology for color filter arrays," in Proc. IEEE Int. Con Acoustics, Speech, and Signal Processing, vol. 3, pp. 473-476, May 2004.

K. Hirakawa and T. W. Parks, "Adaptive homogeneity-directed demosaicing algorithm," IEEE Trans. Image Processing, vol. 14, pp. 360-369, Mar. 2005.

B. K. Gunturk, Y. Altunbasak, and R. M. Mersereau, "Color plane interpolation using alternating projections". IEEE Trans. Image Processing, vol. 11, pp. 997-1013, Published Sep. 1, 2011.

X.Wu and N. Zhang,"Primary-consistant soft-decision color demosaicking for digital cameras," IEEE Trans. Image Processing, vol. 13, pp. 1263-1274, Sep. 2004.

B. K. Gunturk, J. Glotzbach, Y. Altunbasak, R. W. Schafer, and R. M. Mersereau, "Demosaicking" Color filter array interpolation in single chip digital cameras, IEEE Signal Processing Magainze (Special Issue on Color Image Processing), vol. 22, pp. 44-54, Jan. 2005.

R. Lukac and K. N. Plataneotis, "Universal demosaicking for imaging pipelines with an rgb color filter array ." Pattern Recognition, vol. 38, pp. 2208-2212, Nov. 2005.

D. Alleysson, S. Susstrunk, and J. Herault, "Linear demosaicing inspired by the human visual system," IEEE Trans, Image Processing, vol. 14, pp. 439-449, Apr. 2005.

L. Chang and Y. P. Tang, "Effective use of spatial and spectral correlations for color filter array demosaicking." IEEE Trans. Consum. Electron., vol. 50, pp. 355-365, May 2004.

R. Kakarala and A. Baharav, "Adaptive demosaicing with the principal vector method,"IEEE Trans. Consum. Electron, vol. 48, pp. 932-937, Nov. 2002. 29 30 Single-Sensor Imaging: Methods and Applications for Digital Cameras.

D. D. Muresan and T. W. Parks, Demosaicing using optmal recovery, :IEEE Trans. Image Processing, vol. 14, pp. 267-278. Feb. 2005.

R. J. Guttosch, "Investigation of color aliasing of high spatial frequencies and edges for bayer-pattern sensors and foveon x3 direct image sensor," tech. rep. Foveon, San Antonio, USA, 2002.

P. M. Hubel, J. Liu, and R. J. Guttosh, "Spatial frequency response of color image sensors: Bayer color filters and foveon X3" tech. rep., Foveon, San Antonio, USA, 2002.

(56) References Cited

OTHER PUBLICATIONS

M. S. Crouse R. D. Nowak, and R. G> Baranuik, "Bayesian tree-structured image modeling using waveletdomain hidden markov models,"IEEE Trans. Image Processing, vol. 46, pp. 1056-1068, Jul. 1998.

D. L. Donoho and I. M. Johnstone, "Ideal spatial adaption via wavelet shrinkage," Biometrik, vol. 81, pp. 425-455, 1994.

M. Jansen and A. Bultheel, "Empirical bayes approach to improve wavelet thresholding for image noise reduction." J. Amer, Statist. Assoc., vol. 96, pp. 629-639, Jun. 2001.

I. M. Johnstone and B. W. Silverman, "Wavelet threshold estimators for data with correlated noise," J. Roy. Statist. Soc. B, vol. 58, pp. 319-351, 1997.

J. Portilla, V. Strela, M. J. Wainwright, and E. P. Simoncelli, "Image denoising using scale mixture of gaussians in the wavelet domain," Tech. Rep. TR2002-831, Comput. Sci. Dept., Courant Instr. Math. Sci., New York Univ., 2002.

A. Pizurica, W. Philips, I. Lemahieu, and M. Acheroy, "A joint interand intrascale statistical model for bayesian wavelet based denoising."IEEE Trans. Image Processing, vol. 11, pp. 545-557, May 2002.

L. Sendur and I. W. Selesnick, "Bivarate shrinkage functions for wavelet-based denoising exploiting interscale dependency,"IEEE Trans. Signal Processing, vol. 50, pp. 2744-2756, Nov. 2002.

L. Sendur and I. W. Selesnick, "Bivariate shrinkage with local variance estimation,"IEEE Signal Process. Lett., vol. 9, pp. 438-441, Dec. 2002.

J. L. Starck, D. L. Donoho and E. Cande, "Veryhigh quality image restoration," Statistic Dept Stanford University, 2001.

C. Tomasi and R. Manduchi, "Bilateral filtering for gray and color images," in Proc. Int. Conf. Computer Vision, Jan. 1998.

G. Hua and M. T. Orchard, "A new interpretation of translation invariant denoising," inProc. Int. Conf. Acoustics, Speech, Signal Processing, 2004.

X. Li and M. T. Orchard, "Spatially adaptive image denoising under overcomplete expansion," in Proc. Int. Conf. Image Process., Sep. 2000.

D. D. Muresan and T. W. Parks, "Adaptive principal components and image denoising," in Proc. Int. Conf. Image; 2003.

K. Hirakawa and T. W. Parks, "Image denoising for signal-dependent noise," IEEE Trans. Image Processing, vol. 15. 2005.

D. D. Muresan and T. W. Parks, "Adaptively quadratic (aqua) image interpolation," IEEE Trans. Image Processing, vol. 13, pp. 690-698, May 2004.

H. Tian, B. Fowler, and A. E. Gamal, "Analysis of temporal noise in cmos photodiode active pixel sensor," IEEE J. Solid State Circuits, vol. 36. Jan. 2001.

G. E. Healey and R. Kondepudy, "Radiometric ccd camera calibraiton and noise estimation," IEEE Trans. Pattern Anal. Mach. Intell., vol. 16. Mar. 1994.

R. Ding and A. N. Venetsanopoulos, "Generalized homomorphic and adaptive order statistic filters for the removal of impulsive and signal-dependent noise," IEEE Trans. CIrcuits Syst., vol. 34., 1990.

A. V. Oppenheim, R. W. Schafer, and J. R. Buck, Discrete-Time Signal Processing. Prentice-Hall, 2nd ed., 1999.

P. Fryzlewicz and G. P. Nason, "A haar-fisz algorithm for poisson intensity estimation," J. Comput. raph. Stat., vol. 13, pp. 621-638, 20004.

P. Fryzlewicz and G. P. Nason, "Smoothing the wavelet periodogram using the haar-fisz transform," Scientific Charge, University of Bristol UK 2003.

M. Raphan and E. P. Simoncelli, Advances in Neural Information Processing System, vol. 19, ch. Learning to be Bayesian without Supervision. Cambridge, MA; MIT PRess, 2007.

K. Hirakawa, "Signal-dependent noise characterization in wavelets domain," in Proc. SPIE Optics & Photonics, 2007.

\* cited by examiner

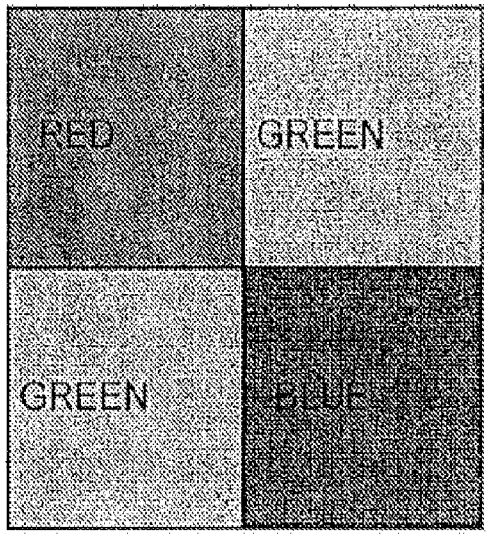 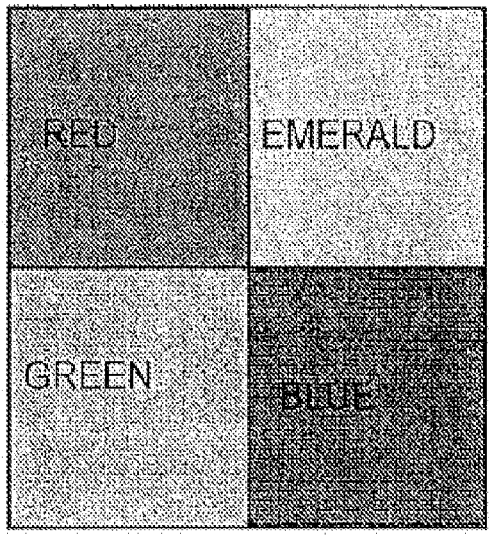
FIGURE 1A　　　　　　　　FIGURE 1B
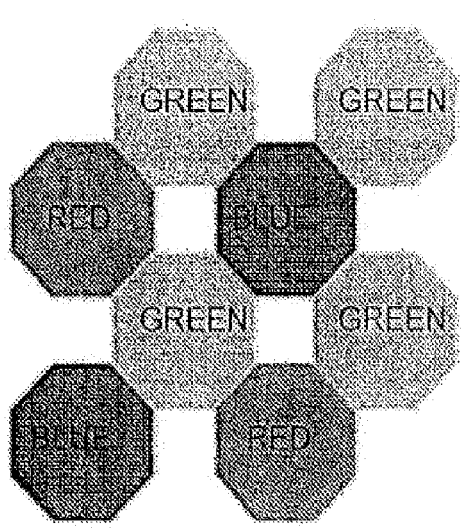 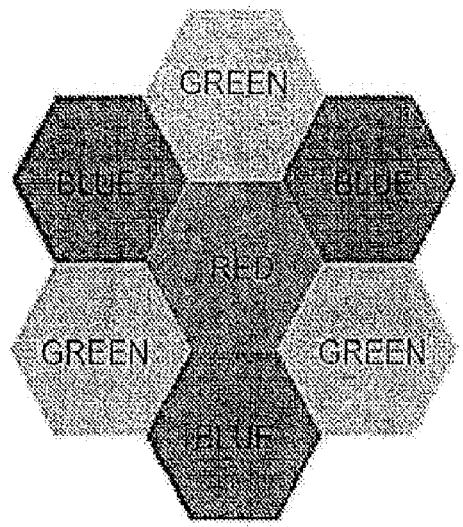
FIGURE 1C　　　　　　　　FIGURE 1D

| pattern | | $\mathcal{F}(c_r), \mathcal{F}(c_b), \mathcal{F}(c_e)$ |
|---|---|---|
| A | red $c_r$ | $\frac{1}{3}\delta(\omega) + \frac{1+i}{12}\delta\left(\omega - \left[\begin{array}{c}\pi\\\frac{\pi}{2}\end{array}\right]\right) + \frac{1-i}{12}\delta\left(\omega + \left[\begin{array}{c}\pi\\\frac{\pi}{2}\end{array}\right]\right) + \frac{2}{3}\delta\left(\omega - \left[\begin{array}{c}\pi\\\pi\end{array}\right]\right)$ |
| | blue $c_b$ | $\frac{1}{3}\delta(\omega) + \frac{1+i}{12}\delta\left(\omega - \left[\begin{array}{c}\pi\\\frac{\pi}{2}\end{array}\right]\right) + \frac{1-i}{12}\delta\left(\omega + \left[\begin{array}{c}\pi\\\frac{\pi}{2}\end{array}\right]\right) + \frac{-2}{3}\delta\left(\omega - \left[\begin{array}{c}\pi\\\pi\end{array}\right]\right)$ |
| B | red $c_r$ | $\frac{1}{4}\delta(\omega) + \frac{3}{4}\delta\left(\omega - \left[\begin{array}{c}\pi\\\pi\end{array}\right]\right)$ |
| | blue $c_b$ | $\frac{1}{4}\delta(\omega) + \frac{1+i}{16}\delta\left(\omega - \left[\begin{array}{c}\pi\\\frac{\pi}{2}\end{array}\right]\right) + \frac{1-i}{16}\delta\left(\omega + \left[\begin{array}{c}\pi\\\frac{\pi}{2}\end{array}\right]\right) + \frac{1+i}{16}\delta\left(\omega - \left[\begin{array}{c}\frac{\pi}{2}\\\pi\end{array}\right]\right) + \frac{1-i}{16}\delta\left(\omega + \left[\begin{array}{c}\frac{\pi}{2}\\\pi\end{array}\right]\right)$ |
| C | red $c_r$ | $\frac{1}{4}\delta(\omega) + \frac{1+i}{8}\delta\left(\omega - \left[\begin{array}{c}\pi\\\frac{\pi}{2}\end{array}\right]\right) + \frac{1-i}{8}\delta\left(\omega + \left[\begin{array}{c}\pi\\\frac{\pi}{2}\end{array}\right]\right)$ |
| | blue $c_b$ | $\frac{3}{16}\delta(\omega) + \frac{-3+3i}{32}\delta\left(\omega - \left[\begin{array}{c}\pi\\\frac{\pi}{2}\end{array}\right]\right) + \frac{-3-3i}{32}\delta\left(\omega + \left[\begin{array}{c}\pi\\\frac{\pi}{2}\end{array}\right]\right)$ |
| | emerald $c_e$ | $\frac{1}{8}\delta(\omega) + \frac{1}{8}\delta\left(\omega - \left[\begin{array}{c}\pi\\\pi\end{array}\right]\right)$ |
| D | red $c_r$ | $\frac{1}{4}\delta(\omega) + \frac{1+i}{12}\delta\left(\omega - \left[\begin{array}{c}\pi\\\frac{2\pi}{3}\end{array}\right]\right) + \frac{1-i}{12}\delta\left(\omega + \left[\begin{array}{c}\pi\\\frac{2\pi}{3}\end{array}\right]\right)$ |
| | blue $c_b$ | $\frac{1}{4}\delta(\omega) + \frac{1}{4}\delta\left(\omega - \left[\begin{array}{c}\pi\\\pi\end{array}\right]\right)$ |
| E | red $c_r$ | $\frac{15}{64}\delta(\omega) + \frac{5+5i}{64}\delta\left(\omega - \left[\begin{array}{c}\pi\\\frac{\pi}{2}\end{array}\right]\right) + \frac{5-5i}{64}\delta\left(\omega + \left[\begin{array}{c}\pi\\\frac{\pi}{2}\end{array}\right]\right)$ |
| | blue $c_b$ | $\frac{15}{64}\delta(\omega) + \frac{5+5i}{64}\delta\left(\omega - \left[\begin{array}{c}\frac{\pi}{2}\\\pi\end{array}\right]\right) + \frac{5-5i}{64}\delta\left(\omega + \left[\begin{array}{c}\frac{\pi}{2}\\\pi\end{array}\right]\right)$ |

Figure 8

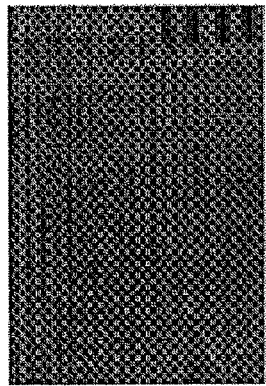 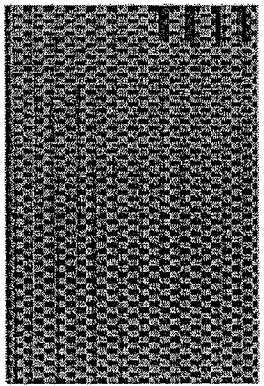 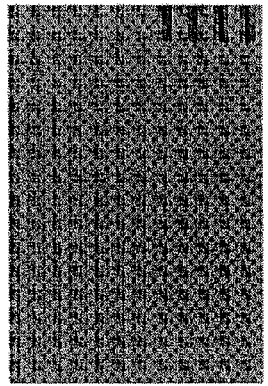 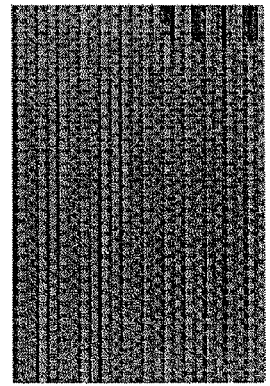
Figure 13A　　　Figure 13B　　　Figure 13C　　　Figure 13D
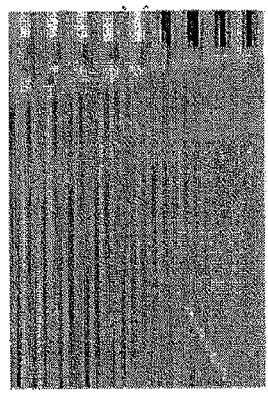 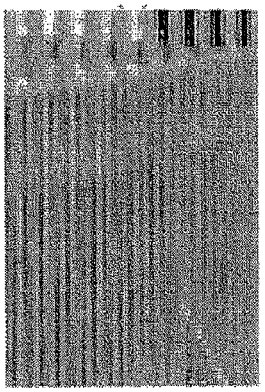 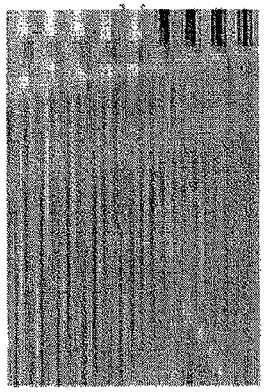 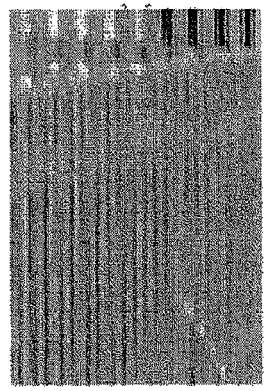
Figure 13E　　　Figure 13F　　　Figure 13G　　　Figure 13H

| image | Bayer | | Pattern A proposed | Pattern B proposed | Pattern C proposed |
|---|---|---|---|---|---|
| 1 | 13.59 | 20.02 | 9.3262 | 17.9506 | 19.6171 |
| 2 | 7.49 | 8.10 | 5.8692 | 8.2709 | 9.2622 |
| 3 | 12.09 | 18.63 | 13.4979 | 20.4537 | 29.7958 |
| 4 | 9.45 | 11.50 | 6.6399 | 14.3754 | 13.2623 |
| 5 | 4.68 | 5.77 | 3.6606 | 5.1850 | 5.5792 |
| 6 | 19.54 | 27.31 | 14.4529 | 24.6665 | 30.4732 |
| 7 | 4.54 | 5.26 | 4.0673 | 5.7308 | 6.7822 |
| 8 | 4.35 | 5.65 | 3.7239 | 6.5402 | 6.4160 |
| 9 | 8.02 | 11.56 | 7.2327 | 12.5793 | 13.8868 |
| 10 | 3.99 | 4.42 | 2.8811 | 4.3553 | 4.8860 |
| 11 | 24.06 | 47.72 | 27.7857 | 53.8778 | 55.5902 |
| 12 | 8.79 | 10.47 | 6.6009 | 10.2672 | 11.2129 |
| 13 | 4.62 | 4.67 | 2.7030 | 6.0534 | 4.7299 |
| 14 | 5.20 | 7.79 | 5.8353 | 8.5982 | 11.4003 |
| 15 | 13.22 | 23.64 | 14.3943 | 24.2219 | 25.9760 |
| 16 | 7.04 | 9.56 | 6.0567 | 9.1946 | 12.2654 |
| 17 | 5.93 | 8.11 | 5.7605 | 8.9453 | 11.1579 |
| 18 | 8.80 | 14.47 | 7.4515 | 14.2018 | 13.9137 |
| 19 | 11.03 | 15.18 | 8.9686 | 12.5316 | 14.1510 |
| 20 | 23.03 | 32.98 | 17.2190 | 30.2955 | 29.1013 |

Figure 15

| Pattern | $\mathcal{F}(c_r), \mathcal{F}(c_b), \mathcal{F}(c_g)$ |
|---|---|
| red $c_r$ | $\frac{1}{4}\delta(\omega) + \frac{1}{4}\delta\left(\omega - \begin{bmatrix}\pi\\\pi\end{bmatrix}\right)$ |
| blue $c_b$ | $\frac{1}{4}\delta(\omega) + \frac{1+i}{16}\delta\left(\omega - \begin{bmatrix}\pi\\\frac{\pi}{2}\end{bmatrix}\right) + \frac{1-i}{16}\delta\left(\omega + \begin{bmatrix}\pi\\\frac{\pi}{2}\end{bmatrix}\right) + \frac{1+i}{16}\delta\left(\omega - \begin{bmatrix}\frac{\pi}{2}\\\pi\end{bmatrix}\right) + \frac{1-i}{16}\delta\left(\omega + \begin{bmatrix}\frac{\pi}{2}\\\pi\end{bmatrix}\right)$ |
| green $c_g$ | $\frac{1}{2}\delta(\omega)$ |

Figure 16

BAYER

YAMANAKA

LUKAC

VERTICAL

DIAGONAL

MODIFIED BAYER

CYAN-MAGENTA-YELL

SONY 4-COLOR

KODAK VER. 1

KODAK VER. 2

KODAK VER. 3

BAYER

YAMANAKA

LUKAC

VERTICAL

DIAGONAL

MODIFIED BAYER

CYAN-MAGENTA-YELL

SONY 4-COLOR

KODAK VER. 1

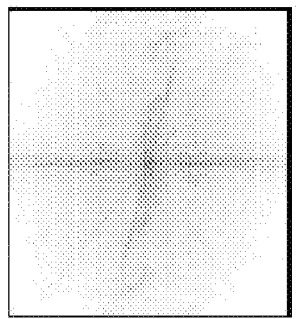
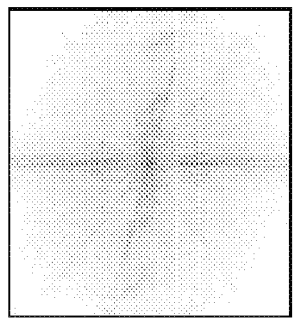
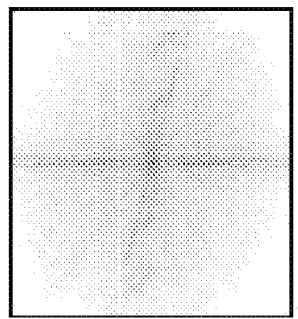
RED SPECTRUM $X_r$    GREEN SPECTRUM $X_g$    BLUE SPECTRUM $X_b$
FIGURE 19A      FIGURE 19B      FIGURE 19C
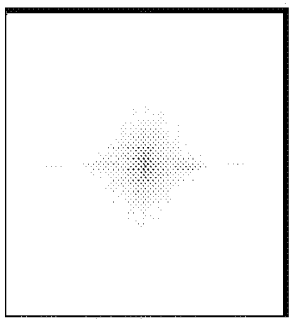
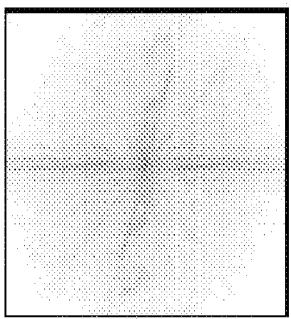
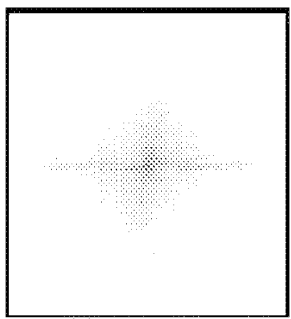
DIFFERENCE $X_\alpha$    BASEBAND $X_f$    DIFFERENCE $X_\beta$
FIGURE 19D      FIGURE 19E      FIGURE 19F
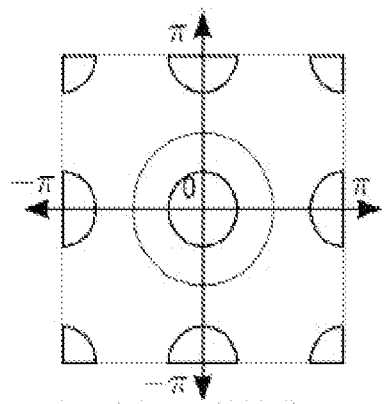
RADIALLY SYMMETRIC
FIGURE 20A

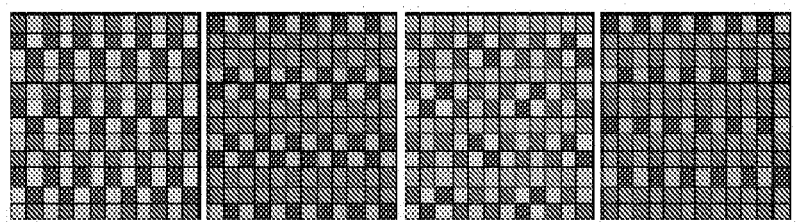
PATTERN Y FIGURE 21A   PATTERN X FIGURE 21B   PATTERN Y FIGURE 21C   PATTERN Z FIGURE 21D
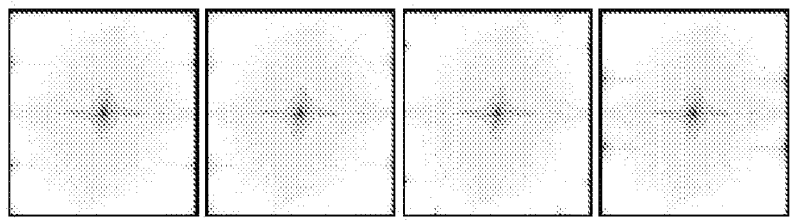
PATTERN Y FIGURE 21E   PATTERN X FIGURE 21F   PATTERN Y FIGURE 21G   PATTERN Z FIGURE 21H TABLE II
MEASURES OF CFA-DEPENDENT ALIASING IMPOSED ON $X_l$ BY $X_\alpha$ AND $X_\beta$.

| Image | Pure-Color CFA Patterns Fig 17 | | | | | Proposed CFA Patterns | | | |
|---|---|---|---|---|---|---|---|---|---|
| | 17(a) | 17(b) | 17(c) | 17(d) | 17(e) | V | X | Y | Z |
| 1 | 2183 | 2229 | 2177 | 2145 | 2124 | 943 | 2179 | 943 | 2177 |
| 2 | 986 | 981 | 983 | 1083 | 1080 | 486 | 984 | 480 | 983 |
| 3 | 1416 | 1413 | 1415 | 1408 | 1404 | 623 | 1414 | 624 | 1414 |
| 4 | 2482 | 2475 | 2479 | 2372 | 2372 | 1053 | 2478 | 1053 | 2476 |
| 5 | 1975 | 1969 | 1972 | 1951 | 1938 | 861 | 1973 | 862 | 1972 |
| 6 | 2905 | 2897 | 2899 | 2879 | 2867 | 1274 | 2900 | 1275 | 2900 |
| 7 | 2993 | 2980 | 2984 | 2924 | 2923 | 1299 | 2985 | 1299 | 2983 |
| 8 | 2628 | 2620 | 2623 | 2564 | 2564 | 1139 | 2625 | 1139 | 2624 |
| 9 | 1429 | 1424 | 1426 | 1419 | 1413 | 627 | 1427 | 627 | 1427 |
| 10 | 4192 | 4183 | 4186 | 4030 | 4028 | 1790 | 4190 | 1790 | 4188 |
| 11 | 1877 | 1798 | 1808 | 1716 | 1715 | 761 | 1800 | 762 | 1800 |
| 12 | 1621 | 1614 | 1615 | 1615 | 1614 | 717 | 1626 | 717 | 1615 |
| 13 | 1946 | 1971 | 1942 | 1895 | 1893 | 841 | 1944 | 841 | 1943 |
| 14 | 2123 | 2116 | 2118 | 2088 | 2087 | 927 | 2121 | 927 | 2119 |
| 15 | 1065 | 1067 | 1062 | 1068 | 1063 | 471 | 1064 | 471 | 1062 |
| 16 | 3211 | 3204 | 3205 | 3162 | 3161 | 1404 | 3210 | 1404 | 3208 |
| 17 | 6459 | 6455 | 6456 | 6350 | 6349 | 2821 | 6459 | 2822 | 6457 |
| 18 | 3090 | 3084 | 3086 | 3038 | 3022 | 1342 | 3087 | 1343 | 3086 |
| 19 | 1796 | 1789 | 1792 | 1801 | 1795 | 797 | 1791 | 797 | 1791 |
| 20 | 1808 | 1803 | 1805 | 1797 | 1787 | 794 | 1805 | 794 | 1804 |
| Mean | 2408 | 2405 | 2402 | 2365 | 2360 | 1048 | 2403 | 1048 | 2401 |
| Median | 2049 | 2043 | 2045 | 2020 | 2013 | 894 | 2047 | 894 | 2045 |
| Minimum | 986 | 981 | 983 | 1068 | 1063 | 471 | 984 | 471 | 983 |
| Maximum | 6459 | 6455 | 6456 | 6350 | 6349 | 2821 | 6459 | 2822 | 6457 |
| Range | 5474 | 5474 | 5473 | 5283 | 5287 | 2350 | 5476 | 2351 | 5475 |
| Std. Dev. | 1242 | 1241 | 1243 | 1206 | 1207 | 536 | 1243 | 536 | 1243 |
| colordeckst | 910 | 911 | 910 | 1032 | 1032 | 459 | 910 | 459 | 910 |
| fruitandflowers | 329 | 329 | 329 | 403 | 408 | 179 | 328 | 179 | 328 |
| airegg_hand | 2342 | 2342 | 2342 | 2615 | 2613 | 1161 | 2342 | 1161 | 2342 |
| womansface | 2703 | 2703 | 2707 | 2745 | 2747 | 1221 | 2704 | 1220 | 2705 |
| womanstanding | 3093 | 3093 | 3093 | 3209 | 3209 | 1426 | 3093 | 1426 | 3094 |
| younggirl | 2344 | 2344 | 2350 | 2380 | 2394 | 1056 | 2344 | 1056 | 2344 |
| Mean | 1954 | 1954 | 1955 | 2064 | 2067 | 917 | 1953 | 917 | 1954 |
| Median | 2343 | 2343 | 2350 | 2498 | 2503 | 1108 | 2343 | 1108 | 2343 |
| Minimum | 329 | 329 | 329 | 403 | 408 | 179 | 328 | 179 | 328 |
| Maximum | 3093 | 3093 | 3093 | 3209 | 3209 | 1426 | 3093 | 1426 | 3094 |
| Range | 2765 | 2765 | 2764 | 2806 | 2801 | 1247 | 2765 | 1247 | 2765 |
| Std. Dev. | 1086 | 1086 | 1087 | 1096 | 1095 | 487 | 1086 | 487 | 1086 |

FIGURE 22

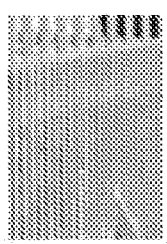 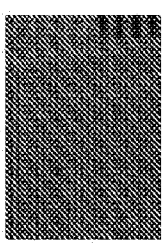 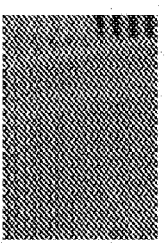  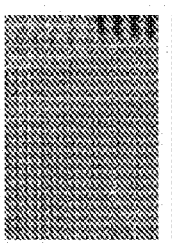 
FIGURE 25A   FIGURE 25B   FIGURE 25C   FIGURE 25D   FIGURE 25E   FIGURE 25F
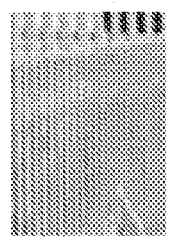 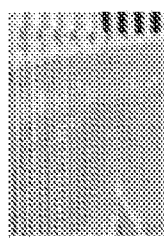 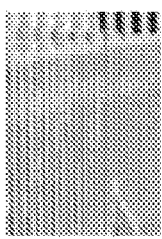 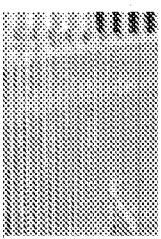 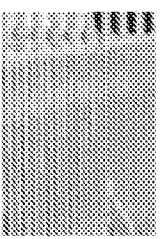 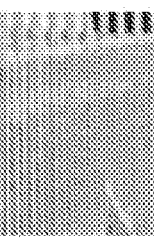
FIGURE 25G   FIGURE 25H   FIGURE 25I   FIGURE 25J   FIGURE 25K   FIGURE 25L

TABLE III
MEAN-SQUARE RECONSTRUCTION ERROR FOR VARIOUS CFA PATTERNS

| Image | Bayer Pattern | | | Proposed Patterns | | | |
|---|---|---|---|---|---|---|---|
| | Linear | Eval1 | Eval2 | Y | X | Y | Z |
| 1 | 18.41 | 11.22 | 20.11 | 8.19 | 9.24 | 15.66 | 17.51 |
| 2 | 8.58 | 7.63 | 8.14 | 6.02 | 6.73 | 15.57 | 16.76 |
| 3 | 15.83 | 11.67 | 18.64 | 13.73 | 16.06 | 18.44 | 26.91 |
| 4 | 12.82 | 9.24 | 11.36 | 5.99 | 6.98 | 11.28 | 12.25 |
| 5 | 6.33 | 4.67 | 5.82 | 4.23 | 4.52 | 6.87 | 7.46 |
| 6 | 39.81 | 19.34 | 27.30 | 13.32 | 15.37 | 20.21 | 42.08 |
| 7 | 6.61 | 4.49 | 5.24 | 4.00 | 4.35 | 5.77 | 7.78 |
| 8 | 5.20 | 4.37 | 5.70 | 3.77 | 4.16 | 5.53 | 6.82 |
| 9 | 10.42 | 7.94 | 11.48 | 6.72 | 7.40 | 11.10 | 14.29 |
| 10 | 5.40 | 3.82 | 4.42 | 2.92 | 3.20 | 5.12 | 6.81 |
| 11 | 24.01 | 23.84 | 47.49 | 22.83 | 25.05 | 45.36 | 39.23 |
| 12 | 8.80 | 8.15 | 10.79 | 6.85 | 7.60 | 11.08 | 13.78 |
| 13 | 6.55 | 4.52 | 4.63 | 2.52 | 2.73 | 4.96 | 4.34 |
| 14 | 5.26 | 4.91 | 7.72 | 5.07 | 5.65 | 7.17 | 9.28 |
| 15 | 13.43 | 12.66 | 23.35 | 12.83 | 13.97 | 21.77 | 20.83 |
| 16 | 13.31 | 6.96 | 9.48 | 5.43 | 6.18 | 8.34 | 14.90 |
| 17 | 6.76 | 5.90 | 8.14 | 5.43 | 6.12 | 7.95 | 11.54 |
| 18 | 11.17 | 8.56 | 14.30 | 6.73 | 7.38 | 12.18 | 11.76 |
| 19 | 12.57 | 10.88 | 15.01 | 8.60 | 9.20 | 12.48 | 14.69 |
| 20 | 21.32 | 22.66 | 32.87 | 16.14 | 17.58 | 23.07 | 25.42 |
| Mean | 12.63 | 9.67 | 14.60 | 8.07 | 8.97 | 13.54 | 16.23 |
| Median | 10.79 | 8.04 | 11.08 | 6.37 | 7.18 | 11.19 | 14.08 |
| Minimum | 5.20 | 3.82 | 4.42 | 2.52 | 2.73 | 4.96 | 4.34 |
| Maximum | 39.81 | 23.84 | 47.49 | 22.83 | 25.05 | 45.36 | 42.08 |
| Range | 34.61 | 20.03 | 43.07 | 20.31 | 22.32 | 40.40 | 37.74 |
| Std. Dev. | 8.17 | 5.81 | 10.81 | 5.05 | 5.60 | 9.21 | 10.01 |
| colorchecker | 26.12 | 22.03 | 11.72 | 16.82 | 17.70 | 20.95 | 25.80 |
| minorflowers | 23.15 | 18.62 | 16.49 | 14.33 | 15.38 | 17.55 | 19.38 |
| image_land | 4.09 | 2.83 | 1.68 | 2.54 | 2.56 | 10.15 | 10.92 |
| woman_face | 21.60 | 18.54 | 15.16 | 13.72 | 15.38 | 19.31 | 20.19 |
| recomasking | 15.75 | 13.44 | 12.05 | 10.57 | 11.12 | 16.52 | 15.91 |
| younggirl | 32.53 | 29.32 | 25.28 | 21.94 | 23.68 | 26.92 | 32.20 |
| Mean | 20.54 | 17.36 | 13.73 | 13.32 | 14.32 | 18.57 | 20.73 |
| Median | 22.38 | 18.58 | 13.61 | 14.03 | 15.43 | 18.43 | 19.78 |
| Minimum | 4.09 | 2.83 | 1.68 | 2.54 | 2.56 | 10.15 | 10.92 |
| Maximum | 32.53 | 29.32 | 25.28 | 21.94 | 23.68 | 26.92 | 32.20 |
| Range | 28.44 | 26.49 | 23.60 | 19.40 | 21.12 | 16.77 | 21.28 |
| Std. Dev. | 9.76 | 8.94 | 7.68 | 6.50 | 7.07 | 5.52 | 7.47 |

FIGURE 26

LUMINANCE
COMPONENT

CHROMINANCE
COMPONENT

CHROMINANCE
COMPONENT

STIMULI VERTICLE
STRIPE CFA

STIMULI DIAGONAL
STRIPE CFA

STIMULI FOR
PROPOSED CFA

VERTICLE STRIPE CFA

DIAGONAL STRIPE CFA

PROPOSED CFA

STIMULI FOR PROPOSED

SPATIO-SPECTRAL SAMPLING PARADIGM FOR IMAGING AND A NOVEL COLOR FILTER ARRAY DESIGN

CROSS-REFERENCE TO RELATED APPLICATIONS

This application is a US national phase entry under 35 U.S.C. §371 of PCT/US2007/085946 filed Nov. 29, 2007, which claims the benefit of priority of U.S. Provisional Application Ser. No. 60/861,718 filed Nov. 29, 2006, both of which is incorporated herein by reference in their entirety."

BACKGROUND

1. Field of Invention

The present invention relates to image acquisition and display, and more particularly to a spectral sampling arrangement for a color filter array.

2. Discussion of Related Art

In digital imaging applications, data are typically obtained via a spatial subsampling procedure implemented as a color filter array (CFA), a physical construction whereby each pixel location measures only a single color. The most well known of these schemes involve the canonical primary colors of light: red, green, and blue. In particular, the Bayer pattern CFA attempts to complement humans' spatial color sensitivity via a quincunx sampling of the green component that is twice as dense as that of red and blue. Specifically, let $n=(n_0, n_1)$ index pixel locations and define $$x(n)=(r(n),g(n),b(n)) \quad (1)$$

to be the corresponding color triple. Then the Bayer pattern CFA image, $y_{BAYER}(n)$, is given by:

$$y_{BAYER}(n)=r_s(n)+g_s(n)+b_s(n), \quad (2)$$

where $$r_s(n) = \begin{cases} r(n) & \text{if } n_0, n_1 \text{ even} \\ 0 & \text{otherwise} \end{cases} \quad (3)$$

$$g_s(n) = \begin{cases} g(n) & \text{if } n_0 + n_1 \text{ odd} \\ 0 & \text{otherwise} \end{cases}$$

$$b_s(n) = \begin{cases} b(n) & \text{if } n_0, n_1 \text{ odd} \\ 0 & \text{otherwise.} \end{cases}$$

Some existing alternatives to the Bayer pattern include Fuji's octagonal sampling, Sony's four color sampling, Polaroid's striped sampling, CMY sampling, hexagonal sampling, and irregular patterns. The Bayer pattern is illustrated in FIG. 1A, four color sampling is illustrated in FIG. 1B, striped sampling is illustrated in FIG. 1C, and hexagonal sampling is illustrated in FIG. 1D.

The terms "Demosaicing" or "demosaicking" refer to the inverse problem of reconstructing a spatially undersampled vector field whose components correspond to particular colors. Use of the Bayer sampling pattern is ubiquitous in today's still and video digital cameras; it can be fairly said to dominate the market. Consequently, much attention has been given to the problem of demosaicing color images acquired under the Bayer pattern sampling scheme.

While a number of methods have been proposed for reconstruction of subsampled data patterns, it is well known that the optimal solution (in the sense of minimal norm) to this ill-posed inverse problem, corresponding to bandlimited interpolation of each spatially subsampled color channel separately, produces perceptually significant artifacts. The perceptual artifacts produced using demosaicing algorithms on sub-sampled data obtained using a Bayer-pattern is caused both by the spatial undersampling inherent in the Bayer pattern and the observation that values of the color triple exhibit significant correlation, particularly at high spatial frequencies: such content often signifies the presence of edges, whereas low-frequency information contributes to distinctly perceived color content. As such, most demosaicing algorithms described in the literature attempt to make use (either implicitly or explicitly) of this correlation structure in the spatial frequency domain.

Most work in this area focuses on the interplay between the acquisitions stages and subsequent digital processing. Assuming a full-color image (i.e., a full set of color triples), and consequently, a key reconstruction task of demosaicing is first necessary.

A color filter array represents one of the first steps in the image acquisition pipeline and by considering the entire pipeline, analysis is provided on existing designs. For example, Fourier analysis may be applied, permitting a view of demosaicking as a process of "demulitplexing." Fourier analysis may also be applied to reconstruction based on chrominance/luminance decomposition. This analysis has led to surprising results.

SUMMARY

One aspect of the present invention relates to a new alternative to the Bayer pattern for spatial subsampling in color imaging applications. One aspect of the present invention relates to a new design paradigm for spatio-spectral sampling, which is also described. The proposed scheme offers the potential to significantly reduce hardware complexity in a wide variety of applications, while at the same time improving output color image quality. According to another aspect, it is realized that conventional processing techniques are subject to diminishing returns, and with the exception of the most sophisticated processing techniques generate imperfections perceptible to a practiced eye.

According to one aspect, a framework for CFA design in presented. In one embodiment the physical characteristics of the CFA are generated so that the spectral radii of luminance and chrominance channels are maximized. In another embodiment, the CFA designed to subject to the conditions of perfect reconstruction. In one aspect, the physical characteristics of CFA design are constrained to require physically realizable CFA(s). Alternatively, certain physical characteristics can be emphasized to generate easier to manufacture CFA(s).

According to one aspect of the present invention, a method of designing a spectral filter array comprising a plurality of spectral filters is provided. The method comprises A) determining at least one desired position for at least one spectral copy of a difference signal in a frequency domain representation of an image by minimizing overlap between spectral copies of the difference signal and a baseband signal in the frequency domain representation of the image, and B) based, at least in part, on the at least one desired position, determining at least one location of and at least one spectral value of at least one spectral filter of the plurality of spectral filters. According to one embodiment of the present invention, the spectral filter array comprises a color filter array. According to another embodiment of the invention, the plurality of spectral filters comprise a color filter. According to another embodiment of the invention, the method further comprises an act of generating a modulation factor for achieving the desired position for the at least one spectral copy. According to another embodiment of the invention, the method further comprises an act of modifying a value for the difference signal using the modulation factor.

According to one embodiment of the present invention, the act of based, at least in part, on the at least one desired position, determining at least one location of and at least one spectral value of at least one spectral filter of the plurality of spectral filters is also based, at least in part, on the modulation factor. According to another embodiment of the invention, the act of determining at least one desired position for at least one spectral copy of a difference signal in a frequency domain representation of an image further comprises determining the at least one desired position for the at least one spectral copy of a difference signal to not include locations along a horizontal axis of the frequency domain representations except at an origin and to not include locations along a vertical axis of the frequency domain representations except at an origin. According to another embodiment of the invention, determining at least one desired position for at least one spectral copy of a difference signal in a frequency domain representation of an image further comprises an act of restricting a value for a carrier frequency for the spectral copy. According to another embodiment of the invention, the method further comprises an act of insuring periodicity of the spectral filter array. According to another embodiment of the invention, insuring the periodicity of the spectral filter array includes restricting the value for the carrier frequency for at least one spectral copy to rational multiples of $\pi$.

According to one embodiment of the present invention, the method further comprises an act of restricting a number of carrier frequencies. According to another embodiment of the invention, the number of carrier frequencies is two. According to another embodiment of the invention, the method further comprises an act of maximizing penetration of photons through at least one of the plurality spectral filters. According to another embodiment of the invention, the act of maximizing penetration of photons through the at least one of the plurality spectral filters further comprises adjusting a color value for at least one spectral filter to minimize dye application to the at least one of the plurality of spectral filters.

According to one aspect of the present invention, an image capturing apparatus is provided. The apparatus comprises a plurality of photosensitive elements, each photosensitive element configured to measure a magnitude of light, and a color filter array, wherein the color filter array comprises a plurality of color filters arranged so that, in at least one frequency domain representation of at least one image captured using the plurality of photosensitive elements, at least one spectral copy of at least one difference signal is positioned so as to minimize overlap between the at least one difference signal and a baseband signal in the at least one frequency domain representation. According to one embodiment of the present invention, the apparatus further comprises a memory element for storing the magnitudes of measured light. According to another embodiment of the invention, the desired position is selected to maximize a bandwidth of captured image data. According to another embodiment of the invention, the at least one desired position comprises at least one position at angles away from either a vertical axis or a horizontal axis of the at least one representation except at an origin of the at least one representation. According to another embodiment of the invention, at least one of the plurality of color filters comprises a mixture of colors. According to another embodiment of the invention, the mixture of colors comprises a mixture of pure-color filter colors.

According to one embodiment of the present invention, the plurality of color filters are arranged so that in the at least one frequency domain representation of the at least one image a deviation from a baseband luminance is minimized. According to another embodiment of the invention, the arrangement of the plurality of color filters comprises a proportional relationship of a color value for each color of the plurality of color filters adapted to account for an average illuminant color. According to another embodiment of the invention, a color value comprises a mixture of at least red, blue, and green colors. According to another embodiment of the invention, a selected color of at least one of a plurality of color filters is adapted to maximize the transmission of photons. According to another embodiment of the invention, the selected color of at least one of a plurality of color filters minimizes an amount of dye on the at least one of a plurality of color filters.

According to one aspect of the present invention, a method of recording at least one image is provided. The method comprises A) measuring a plurality of magnitudes of electromagnetic radiation, each magnitude corresponding to a magnitude of at least one wavelength of electromagnetic radiation at one of a plurality of locations, wherein measuring the plurality of magnitudes includes filtering a frequency domain representation of the plurality of magnitudes of electromagnetic radiation including spectral copies of at least one difference signal, with filters positioned so that overlap between the spectral copies is minimized within the frequency domain representation. According to one embodiment of the present invention, the one or more desired locations do not include locations along a horizontal axis of the frequency domain representation except at an origin and do not include locations along a vertical axis of the frequency domain representation except at an origin. According to another embodiment of the invention, the at least one image includes a plurality of images comprising a video. According to another embodiment of the invention, the each magnitude of the plurality of magnitudes of electromagnetic radiation, corresponds to a magnitude of at least one wavelength of visible light.

According to one aspect of the present invention, a method of storing at least one color image is provided. The method comprises A) storing a mosaiced representation of the image on a machine readable medium, wherein the representation of the image includes a plurality of indications of magnitudes of light, each magnitude of light corresponding to a magnitude of at least one color of light at one of a plurality of locations in the image, and wherein a frequency domain representation of the plurality of magnitudes of light does not include a spectral copy of a difference signal either at a horizontal or at a vertical of the frequency domain representation. According to one embodiment of the present invention, the at least one image includes a plurality of images comprising a video.

According to one aspect of the present invention, a method of designing a color filter array pattern is provided. The method comprises A) determining a desired pattern of difference components in a frequency domain representation of a captured image, B) generating a spatial pattern with a plurality of spatial locations by performing an inverse Fourier transform on the desired pattern, wherein each spatial location includes a plurality of color component values, and C) generating the color filter array pattern by filling the color component values with a main color component so that the sum of the color components at each spatial location of the plurality of spatial locations equals one. According to one embodiment of the present invention, the method further comprises an act of D) enabling physically realizable spectral values for each color component value of each spatial location. According to another embodiment of the invention, the method further comprises an act of E) scaling each color component value of at least one spatial location of the plurality of spatial locations.

According to one aspect of the present invention, a method of determining a pattern of a plurality of electromagnetic radiation output elements for an electromagnetic radiation output device is provided. The method comprises A) determining at least one desired position for at least one spectral copy of a chrominance signal in a frequency domain representation of an image output by the electromagnetic radiation output device by minimizing overlap between spectral copies of the chrominance signal and a luminance in the frequency domain representation of the image, and B) based, at least in part, on the at least one desired position, determining at least one location of and at least one spectral value for at least one electromagnetic radiation output element of the plurality of electromagnetic radiation output elements. According to one embodiment of the present invention, the method further comprises an act of C) maximizing bandwidth of the output image. According to another embodiment of the invention, the at least one desired position does not include locations along a horizontal axis of the frequency domain representation except at an origin and does not include locations along a vertical axis of the frequency domain representation except at an origin.

According to one aspect of the present invention, an electromagnetic output apparatus is provided. The apparatus comprises a plurality of electromagnetic output elements, each output element configured to output a predetermined bandwidth of electromagnetic radiation, wherein the plurality of electromagnetic output elements are arranged so that, in a frequency domain representation of at least one image displayed using the plurality of electromagnetic output elements, spectral copies of at least one chrominance signal are positioned at one or more desired locations within the frequency domain, wherein the one or more desired locations are determined by minimizing overlap between spectral copies of the chrominance signal and a luminance signal. According to one embodiment of the present invention, the one or more desired locations do not include locations along a horizontal axis of the frequency domain representation except at an origin and do not include locations along a vertical axis of the frequency domain representation except at an origin.

According to one aspect of the present invention, a method for image processing is provided. The method comprises the acts of transforming image data into at least one baseband signal and at least one difference signal in a frequency domain representation; and minimizing the overlap between the at least one baseband signal and the at least one difference signal in the frequency domain representation. According to one embodiment of the present invention, the method further comprises an act of establishing physical characteristics of a color filter array based at least in part on a resulting position of a representation of the difference signal and a resulting position of a representation of the baseband signal in the frequency domain. According to another embodiment of the invention, the physical characteristics include a color of at least one color filter comprising a color filter array. According to another embodiment of the invention, the color of at least one color filter comprises a mixture of colors. According to another embodiment of the invention, the mixture of colors comprise a mixture of true colors. According to another embodiment of the invention, the physical characteristics include spatial positioning of at least one filter in a color filter array. According to another embodiment of the invention, the physical characteristics include a geometric arrangement of at least one filter in a color filter array.

According to one embodiment of the present invention, the physical characteristics are based, at least in part, on an average illuminant color. According to another embodiment of the invention, the physical characteristics include a geometry of at least one color filter in a color filter array. According to another embodiment of the invention, the at least one baseband signal comprises a luminance component of a captured image. According to another embodiment of the invention, the method further comprises an act of minimizing deviation of the baseband luminance signal. According to another embodiment of the invention, the act of minimizing deviation of the baseband luminance signal further comprises establishing a color mixture to account for an average illuminant color change. According to another embodiment of the invention, the act of minimizing the overlap between the at least one baseband signal and the at least one difference signal in the frequency domain further comprises determining a desired position for at least one spectral representation in the frequency domain for the at least one difference signal. According to another embodiment of the invention, the method further comprises an act of establishing the desired position for the spectral representation so that it does not occur on a vertical axis and does not occur on a horizontal axis of the frequency domain.

According to one embodiment of the present invention, the method further comprises an act of modulating a value for the at least one difference signal to attain the desired position. According to another embodiment of the invention, the method further comprises an act of modulating, equally, values for a plurality of difference signals to attain a plurality of desired positions. According to another embodiment of the invention, the act of modulating a value for the at least one difference image channel to attain the desired position further comprises applying a multiplication factor to the value of the at least one difference signal. According to another embodiment of the invention, the multiplication factor comprises a modulation weight. According to another embodiment of the invention, the multiplication factor is based, at least in part on a DC component of at least one color component. According to another embodiment of the invention, the act of minimizing the overlap between the at least one baseband signal and the at least one difference signal in the frequency domain further comprises restricting a carrier frequency of at least one difference signal in a frequency domain representation. According to another embodiment of the invention, the method further comprises an act of restricting the carrier frequency of the at least one difference signal representation to rational multiples of $\pi$.

According to one embodiment of the present invention, the method further comprises acts of establishing a range of values associated with image data transformations, and generating filter array characteristics that conform to the range of values associated with the image data transformations. According to another embodiment of the invention, the method further comprises acts of establishing a range of values associated with a physical characteristic of a color filter array, determining an effect on the frequency domain representation of an image by varying the range of values associated with a physical characteristic of a color filter array, and creating maximal and minimal values for at least one range of values associated with physical characteristic of a color filter array. According to another embodiment of the invention, the method further comprises an act of constraining the range of values associated with the physical characteristics of a color filter array to physically realizable values. According to another embodiment of the invention, creating maximal and minimal values for at least one range of values associated with physical characteristic of a color filter array further comprising performing inverse transformations of the frequency domain representation. According to another embodiment of the invention, the method further comprises an act of reconstructing a captured image employing a completely linear reconstruction process.

According to one aspect of the present invention, a color filter array is provided. The color filter array comprises a plurality of color filters adapted to minimize overlap between chrominance and luminance representations in a frequency domain representation of an image. According to one embodiment of the present invention, at least one of the plurality of color filters comprises a mixture of colors. According to another embodiment of the invention, the mixture of colors further comprises a mixture of pure-color filter colors. According to another embodiment of the invention, a color of each the plurality of color filters further comprise one of predetermined number of color values. According to another embodiment of the invention, the predetermined number of color values is three. According to another embodiment of the invention, the color filter array further comprises a predetermined proportion of color values for the plurality of color filters. According to another embodiment of the invention, the predetermined proportion of the color values is adapted to minimize deviation of luminance representation in a frequency domain representation in response to changes in illumination. According to another embodiment of the invention, the plurality of color filters is further adapted to represent spectral copies of a difference signal in a frequency domain representation in at least one desired position. According to another embodiment of the invention, the desired position does not include locations along a horizontal axis of the frequency domain representation except at an origin.

According to one embodiment of the present invention, the desired position does not include locations along a vertical axis of the frequency domain representation except at an origin. According to another embodiment of the invention, the plurality of color filters are further adapted to limit carrier frequencies of a chrominance representation in a frequency domain representation to rational multiples of it. According to another embodiment of the invention, the plurality of color filters are further adapted to limit a number of carrier frequencies of the chrominance representation in the frequency domain representation to two. According to another embodiment of the invention, the plurality of color filters are further adapted to permit linear reconstruction of filtered image data that maintains image reconstruction fidelity equal to at least one non-liner reconstruction techniques. According to another embodiment of the invention, the plurality of color filters are further adapted to permit linear reconstruction of filtered image data that maintains image reconstruction fidelity better that at least one non-liner reconstruction techniques. According to another embodiment of the invention, the color filter array further comprises a geometry of the plurality of color filters, wherein the geometry of the plurality of color filters is adapted to minimize overlap between chrominance and luminance representations in a frequency domain representation of an image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 1A-D illustrates a Bayer pattern, hexagonal pattern, four color pattern, and striped pattern CFA;

FIG. 8 illustrates a table indicating color components of example CFAs according to embodiments of the present invention;

FIGS. 13A-H illustrate sensor data of a sample image captured using four different CFAs and demosaiced versions of this sensor data;

FIG. 15 illustrates a table indicating evaluations of various demosaiced versions of images capture using four different CFAs;

FIG. 16 illustrates a table indicating an arrangement of output elements;

FIG. 19(a)-(f) illustrate log-magnitude spectra of color channels of the "lighthouse" image showing contrast in bandwidth between color channels and a chrominance/luminance representation;

FIG. 20(a) illustrates an examples of frequency domain representations of an image having radially symmetric characteristics acquired under a Bayer pattern;

FIG. 21(a)-(h) illustrate examples of CFA patterns and corresponding log-magnitude spectra for a "lighthouse" image;

FIG. 22 illustrates a table indicating evaluations of aliasing of CFA patterns;

FIG. 25(a)-(l) illustrate an original image, sensors images examples, and their corresponding reconstructions;

FIG. 26 illustrates a table evaluating mean-square reconstruction error for examples of CFA patterns;

DETAILED DESCRIPTION

Figure 2:
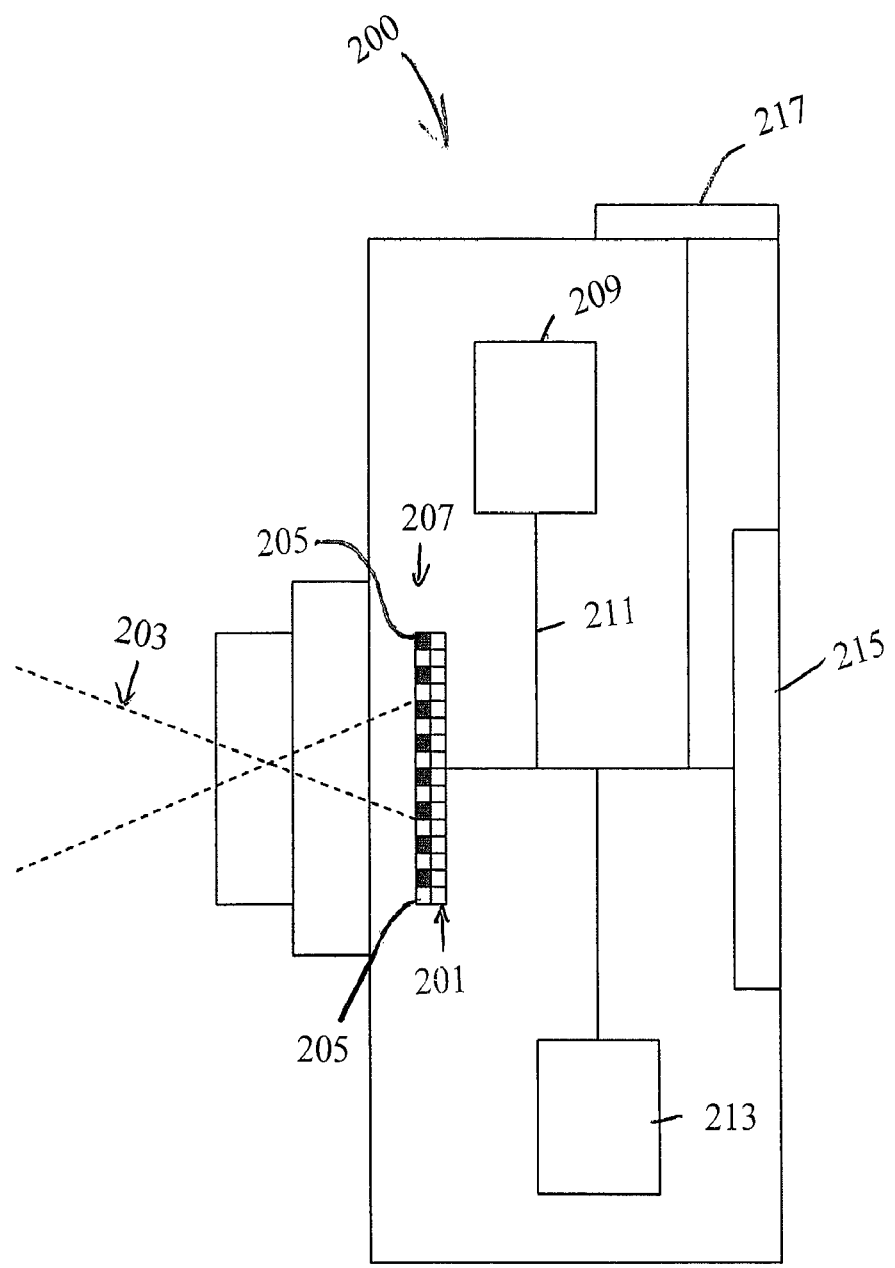
FIG. 2 illustrates an example image capturing device according to one embodiment of the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Various embodiments of the present invention may include one or more cameras or other image capturing devices. In some embodiments, a camera 200, as illustrated in FIG. 2, may include a plurality of light sensitive elements 201. Each light sensitive element may be configured to measure a magnitude of light 203 at a location within an image being captured. The measurements of light may later be combined to create a representation of the image being captured in a process referred to as demosaicing.

In one embodiment of the present invention, the plurality of light sensitive elements 201 may include a plurality of photo sensitive capacitors of a charge-coupled device (CCD). In one embodiment, the plurality of light sensitive elements 201 may include one or more complementary metal-oxide-semiconductor (CMOS). During image capture, each photosensitive capacitor may be exposed to light 203 for a desired period of time, thereby generating an electric charge proportional to a magnitude of the light at a corresponding image location. After the desired period of time, the electric charges of each of the photosensitive capacitors may then be measured to determine the corresponding magnitudes of light at each image location.

In some embodiments of the present invention, in order to capture a color image, one or more color filters 205 may be disposed on one or more of the light sensitive elements 201. In some embodiments, a color filter 205 may cut out or filter electromagnetic radiations of specified wavelengths. In some implementations, a color filter 205 may be generated by placing a layer of coloring materials (e.g., ink, dye) of a desired color or colors on at least a portion of a clear substrate. In traditional image capturing applications, the color filters are arranged into a color filter array (CFA) 207. A CFA generally refers to a spatially varying pattern of color filters. The majority of traditional CFA's have filters arranged in the Bayer pattern, as described above.

In some embodiments, an indication of the magnitudes of light measured by each light sensitive element may be transmitted to at least one processor 209. In one embodiment in which a plurality of photosensitive capacitors of a CCD are used as light sensitive elements 201, the current in each photosensitive capacitor may be measured and converted into a signal that may be transmitted from the CCD to the processor 209. In some embodiments, the processor 209 may include a general purpose microprocessor and/or an application specific integrated circuit (ASIC). In some embodiments, the processor may include memory elements (e.g., registers, RAM, ROM) configured to store data (e.g., measured magnitudes of light, processing instructions, demosaiced representations of the original image). In some embodiments, the processor 209 may be part of the image capturing device (e.g., camera 200). In other embodiments, the processor 209 may be part of a general purpose computer or other computing device.

In some embodiments, the processor 209 may be coupled to a communication network 211 (e.g., a bus, the Internet, a LAN). In some embodiments, one or more storage components 213, a display component 215, a network interface component (not shown), a user interface component 217, and/or any other desired component may be coupled to the communication network 211 and communicate with the processor 209. In some implementations, the storage components 213 may include nonvolatile storage components (e.g., memory cards, hard drives, ROM) and/or volatile memory (e.g., RAM). In some implementations, the storage components 213 may be used to store mosaiced and/or demosaiced representations of images captured using the light sensitive elements 201.

In some embodiments, the processor 209 may be configured to perform a plurality of processing functions, such as responding to user input, processing image data from the photosensitive elements 201, and/or controlling the storage and display elements 213, 215. In some embodiments, one or more such processors may be configured to perform demosaicing and/or denoising functions on image data captured by the light sensitive elements 201 in accordance with the present invention.

In some embodiments, the image capturing device (e.g., camera 200) and/or processor 209 may be configured to store or transmit at least one representation of an image (e.g., on an internal, portable, and/or external storage device, to a communication network). In some implementations, the representation may include demosaiced and/or denoised representation of the image. In some implementations the representation may include a representation of the magnitudes of light measured by the light sensitive elements 201 in accordance with embodiments of the present invention. In some embodiments, the representation may be stored or transferred in a machine readable format, such as a JPEG or any other electronic file format.

In some embodiments, the image capturing device may include a video camera configured to capture representations of a series of images. In addition to or as an alternative to capturing a representation of a single image, as described above, such a video camera may capture a plurality of representations of a plurality of images over time. The plurality of representations may comprise a video. The video may be stored on a machine readable medium in any format, such as a MPEG or any other electronic file format.

Color Filter Patterns

In one aspect of the invention, it is recognized that there are a number of limitations associated with existing demosaicing algorithms for Bayer-patterned data and other existing CFA data including:

Simple interpolation schemes often lead to undesirable (and commercially unacceptable) visual distortions and artifacts;

More sophisticated interpolation schemes are highly non-linear and complex/costly to implement in hardware; and Nonlinear techniques (e.g., directional filtering) further exacerbate the problem of characterizing (and hence removing) the noise associated with the image acquisition process.

These complications may be at least partially attributed to the spectral content of Bayer pattern and other traditional CFAs that exhibit a complicated form of aliasing due to sampling, making it difficult or impossible to recover the true image.

Figure 3A:
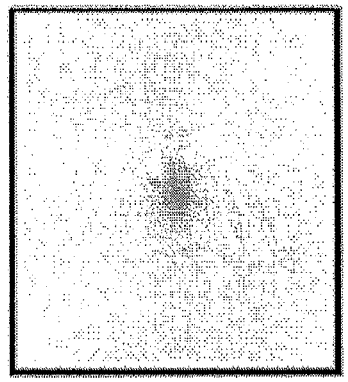
FIGS. 3A-D illustrate example frequency domain representations of color components of an image captured using a Bayer pattern CFA.
Figure 3B:
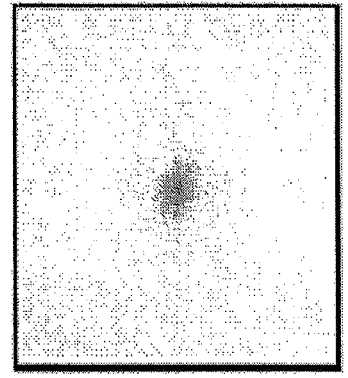
Figure 3C:
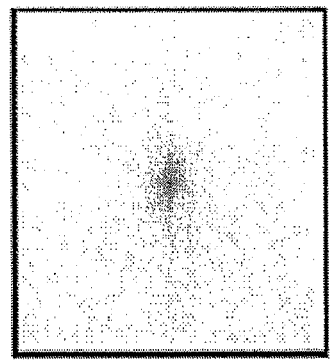
Figure 3D:
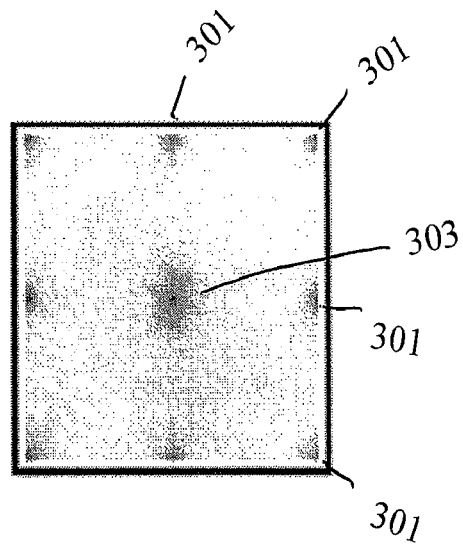

In one aspect of the present invention, it is recognized that despite its widespread use, the Bayer pattern and other traditional CFA patterns impose inherent limitations upon the design of interpolation and denoising methods. A popular interpretation of the Bayer pattern in the recent literature involves decomposing the sensor image into g(n) and the spatially subsampled difference images $\alpha(n)=r(n)-g(n)$ and $\beta(n)=b(n)-g(n)$. Because the high frequency contents of r, g, and b may be highly redundant, it is often accepted that $\alpha(n)=r(n)-g(n)$ and $\beta(n)=b(n)-g(n)$ are bandlimited. In particular, consider the spectrum associated with Bayer-patterned data, as shown in FIGS. 3A-D. FIGS. 3A-D illustrate a log-magnitude spectra of a typical color image known as "Clown." FIG. 3A illustrates the g(n) component in the frequency domain; FIG. 3B illustrates a difference signal given by $\alpha_s(n)$ in the frequency domain; FIG. 3C illustrates a difference signal given by $\beta_s(n)$ in the frequency domain; and FIG. 3D illustrates the combination of these signals showing the spectral periodization associated with the Bayer pattern described by $y_{BAYER}=g+\alpha_s+\beta_s$, where $$\alpha_s = \begin{cases} \alpha(n) & \text{if } n_0, n_1 \text{ even} \\ 0 & \text{otherwise} \end{cases} \quad (4)$$

$$\beta_s = \begin{cases} \beta(n) & \text{if } n_0, n_1 \text{ odd} \\ 0 & \text{otherwise.} \end{cases}$$

and $n=(n_0,n_1)$ indexes pixel locations in the Bayer pattern.

Figure 4A:
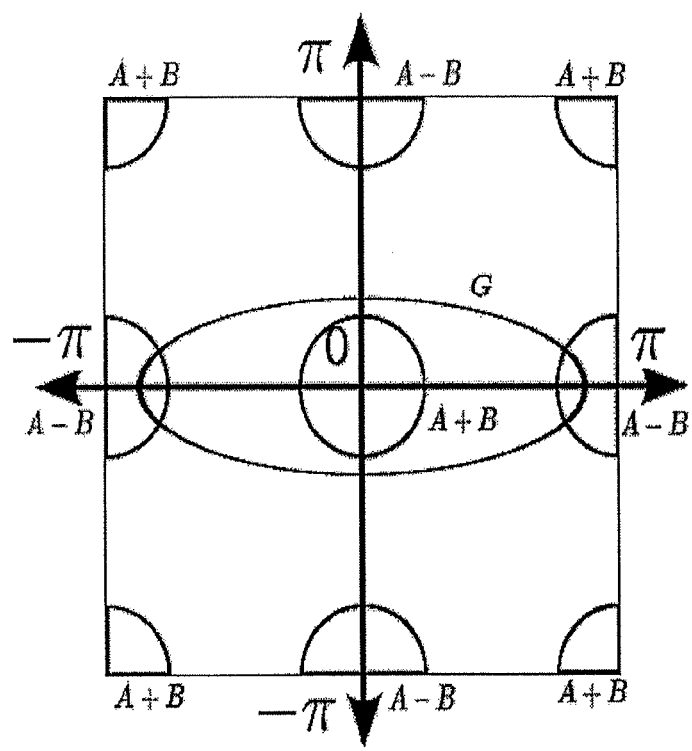
FIGS. 4A-B illustrate examples of frequency domain representations of images having dominant horizontal or vertical components, respectively.
Figure 4B:
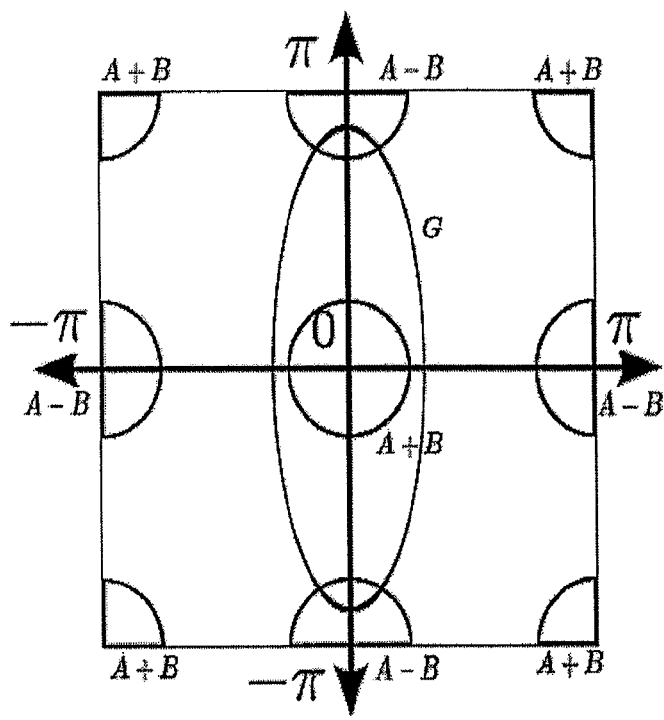

As can be seen from FIG. 3D, the rectangular subsampling lattice induces spectral copies of the difference signals of FIGS. 3B and 3C centered about the set of frequencies $\{(0,\pi), (\pi,0), (\pi,\pi)\}$, each indicated by 301. Note that one spectral copy of the difference signals not indicated by a numeral, referred to as a baseband, may appear at the origin. The copies of the difference signals and the central signals 303 interfere with one another, thereby reducing allowable bandwidth of both signals. Hence, by reducing allowable bandwidth, the Bayer spectral periodization "penalizes" the very horizontal and vertical features which are most likely to appear in typical "real-world" images. Such image features may roughly be categorized as predominantly horizontal as is seen in FIG. 4A or vertical as is seen in FIG. 4B. In these examples, the spectral aliases of $\alpha_s(n)$ and $\beta_s(n)$ centered around either the vertical or horizontal axes, respectively, are non-overlapping with g(n), and therefore introducing nonlinearity (such as directional filtering) may resolve the aliasing problems. However, the design of nonlinear methods may prove nontrivial and may be subject to zippering artifacts.

Figure 5A:
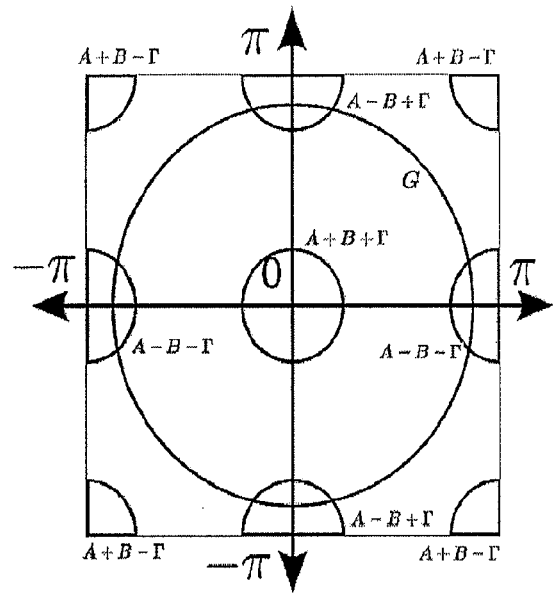
FIGS. 5A-C illustrate frequency domain representations of different CFA patterns.

In one aspect of the present invention, it is recognized that Four-color sampling, which is similar to Bayer pattern sampling, may have even more severe restrictions. For example, let $\gamma(n)=e(n)-g(n)$, where e(n) is the fourth color such as emerald, and $\Gamma=\mathcal{F}(\gamma)$ where $\mathcal{F}$ indicates a 2-dimensional Fourier transform. Assuming that γ is likewise bandlimited, a Fourier analysis of the sensor image yields spectral interpretation as illustrated in FIG. 5A. While FIG. 5A resembles FIG. 3D, the composition of the spectral copies of α, β, and γ at the horizontal and vertical axes are different, and thus it may not allow directional filtering as a viable option.

Analysis of Color Filter Arrays

According to another aspect, the spatio-spectral sampling induced by a typical CFA pattern was studied. Model of CFAs as a spatial array of pixel sensors were used. As discussed above, a physical device termed a color filter rests over the photosensitive element at each pixel location; it passes a certain portion of the visible spectrum of light according to its chemical composition. The resultant measurement may be considered as an inner product resulting from a spatiotemporal integration of the incident light over each pixel's physical area and exposure time, taken with respect to the color filter's spectral response. While this spectral response is an intrinsic property of the filter, its perceived color is in fact a function of the environmental illuminant; however, here we adopt the standard convention and identify the filters typically used in practice by their "colors" as red, green, and blue. Discussed below, our later analysis will rely on convex combinations of these components as "pure-color" building blocks. Other issues such as dye chemistry, quality control, prior art, etc. arise in an industry setting, and may also be taken into account in some embodiments. Issues associated with "color science" need not be addressed in the analysis of color filter arrays, rather optimization of relevant objective metrics, rather than subjective metrics related to perception, will be reviewed.

In one typical acquisition scenario, a regular, repeating CFA pattern comprises a tiling of the image plane formed by the union of interleaved sets of sampling, which in turn may be understood in terms of lattices; the spectral periodicity of the resultant sampled color image is determined by a so-called dual lattice, thereby enabling us to characterize the effect on individual color channels of the spatio-spectral sampling induced by various CFA patterns. By explicitly considering this spatio-spectral representation, analysis quantifies both the fundamental limitations of existing CFA designs as evidenced through their associated demosaicking algorithms, and to explicitly demonstrate the sub-optimality of a class of designs that includes most CFA patterns currently in wide use.

Figure 17A:
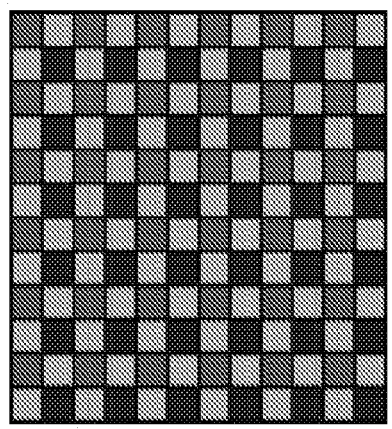
FIG. 17(a)-(k) illustrate different embodiments of color filter arrays.
Figure 17B:
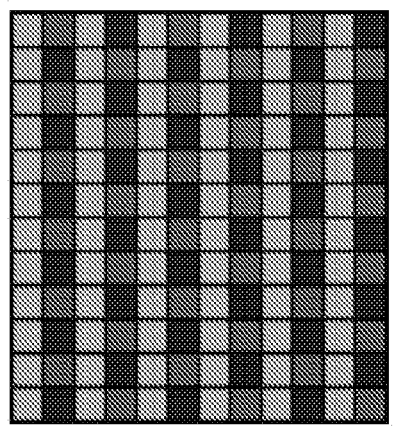
Figure 17C:
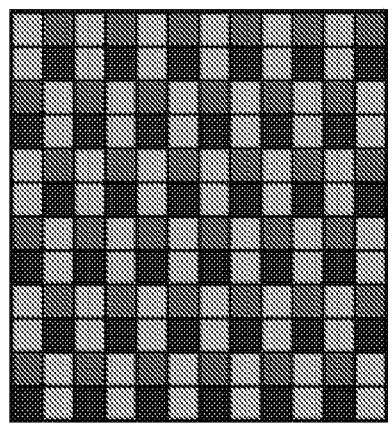
Figure 17D:
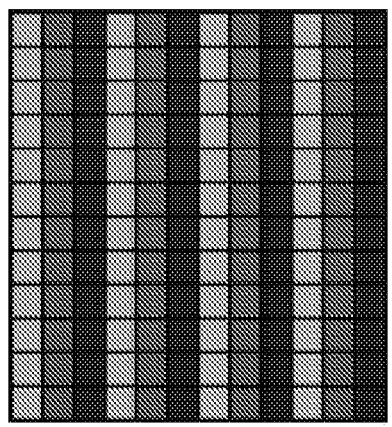
Figure 17E:
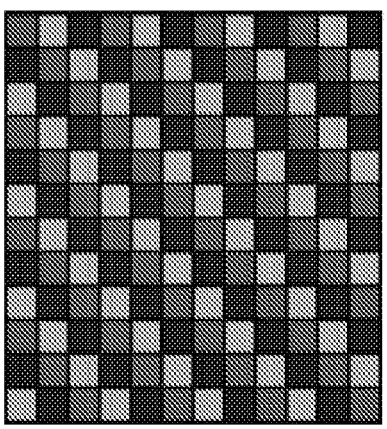
Figure 17F:
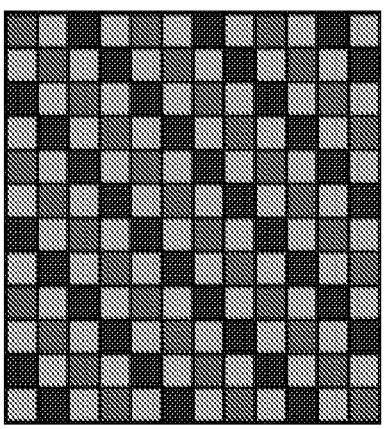
Figure 17G:
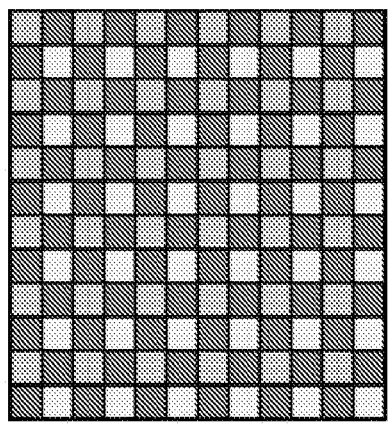
Figure 17H:
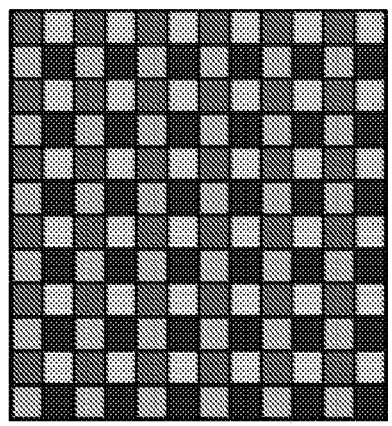
Figure 17I:
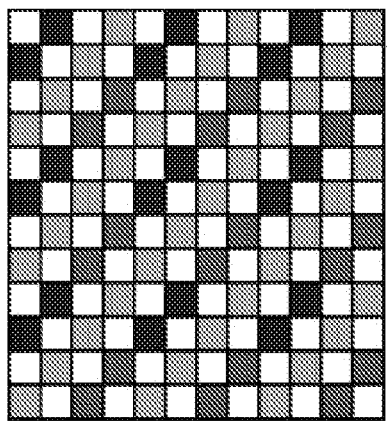
Figure 17J:
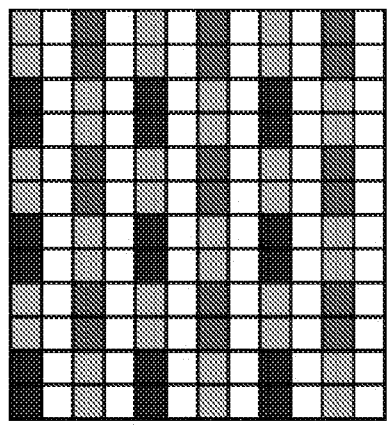
Figure 17K:
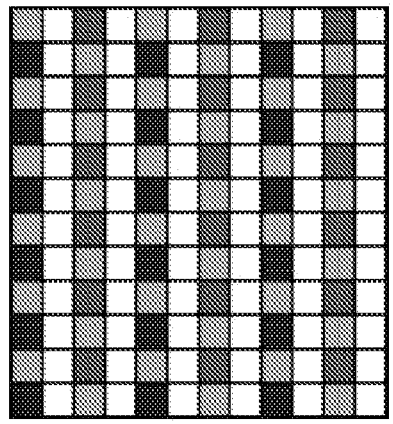
Figure 18A:
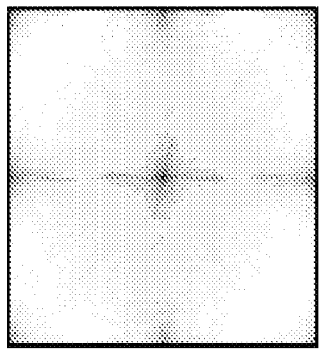
FIG. 18(a)-(i) illustrate the log-magnitude spectra of respective sensor data representing the "lighthouse" image.
Figure 18B:
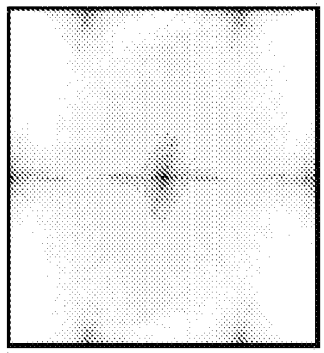
Figure 18C:
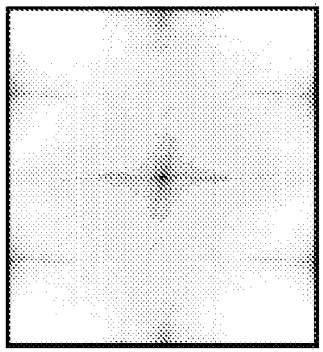
Figure 18D:
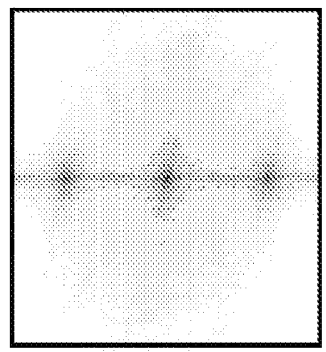
Figure 18E:
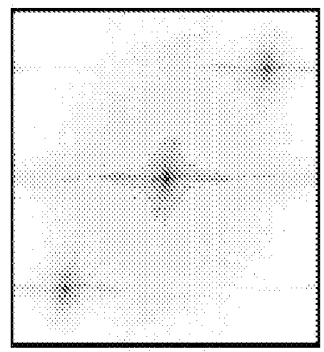
Figure 18F:
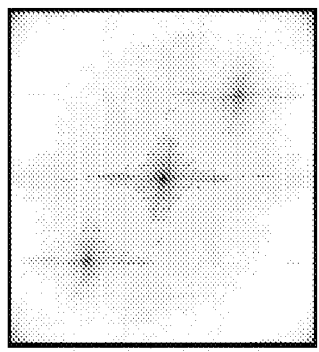
Figure 18G:
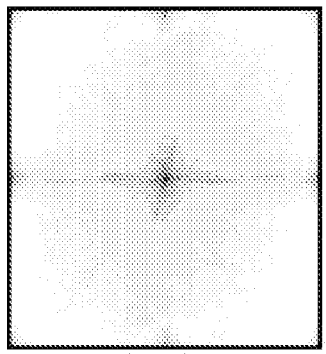
Figure 18H:
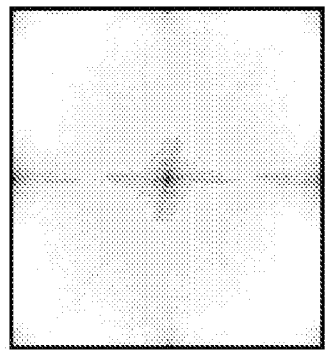
Figure 18I:
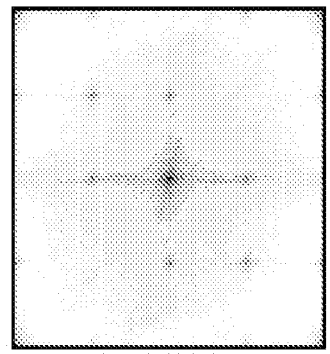

The known Bayer pattern CFA, illustrated in FIG. 1 and in an alternative embodiment in FIG. 17(a), attempts to complement humans' spatial color sensitivity via a quincunx sampling of the green component that is twice as dense as that of red and blue. Though the Bayer pattern remains the industry standard, a variety of alternative color schemes and geometries have been considered over the years, shown in FIG. 17(a)-(f) as pure-color designs and FIG. 17(g)-(k) as panchromatic designs. Analyzing the geometric structure of color filter arrays as well as the algebraic structure of the sampling patterns they induce, permits identification of some shortcomings in state of the art color filter array design and demosaicing—examples of the structures are shown in FIG. 18(a)-(f), illustrating log-magnitude spectra of respective sensor data representing the "lighthouse" image, corresponding to CFA designs shown in FIG. 17(a)-(f). The requisite tools and vocabulary for this task will be provided by the notion of point lattices.

Point Lattices as Sampling Sets:

We will employ the notion of lattices to describe the spatial subsampling induced by CFA patterns. Formally, a uniform lattice $\Lambda \subset \mathbb{R}^n$ comprises a discrete subgroup of n-dimensional Euclidean space whose quotient is compact. We say a nonsingular matrix M having real entries generates a point lattice $\Lambda_M$ if $\Lambda_M = M\mathbb{Z}^n$, in which case columns of M are said to form a basis for the lattice. In the engineering literature M is often called a sampling matrix, as it may generate a periodic measurement pattern indexed by n-tuples of integers precisely according to the lattice $\Lambda_M$. We associate with each lattice $\Lambda_M$ a quantity $\mathrm{vol}(\Lambda_M):=|\det(M)|$ that may generalize the notion of a sampling period and is independent of the lattice basis. Under one aspect of the analysis, we focus on the unit-volume square lattice $\mathbb{Z}^2$ as the setting for our image sensor—though our subsequent results apply equally well to other settings and different implementations, such as octagonal or hexagonal sensor geometries, for example. The associated color sampling patterns may then be represented by less dense lattices, said to be sublattices of $\mathbb{Z}^2$ if each of their elements also belongs to $\mathbb{Z}^2$. Example sublattices of $\mathbb{Z}^2$ include the square sublattice generated by $$M = \begin{bmatrix} 2 & 0 \\ 0 & 2 \end{bmatrix},$$

and the quincunx sublattice generated by $$M = \begin{bmatrix} 1 & 1 \\ -1 & 1 \end{bmatrix}.$$

The volume of a sublattice $\Lambda_M \subset \mathbb{Z}^2$ is consequently integer-valued, and no less than $\mathrm{vol}(\mathbb{Z}^2)=1$.

$\mathbb{Z}^2$ can be written as a disjoint union of distinct translates of a given sublattice $\Lambda_M$—whereupon such translates can be associated with a red, green, or blue purecolor filter. The set of distinct translates of $\Lambda_M$ by vectors in $\mathbb{Z}^2$ is said to form a set of cosets of $\Lambda_M$ in $\mathbb{Z}^2$, with the corresponding vectors termed coset vectors. The number of distinct coset vectors (including the zero vector)—and hence disjoint translates—of such a sublattice is given by $\mathrm{vol}(\Lambda_M)$. Note that if we specify a regular, repeating pure-color CFA pattern based on the sublattice $\Lambda_M \subset \mathbb{Z}^2$, then the number of different colors it admits should not exceed the number of distinct cosets in $\mathrm{vol}(\Lambda_M)$. To this end, we call a sampling matrix M admissible if it generates a sublattice $\Lambda_M \subset \mathbb{Z}^2$ with $\mathrm{vol}(\Lambda_M) \geq 3$, and henceforth consider admissible generators.

A Lattice Model for Color Filter Arrays:

Our goal is first to analyze pure-color CFAs comprising disjoint sampling patterns of red, green, and blue. To this end, recall that in a single-sensor camera, a scalar measurement is made at each spatial location $n \in \mathbb{Z}^2$, leading to an idealized, noise-free model in which the sensor measurement $y(n)$ can be expressed as the inner product of the true color image triple $x(n) := [x_r(n), x_g(n), x_b(n)]^T$ and the action of the CFA $c(n) := [c_r(n), c_g(n), c_b(n)]^T$ as follows:

$$y(n) = c(n)^T x(n), n \in \mathbb{Z}^2. \quad (A)$$

Recall that by our description, a pure-color CFA $\{c(n):n \in \mathbb{Z}^2\}$ comprises a regular, repeating pattern that measures only a single component of the color triple at each spatial location, and hence its elements are represented by the standard basis.

Our example of a model for the geometry of a pure-color CFA will thus be a vector-valued indicator function expressed in the language of lattices. We wish to partition $\mathbb{Z}^2$ into three structured sampling sets, each of which will be written as a union of selected cosets of a given sublattice $\Lambda_M \subset \mathbb{Z}^2$. This notion accounts for the color triple associated with each pixel. To this end, in one example, let M denote an admissible generator for sublattice $\Lambda_M \subset \mathbb{Z}^2$, and let $\Psi_r$, $\Psi_g$, $\Psi_b$ represent mutually exclusive subsets of coset vectors associated respectively with the spatial sampling locations of colors red, green, and blue. If $\mathbb{Z}^2$ can be written as the disjoint union of the three interleaved sampling structures $\Psi_r+\Lambda_M$, $\Psi_g+\Lambda_M$, and $\Psi_b+\Lambda_M$, each one comprising a union of selected cosets as $\{\Psi+\Lambda_M\}:=\cup_{\psi\in\Psi}\{\psi+\Lambda_M\}$, then we call the result a 3-partition of $\mathbb{Z}^2$. Note that, since under this scenario every sensor measures exactly one color, it suffices to specify $(M,\Psi_r,\Psi_b)$, from which we can obtain the coset vectors $\Psi_g$ accordingly and can be used in luminance/chrominance parameterization.

Using a 3-partition of $\mathbb{Z}^2$ to be one model for pure-color sampling, in contrast to the new panchromatic CFA designs we introduce later. The sampling structure of the purecolor CFA associated with 3-partition $(M,\Psi_r,\Psi_b)$ is then defined pointwise as follows:

$$c(n) = \begin{bmatrix} c_r(n) \\ c_g(n) \\ c_b(n) \end{bmatrix} = \begin{bmatrix} \sum_{n_0 \in \{\Psi_r+\Lambda_M\}} \delta(n-n_0) \\ \sum_{n_0 \in \{\Psi_g+\Lambda_M\}} \delta(n-n_0) \\ \sum_{n_0 \in \{\Psi_b+\Lambda_M\}} \delta(n-n_0) \end{bmatrix}, \quad (B)$$

in this example we let $\delta(\cdot)$ denote the Dirac or Kronecker delta function, as indicated by sampling context. Pure-color CFAs hence perform a spatio-chromatic subsampling that effectively multiplexes red, blue, and green components in the spatial frequency domain—leading to the image recovery task known as demosaicking. However, because the spatio-spectral content of these color channels tends to be correlated at high spatial frequencies, representations that avoid this correlation are often employed in contemporary demosaicking algorithms. In this example we exploit a luminance/chrominance representation common in the literature to simplify our lattice model for pure-color CFAs. Following the measurement model of (A), each pixel sensor measurement may equivalently be represented in terms of a green channel $x_g$ and difference channels $x_\alpha := x_r - x_g$ and $x_\beta := x_b - x_g$:

$$\begin{aligned} y(n) &= c(n)^T I x(n) \\ &= c(n)^T \begin{bmatrix} 1 & 1 & 0 \\ 0 & 1 & 0 \\ 0 & 1 & 1 \end{bmatrix} \begin{bmatrix} 1 & -1 & 0 \\ 0 & 1 & 0 \\ 0 & -1 & 1 \end{bmatrix} x(n) \\ &= [c_r(n) \; 1 \; c_b(n)] \begin{bmatrix} x_\alpha(n) \\ x_g(n) \\ x_\beta(n) \end{bmatrix}. \end{aligned} \quad (C)$$

One feature of this particular representation is that these difference channels enjoy rapid spectral decay and can serve as a proxy for chrominance, whereas the green channel can be taken to represent luminance. As our eventual image recovery task will be to approximate the true color image triple $x(n)$ from acquired sensor data $y(n)$, note that recovering either representation of $x(n)$ is equivalent. Moreover, the representation of (c) allows us to re-cast the pure-color sampling structure of (B) in terms of sampling structures associated with the difference channels $x\alpha$ and $x\beta$.

Fourier Analysis of Pure-Color CFAs:

It is known how to compute the Fourier representation induced by the spatial subsampling of certain CFA patterns, however, we provide for a Fourier representation of all rectangular, periodic, pure-color CFAs in terms of the sublattice $\Lambda_M$ associated with a given 3-partition $(M, \Psi_r, \Psi_b)$ of $\mathbb{Z}^2$. Owing to their Abelian structure, lattices admit the notion of a Fourier transform as specified by a dual or reciprocal lattice. The spectral periodicity properties of a color image sampled along a lattice $\Lambda_M$ are determined by its dual lattice $\hat{\Lambda}_M$ (the Poisson summation formula being a simple univariate example), thereby enabling characterization of the effect on individual color channels of the spatio-spectral sampling induced by various CFA patterns.

According to the discrete and periodic nature of repeating pure-color CFA sampling patterns, in one example, the dual lattice $\hat{\Lambda}_M$ defines a unit cell about the origin in $\mathbb{R}^2$ with associated volume $\mathrm{vol}(\hat{\Lambda}_M) = (2\pi)^2/\mathrm{vol}(\Lambda_M)$, copies of which in turn form a tessellation of the spatial frequency plane. Under our normalization of the Fourier transform, the dual lattice $\hat{\Lambda}_M = 2\pi M^{-T}\mathbb{Z}^2$ associated with an admissible sampling matrix M will in turn admit $2\pi\mathbb{Z} \times 2\pi\mathbb{Z}$ as a sublattice. As a model for sensor geometry is the lattice $\mathbb{Z}^2$, it thus suffices to restrict attention to dual lattice points contained in the unit cell $[-\pi, \pi) \times [-\pi, \pi)$ in the spatial frequency plane.

A result that follows is the characterization of the spatio-spectral properties of images acquired under pure-color CFAs. Let $\mathcal{F}x$ denote the two-dimensional Fourier transform operator applied to $x(n)$, with $X(\omega) := \mathcal{F}x$ parameterized by angular frequency $\omega \in \mathbb{R}^2$. Then from (2) and (3), we have that the Fourier transform of sensor data $y(n)$ over dual lattice points contained in the unit cell $[-\pi, \pi) \times [-\pi, \pi)$ is given by:

$$Y(\omega) = X_g(\omega) + \frac{1}{\mathrm{vol}(\Lambda_M)} \sum_{\lambda \in \{\hat{\Lambda}_M \cap [-\pi,\pi)^2\}} \cdot \left( \sum_{\psi \in \Psi_r} e^{-j\psi^T \lambda} X_\alpha(\omega - \lambda) + \sum_{\psi \in \Psi_b} e^{-j\psi^T \lambda} X_\beta(\omega - \lambda) \right). \quad (D)$$

Thus we see that the lattice structure of the chosen 3-partition induces spectral copies of the difference channels $x_\alpha$ and $x_\beta$ centered about the set of carrier frequencies $\{\hat{\Lambda}_M \cap [-\pi, \pi)^2\}$. As restrictions of lattices, these sets will always include the origin—corresponding to "baseband" copies of the respective difference channels. In this manner (D) may be interpreted as specifying a baseband "luminance" signal $$X_l(\omega) := X_g(\omega) + \frac{|\Psi_r|}{\mathrm{vol}(\Lambda_M)} X_\alpha(\omega) + \frac{|\Psi_b|}{\mathrm{vol}(\Lambda_M)} X_\beta(\omega).$$

with the remainder of its terms comprising lower-bandwidth "chrominance" information modulated away from the origin. Recalling the interpretation of $\mathrm{vol}(\Lambda_M)$ as the maximum number of distinct colors supported by a given CFA, we see that the ratios of color components comprising luminance information depend directly on $|\Psi_r|$ and $|\Psi_b|$, the number of coset vectors associated with difference channels $x_\alpha$ and $x_\beta$.

An example of the baseband signal $X_l(\omega)$ corresponding to a typical color image is shown in FIG. 19(e); the locations of spectral replicates modulated away from the origin are shown in FIG. 18 for several 3-partitions corresponding to pure-color CFA patterns in wide use. From these examples, it may be seen that aliasing occurs whenever there is pairwise overlap of the spectral supports of $X_g(\omega)$, $\{X_\alpha(\omega-\lambda):\lambda \neq 0\}$, and $\{X_\beta(\omega-\lambda):\lambda \neq 0\}$, for $\lambda \in \{\hat{\Lambda}_M \cap [-\pi, \pi)^2\}$. In the absence of aliasing, chrominance information can be successfully "demodulated" and then used to recover $X_g(\omega)$ from the baseband luminance channel $X_l(\omega)$ via standard filtering techniques; however, for each instance depicted in FIG. 18, the placement of chrominance information in the spatial frequency plane is seen to result in aliasing.

FIG. 19(a)-(f) shows the log-magnitude spectra of color channels of the "lighthouse" image, showing the contrast in bandwidth between the $(x_r, x_g, x_b)$ representations and a chrominance/luminance representation in terms of $(X_\alpha, X_l, X_\beta)$.

Further inspection confirms each of these patterns is sub-optimal from an aliasing perspective—a notion discussed in more detail below. By making precise the minimal assumptions on color channel bandwidths necessary, the sub-optimality may be further demonstrated in another example:

Assumption 1 (Bounded Bandwidth): Assume the supports of $(X_g, X_\alpha, X_\beta)$ to be bounded, such that the associated luminance and chrominance channels comprising (D) are contained in balls of radii $r_l < \pi$ and $r_c < \pi$, respectively.

Assumption 2 (Total Bandwidth): Assume $r_l + r_c > \pi$. This implies that the physical resolution of one example of an image sensor is such that aliasing may in fact occur, depending on the placement of chrominance information in the Fourier domain.

Assumption 3 (Relative Bandwidth): Assume $r_l > r_c$. This is consistent with known empirically reported results, and follows the known correlation of color channels.

These assumptions imply that in order to maximize the allowable spectral radii $r_l$ and $r_c$ subject to the zero-aliasing constraint required for perfect reconstruction, spectral replicates representing chrominance information should be placed along the perimeter of the unit cell $[-\pi, \pi) \times [-\pi, \pi)$ in the spatial frequency plane. The CFA patterns of FIGS. 2(d-f) and 2(i-k) may be seen by inspection to violate this condition.

Moreover, it follows from Assumption 3 that the least optimal placement of spectral replicates along this perimeter is about the points $(-\pi, 0)$ and $(0, -\pi)$—as these points minimize the maximum allowable spectral radii. As may be seen in FIGS. 18(a-c) and 18(g,h,j,k), the popular Bayer pattern and many others are sub-optimal from this perspective. Moreover, by reducing allowable channel bandwidth along the coordinate axes, these patterns are sensitive to the very horizontal and vertical features which frequently dominate typical known images.

Sub-Optimality of Pure-Color CFAs:

Neither pure-color nor panchromatic CFA designs currently in use are optimal from the perspective of spatial aliasing. No periodic, pure-color CFA design can ever attain optimality—a fact reflected by the failure in practice of simple linear reconstruction methods when used with such patterns. In essence, these patterns determine a lattice that packs luminance and chrominance information into the unit cell $[-\pi, \pi) \times [-\pi, \pi)$. The above spatiospectral analysis confirms—that a sphere-packing strategy is required, rather than the sphere-filling approach of current patterns. Accordingly, in one approach we first exhibit the spatio-spectral requirements necessary to maximize the allowable spectral radii $r_l$ and $r_c$, subject to the constraint of zero aliasing. To this end, in one example apply Assumptions 1-3, to a proper sublattice $\Lambda_M \subset \mathbb{Z}^2$ along with a set $\Psi$ of associated coset vectors.

Proposition 1 (Bandwidth Maximization): Amongst all sets $\{\Psi + \Lambda_M\}$, those that maximize $|r_l| + |r_c|$ subject to the constraint of zero aliasing take the following form: for every $\lambda \in \{\hat{\Lambda}_M \cap [-\pi,\pi)^2\} \setminus \{(\check{0},0)\}$ such that $\Sigma_{\psi \in \Psi} \exp(-j\psi^T\lambda) \neq 0$, we have that $\|\lambda\|_\infty = \pi$ and $\lambda \notin \{(-\pi, 0), (0, -\pi)\}$.

In this example, (D) shows that dual lattice points $\lambda \neq (0,0)$ associated with nonzero weights $\Sigma_{\psi \in \Psi} \exp(-j\psi^T\lambda)$ represent "carrier frequencies" for chrominance information. The proposition thus specifies that in order to simultaneously maximize the allowable bandwidth of luminance and chrominance, all such carrier frequencies contained in the Fourier-domain unit cell $[-\pi, \pi)^2$ must be placed maximally far from the origin.

Proof: Consider radii $r_l$ and $r_c$ as rays in the Cartesian plane which define balls representing the respective maximal directional bandwidths of luminance and chrominance information, as per Assumption 1. A sole ball representing luminance is centered about the origin, and each chrominance ball is taken to be centered around a candidate lattice point $\lambda \in [-\pi, \pi)^2 \setminus \{(0,0)\}$ for which $\Sigma_{\psi \in \Psi} \exp(-j\psi^T \lambda) \neq 0$. We then seek the set of $\lambda$ yielding an arrangement that admits, with no intersection of spheres, the maximal $|r_l|+|r_c|$.

Assumption 3 ($r_l > r_c$) in turn implies, for this example, that we need only consider the case of chrominance-luminance aliasing, rather than chrominance-chrominance aliasing. Noting that $|r_l + r_c| \leq |r_l| + |r_c|$, with equality if and only if $r_l$ and $r_c$ are collinear, we may therefore take $r_l$ to be a ray emanating from the origin, and $r_c$ to be a collinear ray emanating from any other candidate point $\lambda$. For any angle taken by rays $|r_l|$ and $|r_c|$, the maximum of $|r_l+r_c|=|r_l|+|r_c|$ attained by $\{\lambda \in [-\pi,\pi)^2 : \|\lambda\|_\infty = \pi\}$. Amongst all members of this set, Assumption 2 ($r_l+r_c > \pi$) excludes the set of points $\{(-\pi, 0), (0,-\pi)\}$, and the proposition is proved.

According to another example, the following proposition in turn provides an upper bound on the volume of any sublattice $\Lambda_M \subset \mathbb{Z}^2$ satisfying the condition for bandwidth maximization specified by Proposition 1:

Proposition 2 (Volume Limitation): Let $(M, \Psi)$ determine a sampling set $\{\Psi + \Lambda_M\}$ taking the bandwidth-maximizing form of Proposition 1. Then $\mathrm{vol}(\Lambda_M) \leq 2|\Psi|$.

The proof of this proposition follows:

Define $c(n) = \Sigma_{n_0 \in \{\Psi+\Lambda_M\}} \delta(n-n_0) \in \{0,1\}$, according to our definition of a pure-color CFA. The bandwidth maximization requirement set forth in Proposition 1 implies a unique Fourier reconstruction in $\omega=(\omega_1, \omega_2)$ as $$c(n) = \mathcal{F}^{-1}\left\{ \mathrm{vol}(\Lambda_M)^{-1} \sum_{\lambda \in \{\tilde{\Lambda}_M \cap [-\pi,\pi)^2\}} \sum_{\psi \in \Psi} e^{-j\psi^T \lambda} \delta(\omega - \lambda) \right\}$$

$$= \mathcal{F}^{-1}\left\{ \mathrm{vol}(\Lambda_M)^{-1} \sum_{\psi \in \Psi} \sum_{\lambda \in \{\tilde{\Lambda}_M \cap \Omega_0 \cup \Omega_1 \cup \Omega_2 \cup \Omega_3\}} e^{-j\psi^T \lambda} \delta(\omega - \lambda) \right\}.$$

where Proposition 1 implies that the allowable domain of $\lambda$ in the spatial frequency plane is described by the following four mutually exclusive sets:

$\Omega_0 = 2\pi \mathbb{Z}^2$, $\Omega_1 = \left\{ \lambda : \lambda \in \begin{bmatrix} \omega_1 \\ -\pi \end{bmatrix} + 2\pi \mathbb{Z}^2, \omega_1 \in (-\pi, \pi), \omega_1 \neq 0 \right\}$, $\Omega_2 = \left\{ \lambda : \lambda \in \begin{bmatrix} -\pi \\ \omega_2 \end{bmatrix} + 2\pi \mathbb{Z}^2, \omega_2 \in (-\pi, \pi), \omega_2 \neq 0 \right\}$, $\Omega_3 = \begin{bmatrix} -\pi \\ -\pi \end{bmatrix} + 2\pi \mathbb{Z}^2$.

Because the set $\{\Omega_i \cap [-\pi,\pi)^2\}$ consists of either a point or two disjoint line segments for all $i$, the resultant inverse Fourier transform simplifies as follows:

$$c(n) = \sum_{i=0}^{S} \sum_{\psi \in \Psi} \sum_{\lambda \in \{\tilde{\Lambda}_M \cap \Omega_i \cap [-\pi,\pi)^2\}} e^{j n^T \lambda} \frac{e^{-j\psi^T \lambda}}{\mathrm{vol}(\Lambda_M)}$$

$$= e^{j0} \sum_{\psi \in \Psi} \sum_{\lambda = (0,0)} \frac{e^{-j\psi^T \lambda}}{\mathrm{vol}(\Lambda_M)} +$$

$$e^{j\pi n_2} \sum_{\psi \in \Psi} \sum_{\substack{\lambda_1 \in (-\pi,\pi), \lambda_1 \neq 0 \\ (\lambda_1, \pi) \in \tilde{\Lambda}_M}} \frac{e^{j(n_1 - \psi_1)\lambda_1 - j\psi_2 \pi}}{\mathrm{vol}(\Lambda_M)} +$$

$$e^{j\pi n_1} \sum_{\psi \in \Psi} \sum_{\substack{\lambda_2 \in (-\pi,\pi), \lambda_2 \neq 0 \\ (\pi, \lambda_2) \in \tilde{\Lambda}_M}} \frac{e^{j(n_2 - \psi_2)\lambda_2 - j\psi_1 \pi}}{\mathrm{vol}(\Lambda_M)} +$$

$$e^{j\pi(n_1 + n_2)} \sum_{\psi \in \Psi} \sum_{\lambda = (\pi,\pi)} \frac{e^{-j\psi^T \lambda}}{\mathrm{vol}(\Lambda_M)}$$

$$= f_0 + (-1)^{n_2} f_1(n_1) + (-1)^{n_1} f_2(n_2) + (-1)^{n_1+n_2} f_3,$$

where $f_i$ denotes $\Sigma_\psi$ in each respective term.

We now enumerate all scenarios concerning $\{f_i\}_{i=0}^3$, and show that $\mathrm{vol}(\Lambda_M) \leq 2|\Psi|$ in every possible case. First, suppose $f_1$ and $f_2$ to be non-zero functions. Then it is easy to verify, using $(0,0),(\pi,\pi) \notin \Omega_1 \cup \Omega_2$, that there exists indices n', n''$\in \mathbb{Z}^2$ such that $f_1(2n'_1) \neq f_1(2n''_1)$ and $f_2(2n'_2) \neq f_2(n''_2)$. If we let $c(n')=1$ without loss of generality, then $f_0+f_3+f_1(2n'_1)+f_2(2n'_2) \neq f_0+f_3+f_1(2n'_1)+f_2(2n''_2)=0$ $f_0+f_3+f_1(2n'_1)+f_2(2n'_2) \neq f_0+f_3+f_1(2n''_1)+f_2(2n'_2)=0$ $f_0+f_3+f_1(2n''_1)+f_2(2n'_2) \neq f_0+f_3+f_1(2n''_1)+f_2(2n''_2)=1.$ Otherwise put, it is shown that:

$$f_0 + f_3 + \begin{bmatrix} 1 & 0 & 1 & 0 \\ 1 & 0 & 0 & 1 \\ 0 & 1 & 1 & 0 \\ 0 & 1 & 0 & 1 \end{bmatrix} \begin{bmatrix} f_1(2n'_1) \\ f_1(2n''_1) \\ f_2(2n'_2) \\ f_2(2n''_2) \end{bmatrix} = \begin{bmatrix} 1 \\ 0 \\ 0 \\ 1 \end{bmatrix} \quad (J)$$

$$\Rightarrow \begin{bmatrix} 1 & 0 & 1 & 0 \\ 1 & 0 & 0 & 1 \\ 0 & 1 & 1 & 0 \\ 0 & 1 & 0 & 1 \end{bmatrix} \begin{bmatrix} f_1(2n'_1) \\ f_1(2n''_1) \\ f_2(2n'_2) \\ f_2(2n''_2) \end{bmatrix} = \begin{bmatrix} 1 - f_0 - f_3 \\ -f_0 - f_3 \\ -f_0 - f_3 \\ 1 - f_0 - f_3 \end{bmatrix}$$

The 4×4 matrix above is rank 3 and its column space is orthogonal to $(-1, 1, 1, -1)$. However, the inner product of $(-1, 1, 1, -1)$ and $(1, 0, 0, 1)-f_0-f_3$ is non-zero regardless of the values of f0 and f3:

$(-1,1,1,-1)((1,0,0,1)-f_0-f_3)^T = -2(1-f_0-f_3) + 2(-f_0-f_3) = -2 \neq 0.$

We conclude that the equality above cannot hold, and thus obtain a direct contradiction to the hypothesis that $f_1$ and $f_2$ are both non-zero functions.

We next consider all remaining scenarios. Suppose first that $f_1$ is a non-zero function and $f_2$ is zero (or equivalently $f_2$ non-zero and $f_1$ zero). Then:

$c(n) = f_0 + (-1)^{n_2} f_1(n_1) + (-1)^{n_1+n_2} f_3$ $= f_0 + (-1)^{n_2}(f_1(n_1) + (-1)^{n_1} f_3).$

Because $f_0+(f_1(n_1)+(-1)^{n_1}f_3) \neq f_0-(f_1(n_1)+(-1)^{n_1}f_3)$, we conclude that $c(n)=1-c(n_1, n_2+1)$, or equivalently, $vol(\Lambda_M)=2|\Psi|$. If instead, we have that $f_1$, $f_2$ are zero and $f_3$ non-zero, then (M, $\Psi$) determines quincunx sampling, whereupon $vol(\Lambda_M)=2|\Psi|$. Lastly, if $f_1$, $f_2$, $f_3$ are zero, then $\Lambda_M$ is an integer lattice, and we have that $vol(\Lambda_M)=|\Psi|$. Hence we see that in all possible cases, $vol(\Lambda_M) \leq 2|\Psi|$.

Together, Propositions 1 and 2 imply the sub-optimality of periodic, pure-color CFA designs with respect to aliasing considerations. Indeed, a surprising result follows from these propositions, that any such design that seeks to maximize the allowable spectral radii of luminance and chrominance cannot simultaneously admit three distinct colors. To illustrate, suppose in one example that a 3-partition (M, $\Psi_r$, $\Psi_b$) is designed such that mutually exclusive sampling sets $\{\Psi_r+\Lambda_M\}$ and $\{\Psi_b+\Lambda_M\}$ both satisfy the conditions of Proposition 1. Then by Proposition 2 we have that $vol(\Lambda_M) \leq |\Psi_r|+|\Psi_b|$, but it follows from our earlier definition of a 3-partition that $vol(\Lambda_M)=|\Psi_r|+|\Psi_g|+|\Psi_b|$. Thus the set of coset vectors $\Psi_g$ indexing the sampling of the third color component must be empty.

Aliased Sensor Data and Demosaicking

The preceding discussion confirms the sub-optimality of all periodic, pure-color CFA patterns with respect to the metric of spatial aliasing. However, owing to the prevalence of the Bayer pattern in currently manufactured still and video digital cameras, much attention in this field has been given to the problem of demosaicking color images acquired in this manner. As is known, an ideal demosaicking solution should exhibit two main traits: low computational complexity for efficient hardware implementation, and amenability to analysis for accurate color fidelity and noise suppression. For instance, in the absence of further assumptions on the relationships between tristimulus values, the optimal linear reconstruction is indicated by an orthogonal projection onto the space of bandlimited functions, applied separately to each subsampled color channel. However, it is well known that this solution produces unacceptable artifacts, as aliasing prevents perfect reconstruction (see FIGS. 4(a), (b) and FIG. 20(a)). Recalling FIGS. 17 and 18, this aliasing problem follows from the sub-optimality of purecolor CFAs with respect to aliasing.

As such, most known demosaicing algorithms described in the literature make use (either implicitly or explicity) of correlation structure in the spatial frequency domain, often in the form of local sparsity or directional filtering. As noted in our earlier discussion, the set of carrier frequencies induced by the Bayer pattern includes $(-\pi, 0)$ and $(0,-\pi)$, locations that are particularly susceptible to aliasing by horizontal and vertical edges. FIGS. 4(a) and 4(b) indicate these scenarios, respectively; it may be seen that in contrast to the radially symmetric baseband spectrum of FIG. 20(a), representing the idealized spectral support of the channels $(x_g, x_a, x_b)$ of a color image acquired under the Bayer pattern, chrominance-luminance aliasing occurs along one of either the horizontal or vertical axes. However, successful reconstruction can still occur if a non-corrupted copy of this chrominance information is recovered, thereby explaining the popularity of known (nonlinear) directional filtering steps. CFA design can be view as a problem of spatial frequency multiplexing, and the CFA demosaicking problem as one of demultiplexing to recover subcarriers, with spectral aliasing given the interpretation of "cross talk."

As discussed above, it is fair to conclude that existing linear interpolation schemes often lead to undesirable (and commercially unacceptable) distortion and visual artifacts. However, more sophisticated schemes are typically highly nonlinear and can be costly to implement in typical ASIC and DSP hardware environments. Moreover, nonlinear techniques, such as those requiring local edge detection, further exacerbate the problem of characterizing (and hence mitigating) the various sources of noise associated with the image acquisition process. Robustness of the detection variable, sensitivity to noise, and overall model accuracy all affect the quality of reconstruction. As is known, recent works have demonstrated the inadequacies of treating the denoising and interpolation tasks separately and has led to a number of methods designed to treat these problems jointly.

Figure 5B:
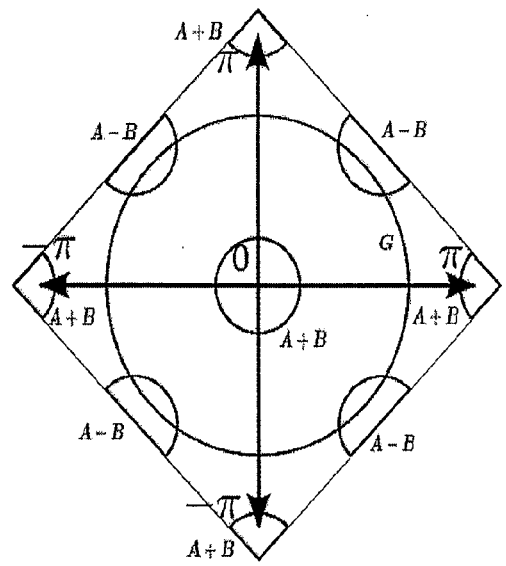
Figure 5C:
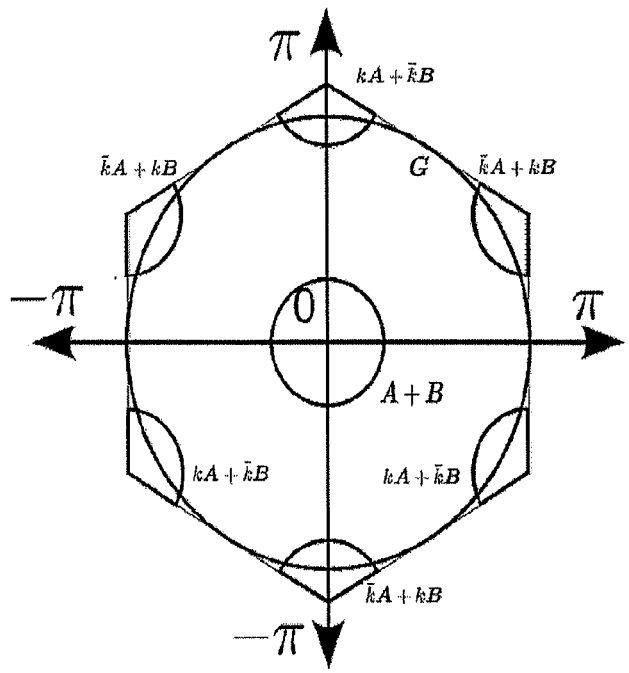

In one aspect of the present invention, it is recognized that octagonal and hexagonal sampling using Bayer patterns or other traditional CFA patterns may also have similar problems. Motivated by the density of pixel sensors on a CMOS/CCD sensor chip, octagonal and hexagonal sampling have been suggested as improvements to traditional CFAs. Octagonal sampling is often implemented as a forty-five degree rotation of Bayer patterned sampling scheme. While the horizontal and vertical axes in the frequency domain will be less subject to aliasing, we expect similar aliasing problems arising overall, as illustrated in FIG. 5B. Hexagonal sampling, which also densely packs pixel sensors, has the advantage of sampling an equal number of red, green, and blue pixel components that are uniformly distributed over the surface of the sensor chip, but a disadvantage that the sampling rates in the horizontal and vertical directions differ. Its Fourier representation is found in FIG. 5C.

In one aspect of the present invention, it is recognized that by considering the spectral wavelength sampling requirements as well as the spatial sampling requirements associated with the image acquisition process, we may conceive of a new paradigm for designing color filter array patterns. In some embodiments, the CFA pattern may be used as means to modulate the image signals in the frequency domain and may thereby aid in preventing the frequency components needed for the reconstruction of the image from aliasing (e.g., overlapping). Embodiments of the invention may offer the potential to significantly reduce hardware complexity in a wide variety of applications, while at the same time improving output color image quality.

According to one aspect, the sub-optimality of periodic, pure-color CFA designs discussed above, yields the optimal periodic designs of CFA patterns as necessarily panchromatic. In one example, assuming a regular, repeating rectangular pattern, and putting aside issues of white-balancing and sensor noise, the analysis discussed above motivates consideration of linear combinations of prototype pure-color filters, rather than restricting the values $c_r(n)$, $c_g(n)$, $c_b(n)$ to the set $\{0, 1\}$ implied by pure-color designs. Hence, we let $0 \leq c_r(n)$, $c_g(n)$, $c_b(n) \leq 1$ indicate the array, with each value now representing a mixture of colors.

Though panchromaticity implies that the notion of a 3-partition (M,$\Psi_r$,$\Psi_b$) and its associated lattice structure no longer applies, use of the Fourier-domain principles introduced above permit direct specification of the chrominance carrier frequencies $\lambda_i$ of interest. In this manner the optimality condition of Proposition 1 may be fulfilled, whereupon in certain embodiments, the risk of aliasing is reduced and hence overall image integrity is better preserved by the sensor data. Image data acquired in this manner can be shown as easily manipulated, enjoying simple reconstruction schemes, and admitting favorable computation quality trade-offs with respect to subsequent processing in the imaging pipeline.

Examples of Optimal Panchromatic CFA Design Methodologies

In one example, outlined is a method of spatio-spectral CFA design that satisfies the bandwidth maximization property of Proposition 1. First, define $c_\alpha(n):=(c_r(n)-\mu_\alpha)/\rho$, and $c_\beta(n):=(c_b(n)-\mu_\beta)/\rho$, where $\mu_\alpha$ and $\mu_\beta$ are the DC components of $c_r$ and $c_b$, respectively, and $\rho$ and $\gamma$ are constants whose role as design parameters will be discussed in greater detail below. By imposing the convexity constraint $c_r+c_g+c_b=\gamma$, (C) becomes:

$$y(n) = [c_r(n) \; \gamma \; c_b(n)] \begin{bmatrix} x_\alpha(n) \\ x_g(n) \\ x_\beta(n) \end{bmatrix}$$

$$= \begin{bmatrix} c_r(n) \\ \gamma \\ c_b(n) \end{bmatrix}^T \begin{bmatrix} 1 & 0 & 0 \\ -\frac{\mu_\alpha}{\gamma} & 1 & -\frac{\mu_\beta}{\gamma} \\ 0 & 0 & 1 \end{bmatrix} \begin{bmatrix} 1 & 0 & 0 \\ \frac{\mu_\alpha}{\gamma} & 1 & \frac{\mu_\beta}{\gamma} \\ 0 & 0 & 1 \end{bmatrix} \begin{bmatrix} x_\alpha(n) \\ x_g(n) \\ x_\beta(n) \end{bmatrix}$$

$$= [\rho c_\alpha(n) \; \gamma \; \rho c_\beta(n)] \begin{bmatrix} x_\alpha(n) \\ x_l(n) \\ x_\beta(n) \end{bmatrix},$$

where $x_l(n)=x_g(n)+(\mu_\alpha/\gamma)x_\alpha(n)+(\mu_\beta/\gamma)x_\beta(n)$ is now the baseband signal that can be taken to represent luminance. Recalling the lowpass properties of $x_\alpha(n)$ and $x_\beta(n)$, formulation of the CFA design problem enables modulation of these terms via multiplication with $c_\alpha(n)$ and $c_\beta(n)$ such that the Fourier transforms of the frequency-modulated difference images are maximally separated from the baseband spectrum $X_l = \mathcal{F} x_l$. In this example, assume that the Fourier transforms of $c_\alpha$ and $c_\beta$, respectively, take the form:

$$\begin{cases} C_\alpha(\omega) = \sum_i [s_i \delta(\omega+\lambda_i) + \bar{s}_i \delta(\omega-\lambda_i)] \\ C_\beta(\omega) = \sum_i [t_i \delta(\omega+\lambda_i) + \bar{t}_i \delta(\omega-\lambda_i)], \end{cases} \quad (E)$$

where $\bar{\cdot}$ denotes complex conjugation, $\lambda_i \in \mathbb{R}^2$ the carrier frequencies, and $s_i, t_i \in \mathbb{C}$ the corresponding weights (with conjugate symmetry ensuring that the resultant $c_\alpha$ and $c_\beta$ are real-valued). It follows that the observed sensor data y is the sum of $X_l$ and the modulated versions of $X_\alpha$ and $X_\beta$:

$$Y(\omega) = \gamma X_l(\omega) + \rho \sum_i \begin{bmatrix} (s_i X_\alpha + t_i X_\beta)(\omega+\lambda_i) + \\ (\bar{s}_i X_\alpha + \bar{t}_i X_\beta)(\omega-\lambda_i) \end{bmatrix} \quad (F)$$

This example enables the specification of CFA design parameters directly in the Fourier domain, by way of carrier frequencies $\{\lambda_i\}$ and weights $\{s_i, t_i\}$. In keeping with Proposition 1, the restriction $\|\lambda_i\|_\infty = \pi$ and $\lambda_i \notin \{(-\pi,0), (0,-\pi)\}$, is enforced. Determination of the resultant color filters as a function of parameters $\mu_\alpha, \mu_\beta, \rho, \gamma$ then follows from inverse Fourier transforms $c_\alpha = \mathcal{F}^{-1} C_\alpha$ and $c_\beta = \mathcal{F}^{-1} C_\beta$:

$c_r(n) = \rho c_\alpha(n) + \mu_\alpha$, $c_b(n) = \rho c_\beta(n) + \mu_\beta$, $c_g(n) = \gamma - c_r(n) - c_b(n)$.

In certain embodiments, it is necessary to ensure physical realizability of the resultant CFA. (Requiring $0 \leq c_r(n)$, $c_g(n)$, $c_b(n) \leq 1$.) To accomplish this, in one embodiment, first define $v_\alpha := \min_n c_\alpha(n)$, $v_\beta := \min_n c_\beta(n)$, and $\kappa := \max_n (c_\alpha(n)+c_\beta(n))$. By assigning $$\rho^{-1} = \max_n (c_\alpha(n) - v_\alpha, \; c_\beta(n) - v_\beta, \; \kappa - c_\alpha(n) - c_\beta(n));$$

$$\mu_\alpha = -\rho v_\alpha, \; \mu_\beta = -\rho v_\beta, \; \gamma = \rho(\kappa - v_\alpha - v_\beta),$$

it follows that a resultant CFA design may be expressed as $c_r(n) = \rho(c_\alpha(n) - v_\alpha)$ $c_b(n) = \rho(c_\beta(n) - v_\beta)$ $c_g(n) = \rho(\kappa - c_\alpha(n) - c_\beta(n))$.

In this example, the offsets $\mu_\alpha$ and $\mu_\beta$ ensure nonnegativity of $c_r$ and $c_b$, because $\rho c_\alpha \geq -\mu_\alpha$ and $\rho c_\beta \geq -\mu_\beta$. The constant $\gamma$ guarantees nonnegativity of $c_g$, because $c_g = \gamma - c_r - c_b$ and $\rho \kappa \geq \rho(c_\alpha + c_\beta)$. Finally, the maximum value of $c_r(n)$, $c_g(n)$, $c_b(n)$ is equal to 1, owing to the multiplier $\rho$.

According to one aspect, robustness to aliasing is achieved via ensuring that spectral replicates lie along the perimeter of the Fourier-domain region $B=[-\pi,\pi)\times[-\pi,\pi)$ while avoiding the values $[-\pi,0]^T$ and $[0,-\pi]^T$ along the horizontal and vertical axes, our spatio-spectral CFA design aims, in some embodiments, to preserve the integrity of the color image signal in the sensor data. Image data acquired this way are easily accessible, enjoy simple reconstruction schemes, and admit favorable computation-quality trade-offs that have the potential to ease subsequent processing in the imaging pipeline.

For one embodiment, let $0 \leq c_r(n), c_g(n), c_b(n) \leq 1$ indicate the CFA projection values at a particular spatial location, where $c_r(n), c_g(n), c_b(n)$ now assume continuous values and hence represent a mixture of prototype channels. With the additional constraint that $c_r + c_g + c_b = \gamma$, it follows that $$y(n) = c(n)^T x(n) = [c_r(n) \; \gamma \; c_b(n)] \begin{bmatrix} x_\alpha(n) \\ x_g(n) \\ x_\beta(n) \end{bmatrix},$$

and we may determine the modulation frequencies of difference channels $x_\alpha(n)$ and $x_\beta(n)$ by our choice of $c_r(n)$ and $c_b(n)$. Some embodiments may be designed such that Fourier transforms of the frequency-modulated difference images $X_\alpha(\omega-\lambda_r), X_\beta(\omega-\lambda_b)$ are maximally separated from the baseband spectrum $X_g(\omega)$.

In the steps outlined below of an example process, we first specify the carrier frequencies $\{\tau_i\}$ and corresponding weights $s_i, t_i \in \mathbb{C}$ in color filters $c_r, c_b$. Recalling that for constants $v, \kappa$ we have that $\mathcal{F}\{\kappa c_r + v\}(\omega) = \kappa \mathcal{F} c_r(\omega) + v\delta(\omega)$ and noting that the support of the nonzero frequency components in $c_r, C_b$, is unchanged by translation and rescaling, we then manipulate our candidate color filter values until the realizability condition ($0 \leq c_r(n), c_g(n), c_b(n) \leq 1$) is met:

Algorithm 1: CFA Design Example

Specify initial values $\{\tau_i, s_i, t_i\}$. Set modulation frequencies:

$$c_r^{(0)} = \mathcal{F}^{-1} \sum_i s_i \delta(\omega+\tau_i) + \bar{s}_i \delta(\omega-\tau_i)$$

-continued $$c_b^{(0)} = \mathcal{F}^{-1} \sum_i t_i \delta(\omega + \tau_i) + \bar{t}_i \delta(\omega - \tau_i).$$

Add a constant $v_r = \min c_r^{(0)}(n)$, $v_b = \min c_r^{(0)}(n)$ (non-negativity):

$$c_r^{(1)} = c_r^{(0)} - v_r, \quad c_b^{(1)} = c_b^{(0)} - v_b.$$

Scale by $\kappa = (\max_n c_r^{(1)}(n) + c_b^{(1)}(n))^{-1}$ (convex combination):

$$c_r^{(2)} = \kappa c_r^{(1)}, \quad c_b^{(2)} = \kappa c_b^{(1)}.$$

Find green: $c_g^{(2)} = 1 - c_r^{(2)} - c_b^{(2)}$.
Scale by $\gamma = (\max\{c_r^{(2)}(n), c_g^{(2)}(n), c_b^{(2)}(n)\})^{-1}$:

$$c_r = \gamma c_r^{(2)}, \quad c_g = \gamma c_g^{(2)}, \quad c_b = \gamma c_b^{(2)}.$$

FIG. 28(a)-(e) illustrates each step of the algorithm. In particular FIG. 28(a)-(e) illustrates examples of color filter array design visualized in Cartesian coordinates $(c_r, c_b, c_g)$, with the dotted cube representing the space of physically realizable color filters $(0 \leq c_r(n), c_g(n), c_b(n) \leq 1)$. In FIG. 28 Algorithm 1, steps 1-5 are shown as (a)-(e), respectively.

According to the example process, in the first step, the carrier frequencies are determined by taking the inverse Fourier transform of $\delta(\omega \pm \tau_i)$. The symmetry in this step guarantees real-valued color filter array (where • denotes complex conjugation). However, this color filter, in general, may not be physically realizable (some points in FIG. 28(a) fall outside of the first quadrant, for example). In the second step, constants $v_r, v_b$ are subtracted to guarantee non-negativity of color filters (FIG. 28(b)). The scaling by $\kappa$ and the computed values of green in the next two steps place the color filters on the simplex plane to ensure convexity and $\|c\|_\infty \leq 1$ (FIG. 28(c-d)). Finally, the multiplication by $\gamma$ in the last step maximizes the quantum efficiency of the color filters (FIG. 28(e)). And the resultant color filter array is physically realizable.

It follows from simple algebra that the observed sensor data $y$ is the sum of $X_g$ and the modulated versions of $X_\alpha$ and $X_\beta$:

$$Y(\omega) = \gamma X_g(\omega) - \gamma \kappa v_r X_\alpha - \gamma \kappa v_b X_\beta +$$

$$\gamma \kappa \sum_i \{s_i X_\alpha + t_i X_\beta\}(\omega + \tau_i) + (\bar{s}_i X_\alpha + \bar{t}_i X_\beta)(\omega - \tau_i)$$

This example approach enables the specification of CFA design parameters directly in the Fourier domain, by the way of carrier frequencies $\{\tau_i\}$ and weights $\{s_i, t_i\}$. In some embodiment the carrier frequencies satisfy $\|\tau_i\|_\infty = \pi$ and $\tau_i \notin \{(0,\pi), (\pi,0)\}$.

The assumption made in some embodiments of the proposed CFA patterns is the bandlimitedness of the difference images $x_\alpha$ and $x_\beta$, and therefore the robustness of performance may hinge on how well this claim holds (e.g. invariance to the influences of illuminant). In embodiments where the bandlimitedness assumption fails to keep, the increased distance between the baseline signal and the modulated difference images reduces the risk of aliasing significantly, effectively increasing the spatial resolution of the imaging sensor. Consequently, the interpolation is less sensitive to the directionality of the image features and a linear demosaicking method suffices for most applications. Linearization of the demosaicking step is attractive because it can be coded more efficiently in DSP chips, it eliminates the temporal toggling pixel problems in video sequences, it yields more favorable setup for deblurring, and it yields more tractable noise and distortion characterizations.

One important consequence of Algorithm 1 is that the color filter at each pixel location is a mixture of red, green, and blue colors rather than a single color—because color filters are commonly realized by pigment layers of cyan, magenta, and yellow (subtractive colors) dyes over an array of pixel sensors, $\gamma > 1$ suggests a further improvement in terms of quantum efficiency for other embodiments. Furthermore, in some embodiments it is easier to control for sensor saturation because the relative quantum efficiency of the color filter at each pixel location is approximately uniform ($c_r + c_g + c_b = \gamma$).

The space of feasible initialization parameters $\{\tau_i, s_i, t_i\}$ are underconstrained, offering flexibility in optimizing the CFA design according to other desirable characteristics including: demosaicking performance or linear reconstructability, periodicity of CFA pattern, resilience to illuminant spectrum, numerical stability, and quantum efficiency, and some embodiments may incorporate one, some, all or various combinations of such optimizations.

In one embodiment, the conjugate carrier frequencies are $c_\alpha(n) = c_r^{(0)}(n)^{-1}$ and $c_\beta(n) = c_b^{(0)}(n)^{-1}$. When the carrier frequencies are orthogonal, the modulated signal can be recovered by a multiplication by the conjugate carrier frequency followed by a low-pass filter. With a perfect partitioning of $X_g, X_\alpha$, and $X_\beta$ in the frequency domain, an exact reconstruction uses the following scheme:

$$\hat{x}(n) = \begin{bmatrix} \hat{x}_r(n) \\ \hat{x}_g(n) \\ \hat{x}_b(n) \end{bmatrix} \quad\quad (III)$$

$$= \begin{bmatrix} 1 & 1 & 0 \\ 0 & 1 & 0 \\ 0 & 1 & 1 \end{bmatrix} \begin{bmatrix} 1/(\gamma\kappa) & 0 & 0 \\ v_r/\gamma & 1/\gamma & v_b/\gamma \\ 0 & 0 & 1/(\gamma\kappa) \end{bmatrix} \begin{bmatrix} h_\alpha * \{c_\alpha y\} \\ h_g * y \\ h_\beta * \{c_\beta y\} \end{bmatrix},$$

where "*" is a discrete convolution operator and the passbands of the low-pass filters $h_\alpha, h_g, h_\beta$ match the respective bandwidths of the signals $x_\alpha, x_g, x_\beta$.

In one example the camera pipeline can be exploited to reduce the complexity of the reconstruction method greatly. Given the mutual exclusivity of the signals in the Fourier domain, use $c_r^{(0)} h_\alpha + h_g + c_b^{(0)} h_\beta = \delta$, where $\delta(n)$ is a Kronecker delta function. Then using the linearity and modulation properties of convolution, $$h_g * y = (\delta - c_r^{(0)} h_\alpha - c_b^{(0)} h_\beta) * y$$

$$= y - \{c_r^{(0)} h_\alpha\} * y - \{c_b^{(0)} h_\beta\} * y$$

$$= y - c_r^{(0)} \{h_\alpha * \{c_\alpha y\}\} - c_b^{(0)} \{h_\beta * \{c_\beta y\}\}.$$

Then the demodulation in (III) simplifies to:

$$\hat{x}(n) = \begin{bmatrix} 1 & 1 & 0 \\ 0 & 1 & 0 \\ 0 & 1 & 1 \end{bmatrix} \begin{bmatrix} 1/(\gamma\kappa) & 0 & 0 \\ v_r/\gamma & 1/\gamma & v_b/\gamma \\ 0 & 0 & 1/(\gamma\kappa) \end{bmatrix} \quad (IV)$$

$$\begin{bmatrix} 1 & 0 & 0 \\ -c_r^{(0)}(n) & 1 & -c_b^{(0)}(n) \\ 0 & 0 & 1 \end{bmatrix} \begin{bmatrix} h_\alpha * \{c_\alpha y\} \\ y \\ h_\beta * \{c_\beta y\} \end{bmatrix}$$

$$= \begin{bmatrix} 1/(\gamma\kappa) + v_r/\gamma - c_r^{(0)}(n)/\gamma & 1/\gamma & v_b/\gamma - c_b^{(0)}(n)/\gamma \\ v_r/\gamma - c_r^{(0)}(n)/\gamma & 1/\gamma & v_b/\gamma - c_b^{(0)}(n)/\gamma \\ v_r/\gamma - c_r^{(0)}(n)/\gamma & 1/\gamma & 1/\gamma + v_b/\gamma - c_b^{(0)}(n)/\gamma \end{bmatrix}$$

$$\begin{bmatrix} h_\alpha * \{c_\alpha y\} \\ y \\ h_\beta * \{c_\beta y\} \end{bmatrix}.$$

The first term in (IV) is a 3×3 matrix multiplication, which is a completely "pixel-wise" operation, whereas the spatial processing component is contained in the second term. In the usual layout of the digital camera architecture, a color conversion module follows immediately, converting the tristimulus output from demosaicking to a standard color space representation through another 3×3 matrix multiplication on a per pixel basis. The two cascading matrix multiplication steps can therefore be performed together in tandem, where the combined matrix is computed offline and preloaded into the camera system.

With sufficient separation of the modulated signals in the frequency domain, crudely designed low-pass filters are sufficient for the reconstruction task, in some embodiments. One example is implements (IV) using a separable two-dimensional odd-length triangle filter, which is a linear phase filter with a modest cutoff in the frequency domain. A length "2q−1" filter can be implemented by four cascading boxcar filters, which has the following Z-transform:

$$H_\alpha(z) = H_\beta(Z) = \left(\frac{1 - Z_1^{-q}}{1 - Z_1^{-1}}\right)\left(\frac{1 - Z_1^{-q}}{1 - Z_1^{-1}}\right)\left(\frac{1 - Z_2^{-q}}{1 - Z_2^{-1}}\right)\left(\frac{1 - Z_2^{-q}}{1 - Z_2^{-1}}\right), \quad (V)$$

where $Z_1$ and $Z_2$ correspond to delay line in horizontal and vertical directions, respectively. The computational complexity of the above system is 8 adders for $h_\alpha$ and $h_\beta$ each.

Moreover, in examples of 4×4 repeating square patterns for the CFA, the carrier frequencies $c_r^{(0)}$ and $c_b^{(0)}$ are often proportional to sequences of ±1's (and by extension, $c_\alpha$ and $c_\beta$ also). In this case, the multiplication by "−1" before addition in (V) simply replaces adders with subtracters, which is trivial to implement. The overall per-pixel complexity of the demodulation demosaicking in examples implementing (IV) is therefore comparable to that of bilinear interpolation (16 add/subtract operations per full pixel), despite its state-of-the-art image quality performance.

Other Features of Optimal Panchromatic Design Examples

According to one aspect, a feature of the framework is that carrier frequencies $\{\lambda_i\}$ and their weights $\{s_i, t_i\}$ are specified directly, with (E) and (G) ensuring that the resultant CFA is physically realizable. Patterns designed in this manner are panchromatic by definition, as they satisfy the conditions of Proposition 1 yet support three color components; however, as discussed above with respect to Assumptions 1-3, at least some embodiments avoid at least some of the shortcomings of previously proposed panchromatic CFA designs. In one example, the convexity constraint $\gamma = c_r + c_g + c_b$ helps to ensure uniform quantum efficiency of the pixel sensors across the image plane, one consideration in avoiding under- and over-saturated sensor measurements within a single image.

Moreover, CFAs are often implemented as a combination of so-called subtractive colors in practice, in which case the condition maxn(cr(n), cg(n), cb(n))=1, used in at least some embodiments, ensures that as many photons as possible will penetrate the physical filters.

While certain embodiments do not explicitly take into account the effects of different illuminants, Assumption 3 states that the bandwidth of luminance exceeds that of chrominance. Thus, robustness of the resultant patterns to changes in illuminant therefore may hinge on how well this relative bandwidth assumption holds under various lighting conditions. It is expect that designs generated by our approach will be no more sensitive to varying illuminants than existing schemes. Even where certain embodiments violate Assumption 3—causing an increase in aliasing due to the larger spectral support of chrominance information—it is still the case that spectral replicates induced by embodiments of the panchromatic designs are farther from the baseband luminance channel, thereby reducing the risk of chrominance-luminance aliasing effects for the sake of chrominance-chrominance ones.

Specification of CFA patterns satisfying the requirements of Proposition 1 is not unique, as the problem of choosing the parameters $\{\lambda i, s i, t i\}$ in (E) is under-constrained. Based on (G), other embodiments may be generated with a parameter search to determine panchromatic patterns that satisfy (E) and possess other desirable characteristics. Examples of alternative embodiments that optimize other features include:

Periodicity of the CFA pattern:

In one embodiment, constraining components of $\lambda_i$ to be rational multiples of $\pi$ ensures periodicity of the resultant CFA. For example, letting components of $\lambda_i$ be equal to multiples of $\pi/2$ induces a 4×4 pattern.

Numerical stability of CFA design:

In another embodiment, owing to the modulation weights $\{s_i, t_i\}$, the observed sensor data at frequency $\lambda_i$ corresponds to a mixture of difference channels $x_\alpha$ and $x_\beta$. Large singular values for this linear combination ensure their separability via a requisite matrix inversion, while "equal treatment" of $x_\alpha$ and $x_\beta$ is made explicit by setting $|s_i|=|t_i|$.

Resilience to illuminant spectrum:

In yet another embodiment, the mixture of color components that appears in the baseband luminance signal $x_l$ is fixed for any given CFA pattern. Implicitly, therefore, patterns such as Bayer assume a change in illuminant to be a perturbation from the 1:2:1 proportion of red, green, and blue. Following this logic, this baseband luminance can be adjusted to yield a mixture complementing the "average" illuminant color, in order to minimize deviation from it.

Pixel sensor quantum efficiency:

In a further embodiment, as noted above, $\gamma$ is a proxy for the quantum efficiency of the pixel sensors. As a result, CFA designs with large $\gamma$ and $\rho|s_i+t_i|$ values tolerate more noise, and hence are favorable for low-light sensing.

Amenability to linear reconstruction:

In one embodiment, a linear reconstruction method based on demodulation is sensitive to image features oriented orthogonally to carrier frequency vectors $\lambda_i$ (though this sensitivity is reduced relative to pure-color CFA sampling, due to the increased separation of luminance and chrominance information). Decreasing the total number of carriers, and placing them as far from the origin as possible, subject to the avoidance of chrominance-chrominance aliasing, may serve to further mitigate aliasing.

Demosaicking performance:

In another embodiment, using a diverse set of test images and demosaicking methods, color image acquisition and reconstruction can be simulated. A numerical evaluation of the resultant error yields an empirical measure of reconstructability that may be used to refine the CFA design.

The various embodiments implementing different optimizations need not be considered separately, and some embodiments may optimize over a variety of the conditions discussed, various combinations are contemplated, as pairs as well as greater multiples.

Optimal Linear Reconstruction Methodology Examples

A completely linear reconstruction methodology accompanies some examples of new panchromatic CFA patterns, in which the sensor data are subjected to bandpass filtering in order to recover modulated chrominance information and effect a full-color linear reconstruction. It is known that the choice of reconstruction method greatly influences the quality of the output image. Only certain methods have been tested against, however, the CFA design maximizes recoverability by mitigating aliasing effects. In one embodiment, the optimal linear reconstruction method is presented as a reference, in order to compare sensitivity and robustness of various existing and new CFA patterns. The design and optimization of nonlinear demosaicking methods, which have the potential to further improve output image quality, are not addressed.

In one embodiment conjugate modulation sequences are defined: $\bar{c}_\alpha(n) := c_\alpha(n)^{-1}$ and $\bar{c}_\beta(n) := (n)^{-1}$. When these sequences are orthogonal, the chrominance information can be recovered via a multiplication by the corresponding conjugate carrier frequency followed by lowpass filtering. Assuming no overlap amongst the supports of $X_l(\omega)$, $X_\alpha(\omega)$, and $X_\beta(\omega)$, obtained is the exact reconstruction of the full-color image $\hat{x}(n)$ as:

$$\begin{bmatrix} \hat{x}_r(n) \\ \hat{x}_g(n) \\ \hat{x}_b(n) \end{bmatrix} = \begin{bmatrix} 1 & 1 & 0 \\ 0 & 1 & 0 \\ 0 & 1 & 1 \end{bmatrix} \begin{bmatrix} \frac{1}{\rho} & 0 & 0 \\ \frac{-\rho_\alpha}{\gamma\rho} & \frac{1}{\gamma} & \frac{-\mu_s}{\gamma\rho} \\ 0 & 0 & \frac{1}{\rho} \end{bmatrix} \begin{bmatrix} h_\alpha * \bar{c}_\alpha y \\ h_l * y \\ h_\beta * \bar{c}_\beta y \end{bmatrix}, \quad (H)$$

where * denotes the discrete convolution operator, and the passbands of the lowpass filters $h_\alpha, h_l, h_\beta$ are assumed to match the respective bandwidths of the signals $x_\alpha, x_l, x_\beta$.

Given sufficient separation of the chrominance information in the frequency domain, even simple lowpass filters designed for efficiency will suffice for the reconstruction task. In one example, a separable 2-dimensional odd-length triangle filter—a linear-phase filter with modest frequency roll-off—is easily implemented in existing ASIC or DSP architectures.

Figure 6:
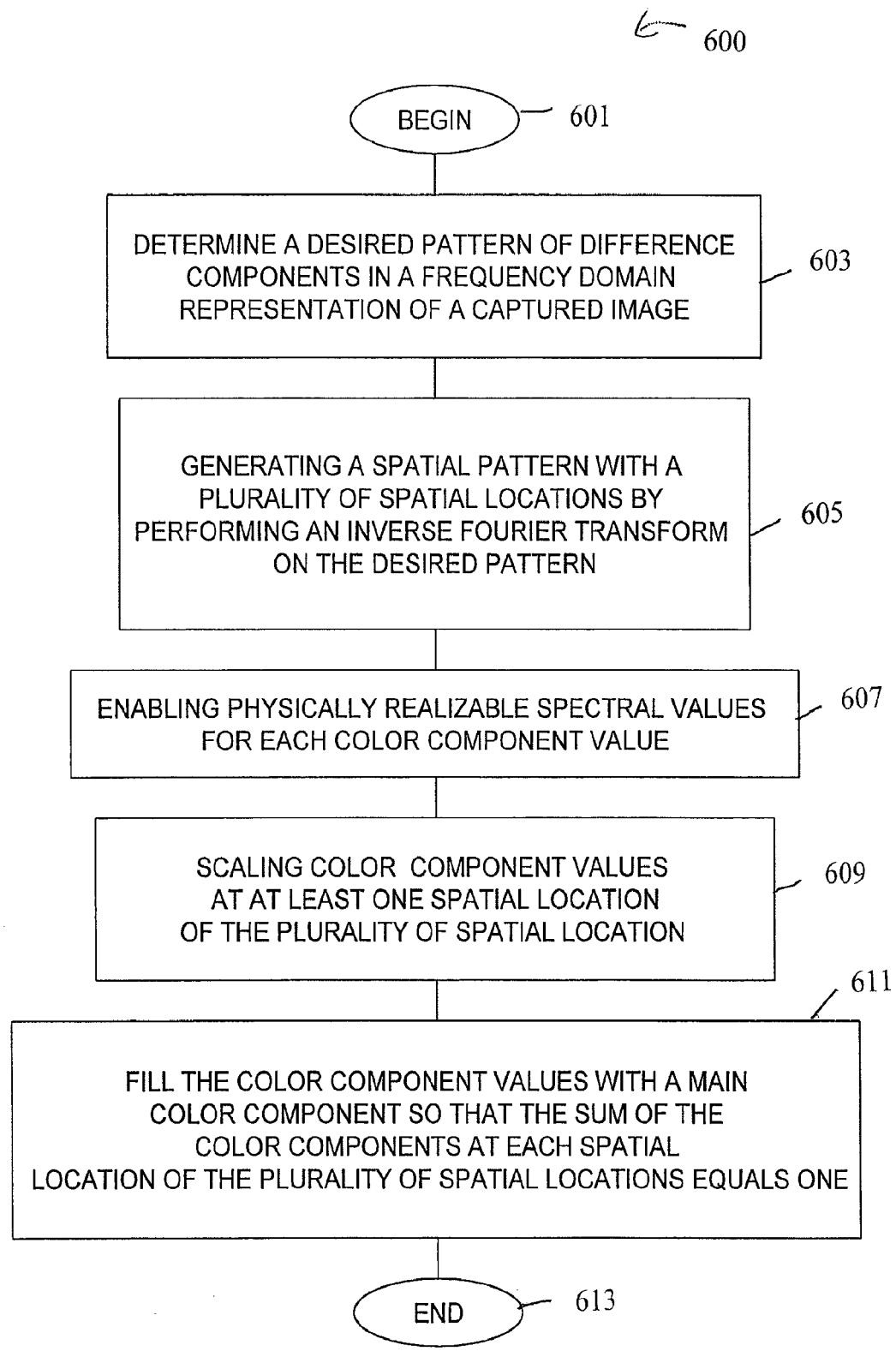
FIG. 6 illustrates an example process that may be used to determine a new CFA in accordance with one embodiment or the present invention.
Figure 7:
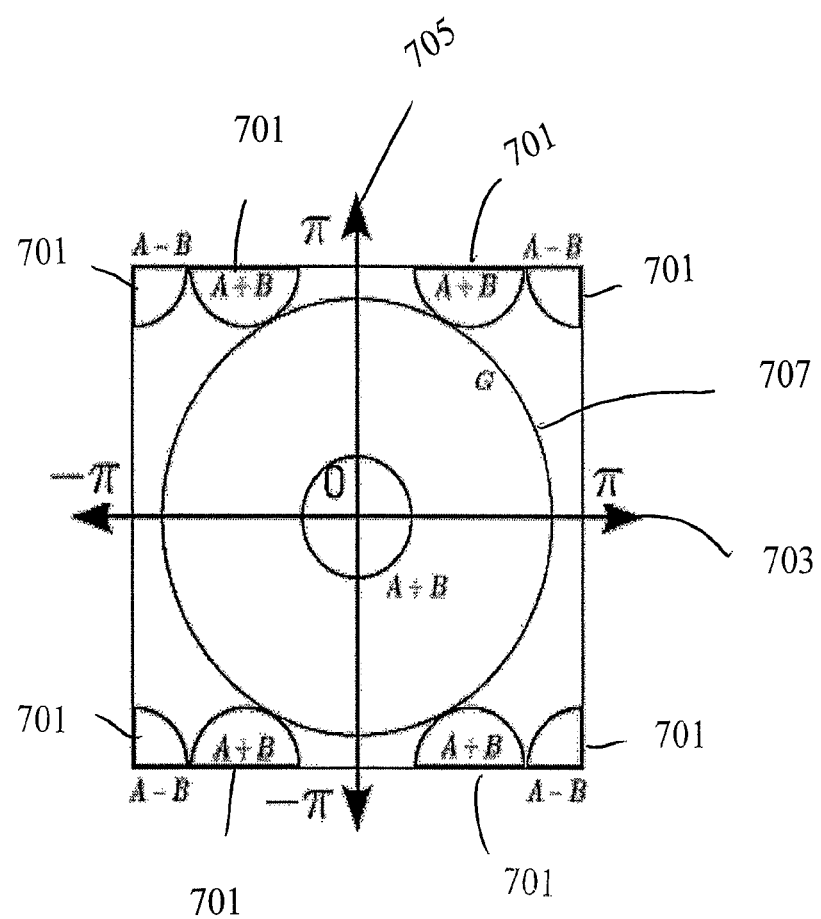
FIG. 7 illustrates an example frequency domain representation of color components of an image captured using a CFA in accordance with one embodiment of the present invention.
Figure 9A:
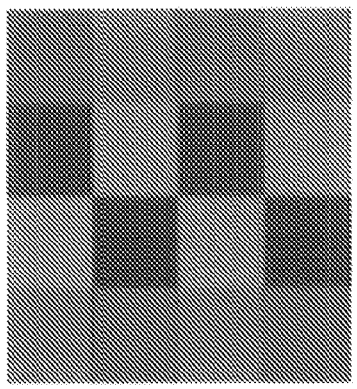
FIGS. 9A-E illustrate example representations of CFAs in accordance with embodiments of the present invention.
Figure 9B:
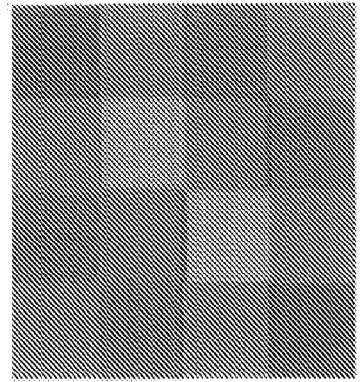
Figure 9C:
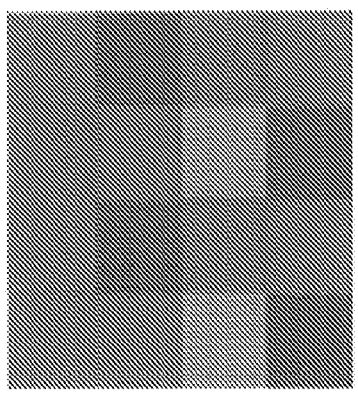
Figure 9D:
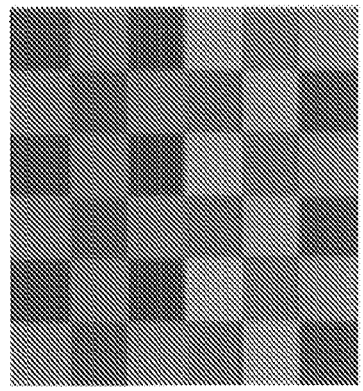
Figure 9E:
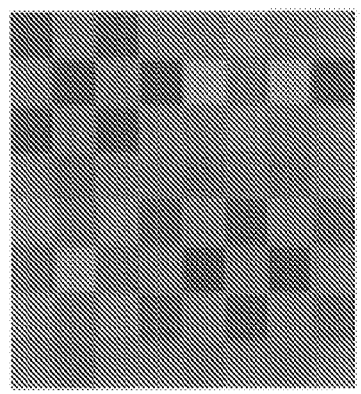

In some embodiments, a new CFA pattern may be determined in accordance with the present invention in a process similar to process 600, which is illustrated in FIG. 6. Process 600 may begin at Block 601 as indicated in FIG. 6. As indicated in Block 603, process 600 may include a step of placing copies of difference signal components in a frequency domain representations of an image captured using the new CFA pattern. FIG. 7, for example, illustrates a frequency domain representation of an image captured using a CFA pattern in which copies 701 of difference signals (e.g., $\alpha_s(n)$ and $\beta_s(n)$) are positioned away from the horizontal and vertical axes. In some embodiments of the present invention, light sensitive elements or a processor coupled to a light sensitive element may be configured to increase a measured magnitude of light to decrease noise, for example, by multiplying a representation of the magnitude by a number larger than one. The positioning of copies 701 may be changed after such multiplication, for example if the positions were arranged without accounting for such multiplication. In some embodiments, the copies 701 may be regained by returning the magnitude values to their original values. In some embodiments, if a multiplication factor or other increasing factor is known, a CFA may be designed to account for this factor so that the copies 701 are positioned at desired locations after increasing the magnitudes.

In some embodiments, the copies 701 may be positioned so that difference signal copies are positioned at symmetrical locations around the horizontal axes 703, vertical 705 axes and diagonal axes. In some implementations, the copies 701 may be positioned in locations that may not interfere with an expected dominant orientation of the central signal 707. For example, in some implementations, the copies 701 may be positioned away from the horizontal 703 and vertical 703 so they do not interfere with horizontal and vertical image features. In some implementations, the number of copies 701 placed in the representation may correspond to a number of different color signals that may be captured. For example, although the present example is given using only two difference signals (e.g., one corresponding to red and one corresponding to blue), the same representation may be used with a CFA having up to four separate difference signals.

As indicated in Block 605, after determining the location of the difference signal copies 701, the frequency domain representations may be converted to a spatial representation using an inverse Fourier transform. The inverse Fourier transform may transform the frequency domain representation into a spatial representation that indicates a number (e.g., three in the case of a red, green, and blue array) of color component values at each location of a color filter array. Because some of these values may be negative values (i.e., not physically realizable spectral values), in some embodiments, as indicated in Block 607, in some embodiments, an additional step of enabling physically realizable values may be performed. For example, in one implementation, color component values may be shifted so that all color component values are positive or zero values. For example, in some implementations, the most negative color component value of all the color component values from every spatial location may be added to all the color component values.

As indicated in Block 609, in some embodiments, after enabling physically realizable color component values, the color component values may be scaled so that the sum of all color components at each location is less than or equal to 1. This scaling of the color components (e.g., Red+Blue+Green) may include summing the color components at each location and determining which summed value or values is largest. Color components at each of the locations may then be divided by this largest summed value, if it is greater than one, so that each set of summed color components ranges between zero (lowest) and one (highest). As indicated in Block 611, the main color component of the original frequency domain representation may be added to some of the color components so that the sum of each of the color component values at each location equals one. In the example in which green is the central color and red and blue are represented by the difference signals, a green component is added to the color components. The process 600 may end at Block 613.

It should be recognized that process 600 or any other process used to determine a CFA pattern is not limited to the present example steps. Additional or alternative steps may be included in a process in accordance with embodiments of the present invention.

The final spatial representation of the new CFA generated through process 600 may be used to generate a CFA according to embodiments of the present invention. Some color filter arrays arranged in accordance with some embodiments of the present invention may be far less sensitive to the directionality of the image features, and thus offers the potential to significantly reduce hardware complexity in a wide variety of applications, while at the same time improving output color image quality.

In one example CFA, let $c_r(n)$ indicate a percentage of red light allowed through a filter at location n, $c_g(n)$ indicate a percentage of green light allowed through a filter at location n, and $c_b(n)$ indicate a percentage of blue light allowed through a filter at location n. In one example implementation, let $0 \leq c_r(n), c_g(n), c_b(n) \leq 1$ for each location of the color filter array. That is, at the pixel location n the image sensor measures $y(n)=r(n)c_r(n)+g(n)c_g(n)+b(n)c_b(n)$ and may also be constrained by $c_r(n)+c_g(n)+c_b(n)=1$ (i.e., convex combination) then:

$$y(n) = g(n) + c_r(n)(r(n) - g(n)) + c_b(n)(b(n) - g(n)) \qquad (5)$$
$$= g(n) + c_r(n)\alpha(n) + c_b(n)\beta(n).$$

Assuming that $\alpha=r-g$ and $\beta=b-g$ are bandlimited signals, and recalling that a multiplication by $c_r(n)$ and $c_b(n)$ in the spatial domain may implicate a convolution in the Fourier domain, it is recognized that in some embodiments, $\alpha(n)$ and $\beta(n)$ may be modulated via the multiplication with $c_r(n)$ and $c_b(n)$ such that the 2D Fourier transform of the frequency-modulated difference images occupy the regions in the frequency domain not used by g(n).

In some embodiments, to accomplish this task, assume that the color filter $\{c_r, c_g, c_b\}$ has 2D Fourier transform of the form:

$$C_r(\omega) = s_0 \delta(\omega) + \sum_i s_i \delta(\omega + \tau_i) + \bar{s}_i \delta(\omega - \tau_i) \qquad (6)$$
$$C_b(\omega) = t_0 \delta(\omega) + \sum_i t_i \delta(\omega + \tau_i) + \bar{t}_i \delta(\omega - \tau_i),$$

where $\omega, \tau_i \in \mathbb{R}^2$ $\bar{s}_i$ denotes complex conjugate of $s_i$, $\delta(\bullet)$ is a Dirac delta function, and $\{C_r(\omega), C_g(\omega), C_b(\omega)\}$ are the Fourier transforms of $c_r(n), c_g(n), c_b(n)$, respectively. In some embodiments, $\tau_i$ may be restricted such that its horizontal and/or vertical components are set to $\pi$. Then, in such embodiments, the Fourier transforms of $c_r(n)\alpha(n)$ and $c_b(n)\beta(n)$ are the sums of frequency modulated difference images:

$$\mathcal{F}(c_r \cdot \alpha)(\omega) = s_0 A(\omega) + \sum_i s_i A(\omega + \tau_i) + \bar{s}_i A(\omega - \tau_i) \qquad (7)$$
$$\mathcal{F}(c_b \cdot \beta)(\omega) = t_0 B(\omega) + \sum_i t_i B(\omega + \tau_i) + \bar{t}_i B(\omega - \tau_i),$$

where $\mathcal{F}$ is a 2D Fourier transform, and $\mathcal{F}(\alpha)=A$, and $\mathcal{F}(\beta)=B$. Overall, in such embodiments, the Fourier transform of the sensor image may be described by:

$$\mathcal{F}(y) = \mathcal{F}(g + c_r \cdot \alpha + c_b \cdot \beta) \qquad (8)$$
$$= G(\omega) + s_0 A(\omega) + t_0 B(\omega) +$$
$$\sum (s_i A + t_i B)(\omega + \tau) + (\bar{s}_i A + \bar{t}_i B)(\omega - \tau).$$

In some embodiments, the design parameters of the color filter consist of carrier frequencies $\{\tau_i\}$ and their weights $\{s_i, t_i\}$, and it may be advantageous to choose them such that $\mathcal{F}(y)$ can be partitioned into the unmodulated signal $G+s_0A+t_0B$ and the modulated signals $s_iA+t_iB$ and $\bar{s}_iA+\bar{t}_iB$ in the frequency domain.

In some embodiments, a CFA may be designed according to one or more of the following criteria:

In some embodiments, for $\mathcal{F}(c_r \cdot \alpha)$ and $\mathcal{F}(c_b \cdot \beta)$ to avoid aliasing (e.g., overlap) with G, the carrier frequencies may be chosen far from the origin. In particular, the horizontal and vertical axes in the 2D Fourier transforms may be devoted exclusively for G.

The carrier frequencies may spread out such that $(s_iA+t_iB)(\omega+\tau_i)$ and $(s_jA+t_jB)(\omega-\tau_j)$ for $i \neq j$ are mutually exclusive in the Fourier domain.

In some embodiments, when carrier frequencies are rational multiples of $\pi$, the inverse Fourier transforms of $c_r(n)$, $c_b(n)$, and $c_g(n)$ may assume periodicity. For example, for $\tau_i$ lying on multiples of $$\frac{\pi}{2}$$

may result in a 4×4 CFA pattern.

In some embodiments, $c_r(n)$ and $c_b(n)$ may be nonnegative to ease creation of a physically realizable filter. In some embodiments, the DC coefficients $s_0$ and $t_0$ may therefore be large enough to outweigh the negative values (in the pixel domain) introduced by $\{s_i, t_i\}$, $\forall i \neq 0$.

In some embodiments, $c_g(n)=1-c_r(n)-c_b(n)$.

In one implementation, the present invention may include a 4×4 CFA pattern. In particular, one CFA pattern in which spectral copies of red and blue difference signals are positioned away from verticals and horizontals, thereby increasing useful horizontal and vertical frequency information, is represented below:

$$y_{NEW} = \begin{bmatrix} c_1 & c_2 & c_3 & c_2 & & c_1 & c_2 & c_3 & c_2 & \\ c_2 & c_4 & c_5 & c_4 & & c_2 & c_4 & c_5 & c_4 & \\ c_6 & c_7 & c_8 & c_7 & \cdots & c_6 & c_7 & c_8 & c_7 & \cdots \\ c_2 & c_4 & c_5 & c_4 & & c_2 & c_4 & c_5 & c_4 & \\ & & \vdots & & \ddots & & & \vdots & & \\ c_1 & c_2 & c_3 & c_2 & & c_1 & c_2 & c_3 & c_2 & \\ c_2 & c_4 & c_5 & c_4 & & c_2 & c_4 & c_5 & c_4 & \\ c_6 & c_7 & c_8 & c_7 & \cdots & c_6 & c_7 & c_8 & c_7 & \cdots \\ c_2 & c_4 & c_5 & c_4 & & c_2 & c_4 & c_5 & c_4 & \\ & & \vdots & & \ddots & & & \vdots & & \end{bmatrix} \qquad (9)$$

where $c_1, c_2, c_3, c_4, c_5, c_6, c_7$, and $c_8$ correspond to filter colors within the CFA. The filter colors are given by a combination of red, green, and blue color components of light that the filter allows to pass. It should be understood that the present invention is not limited to red, green, and blue color components. Rather the present invention may comprise a CFA comprising any color and any number of colors.

The percentages of each color component allowed to pass a filter in the above example is given by:

$$c_1 = \frac{1}{4}(2, 0, 2) \qquad (10)$$

$$c_2 = \frac{1}{4}(0, 3, 1)$$

$$c_3 = \frac{1}{4}(2, 2, 0)$$

$$c_4 = \frac{1}{4}(1, 2, 1)$$

$$c_5 = \frac{1}{4}(1, 1, 2)$$

$$c_6 = \frac{1}{4}(0, 2, 2)$$

$$c_7 = \frac{1}{4}(2, 1, 1)$$

$$c_8 = \frac{1}{4}(0, 4, 0)$$

where the components of each of the red, green, and blue components of each filter are described as (red component, green component, blue component).

FIG. 8 illustrates a table indicating five example CFA patterns (A-E). FIGS. 9A-E illustrate representations of the CFA patterns described by the table of FIG. 8, respectively.

Some embodiments of the present invention may have the following qualities and advantages over prior-art CFA patterns:

In some implementations, by translating the spectral periodization to non-vertical and non-horizontal positions, it is less sensitive to the directionality of dominant image features;

In some implementations, by admitting a restriction of the color filter array values to convex combinations of primary colors, it is ensured to be realizable in practice;

In some implementations, by ensuring the linearity of corresponding demosaicing methods, it eases the denoising problem and also makes a natural choice for video cameras, where nonlinear processing methods often introduce temporal artifacts;

In some implementations, by extending this idea it is possible to enable an increased number of distinct color filters overall, thereby offering the potential for improved color fidelity and white-point estimation.

Some embodiments of the present invention may include interesting characteristics. First, a consequence of some CFA patterns may include that the color filter at each pixel location is a mixture of red, green, and blue colors rather than a single color. Because color filters are commonly realized by printing cyan, magenta, and yellow (subtractive colors) dyes or inks over an array of pixel sensors, this mixture suggests a further improvement in terms of noise and luminous efficiency. Red, green, or blue single color filters often translates to a thicker dye over each pixel sensor, reducing the number of photons that penetrate through the color filters and thereby increasing the level of noise in the system. On the other hand, a convex combination of the red, green, and blue colors in the CFA may use less subtractive colors. In fact, because in some embodiments $0 \leq c_r(n), c_g(n), c_b(n) \leq 1$, the color filters can be scaled up. For example, $$[c_r(n), c_g(n), c_b(n)] = \left[\frac{1}{3}, \frac{2}{3}, 0\right]$$

can be coded into CFA instead as $$\left[\frac{1}{2}, 1, 0\right]$$

to allow more light to enter, and the measured sensor value can be scaled down by $$\frac{3}{2}$$

after an A/D converter.

Second, some designs of a CFA may have 2n×2n (i.e. even number) pattern sizes. One motivation for such designs may stem from FIG. 2, which motivates assigning $\tau_i$ to high frequencies. In some embodiments, it may be favorable, therefore, to set either the horizontal and/or vertical components of the carrier frequency to $\pi$. The effective spatial resolution of the imaging sensor may also be increased because the size of the areas in G that do not overlap with the modulated difference images may be far larger than that of the existing CFA patterns.

Third, the difference signal copies may be fixed away from the horizontal and vertical axes in some embodiments. CFA designed in this manner may consequently be less sensitive to the directionality of the image features, and the corresponding demosaicing algorithms do not necessarily need nonlinear elements to control the directionality of the interpolation filters. Linearization of demosaicing step is attractive because it can be coded more efficiently in DSP chips, it eliminates the temporal toggling pixel problems in video sequences, it yields more favorable setup for deblurring, and the noise and distortion characterizations are more tractable. Linearization of demosaicing without the loss of image quality may position the proposed CFA scheme well with the current market trend in digital imaging of rapidly growing spatial resolutions and frame rate.

Fourth, some embodiments of the present invention extend naturally to choices of colors other than red, green, and blue. For example, replacing green with a luminance component may be advantageous in some applications. Embodiments of the present invention also enable an increased number of distinct color filters overall, thereby offering the potential for improved color fidelity and white-point estimation. To see this, the CFA model in equation 5 above may extend to a linear combination of g(n) plus a desired number of difference images, $\alpha_k(n)$ modulated by the corresponding filter mixture, $c_k(n)$. The desired number of colors that the CFA represents in the spatio-spectral sampling sense may be made clearer by studying the number of carrier frequencies we may introduce before overcrowding the Fourier domain.

Finally, restricting color filters so they may be physically realizable—that is, $0 \leq c_r(n), c_g(n), c_b(n) \leq 1$ may be a problem when the support of $\mathcal{F}(g)$ exceeds assumptions of some embodiments described above. While large values for $\{s_i, t_i\}$ may overcome this leakage, contamination may be apparent when they are small. Therefore, it may be advantageous to maximize $\{s_i, t_i\}$ within the constraint of physical realizability in some embodiments.

Data sampled using a CFA arranged in accordance with an embodiment of the present invention may be used to generate a demosaiced representation of the original image. One method of demosaicing an image is described in U.S. patent application 60/861,669, to Hirakawa, entitled A FRAMEWORK FOR WAVELET-BASED ANALYSIS AND PROCESSING OF COLOR FILTER ARRAY IMAGES WITH APPLICATIONS TO DENOISING AND DEMOSAICING, and filed on Nov. 29, 2006, which is hereby incorporated herein by reference. In this method, the ordinary Bayer pattern was assumed. If we consider the normalized image spectrum to be supported on $[-\pi,\pi]$, it is easy to see that this demosaicing method may require the constraint that g(w) be supported in a ball of radius $r_g=3\pi/4$ about the origin, and that the difference signals $\alpha(n)=r(n)-g(n)$ and $\beta(n)=b(n)-g(n)$ be supported with radius no greater than $r_d=\pi/4$.

In contrast, using the example 4×4 CFA pattern above (i.e., equation 9), it may be seen that for the same constraint on the difference signals' Fourier support, $r_d=\pi 4$, we have $r_g=(2\sqrt{5}-1)\pi/4$, an increase of about 20% in the allowable spectral radius, or about 45% in the recoverable spectral area. Even more important, the possibility exists to recover the entire green spectrum at exactly 0, 45, and 90 degrees, corresponding to horizontally-, diagonally-, and vertically-oriented image features, respectively. In some implementations, for fixed periodicity of the difference-signal spectral copies, the proposed orientation may be seen to admit a substantial radius $r_g$ for fixed $r_d$.

Some embodiments of the present invention may include a corresponding demosaicing method that is completely linear, but yet yields image quality comparable or better than the existing methods for Bayer pattern. For example, assuming that the carrier frequencies are far enough from each other such that the modulated difference images can be isolated from each other using a convolution filter, the following steps summarizes an example algorithm:

1) Design a convolution filter $h_0(n)$ that rejects the frequency components occupied by the modulated difference images while passing the rest so $$\mathcal{F}(h_0 * y) = H_0(\omega)Y(\omega) = G(\omega) + s_0 A(\omega) + t_0 B(\omega). \quad (11)$$

2) Design convolution filters $h_i(n)$ whose passbands are centered around $\pm\tau_i$. Then $\mathcal{F}(h_i*y)=(s_i A+t_i B)(\omega+\tau_i)+\overline{(s_i A+t_i B)}(\omega-\tau_i)$ can be modulated to solve for $A(\omega)$ and $B(\omega)$ using standard amplitude modulator designs.
3) Take linear combinations of $H_0 Y$ and $H_i Y$ to solve for $G(\omega)$.
4) Let $r(n)=\alpha(n)+g(n)$ and $b(n)=\beta(n)+g(n)$.

It should be recognized that this is an example algorithm only. The present invention may include any demosaicing algorithm whether linear or nonlinear and including any set of steps.

Example Images

Figure 10A:
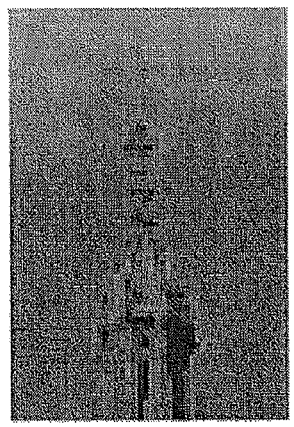
FIGS. 10A-C illustrate sample images that may be captured using a CFA.
Figure 10B:
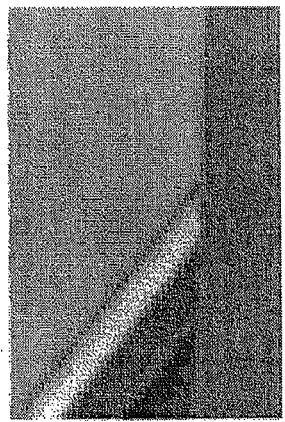
Figure 10C:
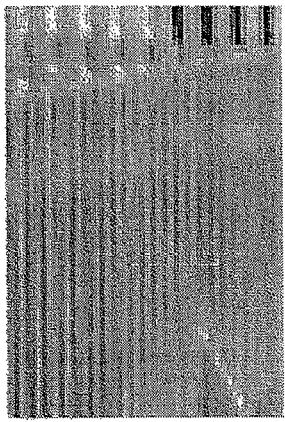

FIGS. 10A-C illustrate three example source images. FIGS. 11A-D show the sensor data from four filters, y(n), represented using the orthogonal projection onto the subspace spanned by the color coding of each respective color filter:

$$\begin{bmatrix} c_r(n) \\ c_g(n) \\ c_b(n) \end{bmatrix} \frac{y(n)}{\sqrt{c_r(n)^2 + c_g(n)^2 + c_b(n)^2}} \quad (12)$$

Figure 11A:
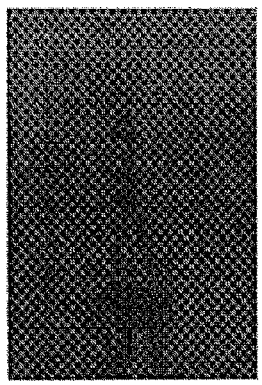
FIGS. 11A-H illustrate sensor data of a sample image captured using four different CFAs and demosaiced versions of this sensor data.
Figure 11B:
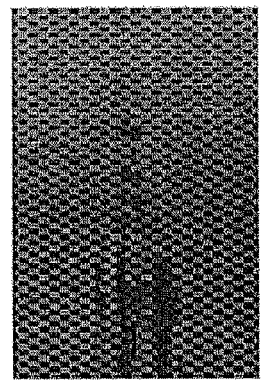
Figure 11C:
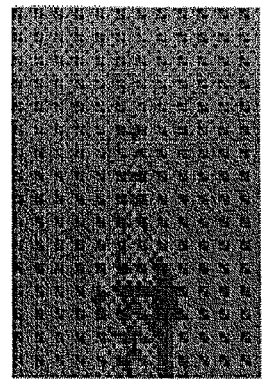
Figure 11D:
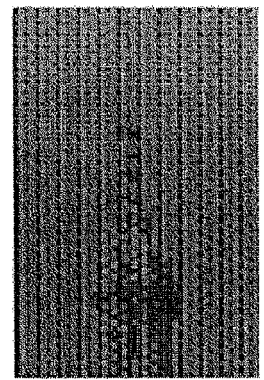
Figure 11E:
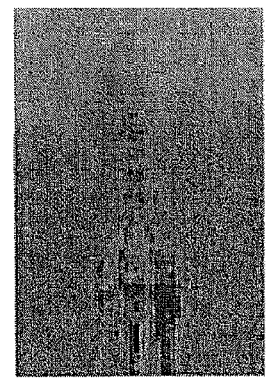

It can be seen from the figures that the contiguity of image features such as edges are preserved better in the proposed sensor image shown in FIG. 10B using pattern A from FIG. 8, FIG. 11C using pattern B from FIG. 8, and FIG. 11C using pattern C from FIG. 8, compared to the Bayer sensor image shown in FIG. 11A. For example, it is difficult to tell the object boundaries in FIG. 11A, while they are less ambiguous in FIGS. 11B-D. The appearance of color differs greatly between all sensor images. In particular, pattern B, which is horizontally and vertically symmetric, has a washed-out appearance to the color. Indeed, the non-symmetric patterns enjoy coefficients $s_0, t_0$ with larger values, hence increasing the color accuracy.

FIGS. 11 E-H, show the reconstructed images corresponding to each sensor image from FIGS. 11A-D, respectively. The proposed sensor images use the completely linear demosaicing algorithm outlined above.

Similar to FIGS. 11A-H, FIGS. 12A-H display the respective sensor image and reconstructed image of the original image from FIG. 10B using the Bayer pattern, and patterns A, B, and C from FIG. 8. Also, similar to FIGS. 11A-H, FIGS. 13A-H display the respective sensor image and reconstructed image of the original image from FIG. 10C using the Bayer pattern, and patterns A, B, and C from FIG. 8.

Figure 11F:
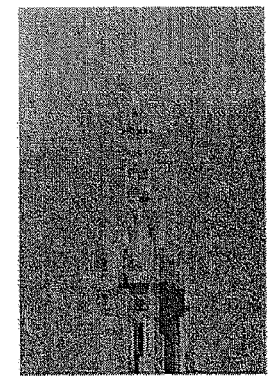
Figure 11G:
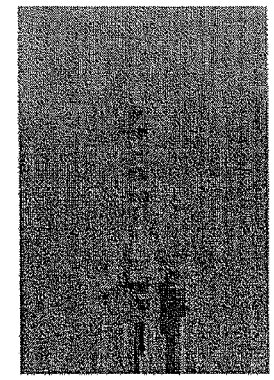
Figure 11H:
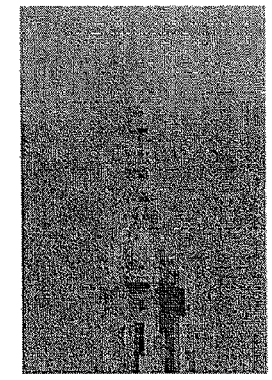
Figure 12A:
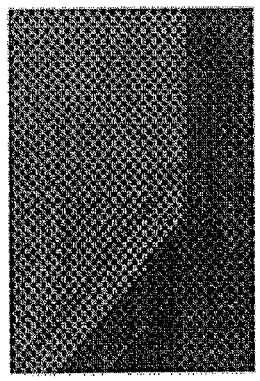
FIGS. 12A-H illustrate sensor data of a sample image captured using four different CFAs and demosaiced versions of this sensor data.
Figure 12B:
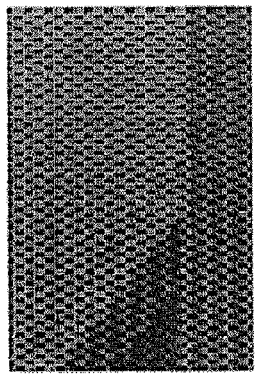
Figure 12C:
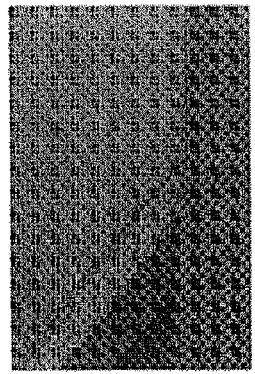
Figure 12D:
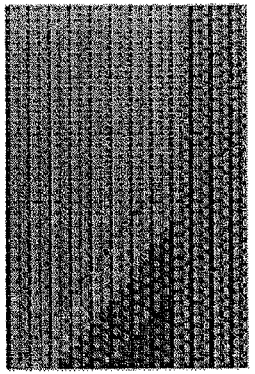
Figure 12E:
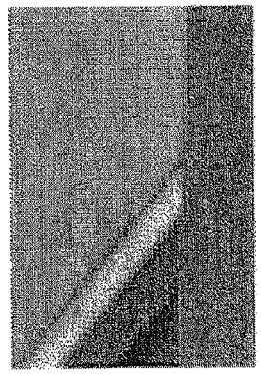
Figure 12F:
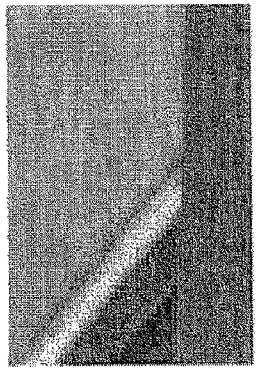
Figure 12G:
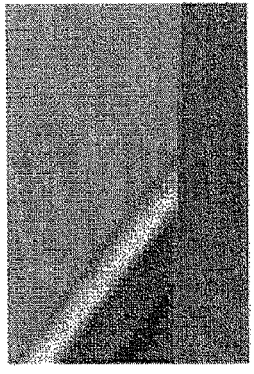
Figure 12H:
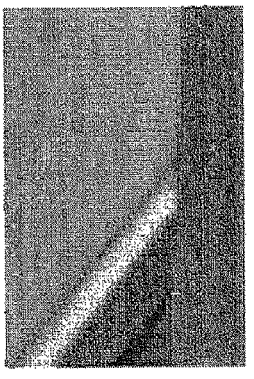

We see that the reconstruction from the proposed CFA suffers significantly less from zippering artifacts, but has a slightly softer appearance. Other noticeable differences are that the diagonal edge in FIG. 11F-H are less jagged and that textured regions, such as the one in FIG. 10B, do not suffer from artifacts.

Figure 14A:
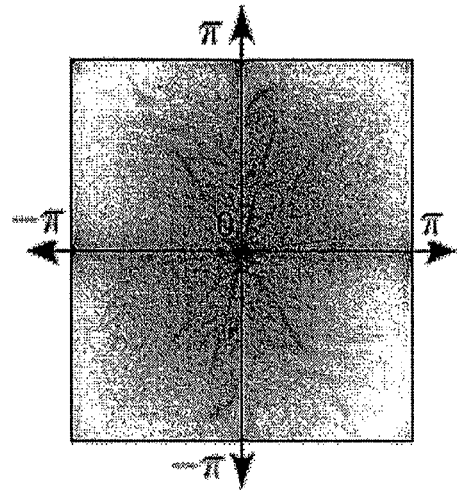
FIGS. 14A-D illustrate frequency domain representations of a sample image capturing using four difference CFAs.
Figure 14B:
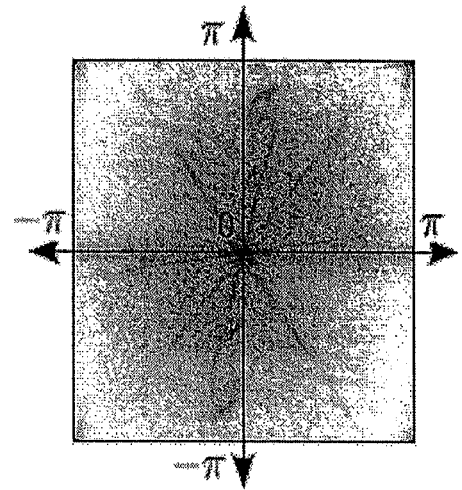
Figure 14C:
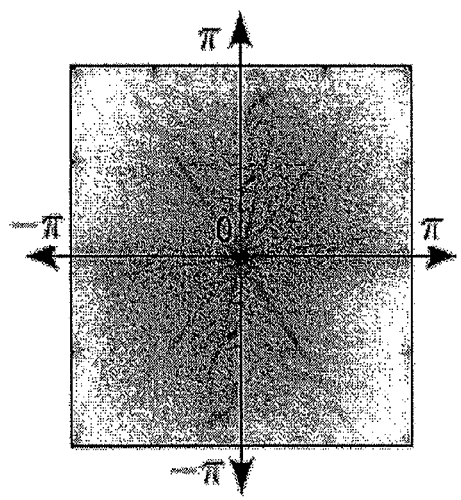
Figure 14D:
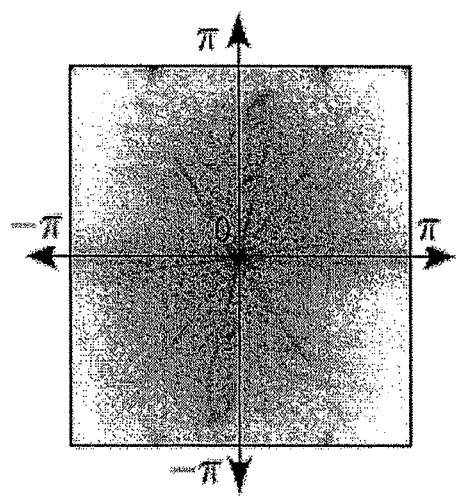

Next, we compare the spectrums of FIGS. 14A-D, the two dimensional Fourier transforms of sensor images y(n) representing the "lighthouse" image assuming different CFA patterns. FIG. 14A, which is the sensor image for Bayer pattern, suggests aliasing on both horizontal and vertical axes due to spectral copies of the difference images. On the other hand, in FIGS. 14B-D which represent pattern A, B, and C from the table of FIG. 8, respectively, the frequency-modulated difference images appear on the outer perimeters of the Fourier domain away from the horizontal and vertical axes. In particular, FIG. 14B is similar to the pictoral representation of the sensor image in FIG. 8.

As a measure of comparison, numerical evaluation using a means square test of the demosaiced images are listed in the table of FIG. 15, including two different Bayer pattern demosaicing algorithms as reference. However, this is not a measure of the integrity of image features preserved by the CFA patterns, as they are demosaicing algorithm-dependent as well as CFA-dependent.

The physical realizability of some embodiments of the present invention may depend on the chemistry of the dye used in the CCD/CMOS fabrication. Suppose that the difference signals' Fourier support is defined in terms of the radius around the origin, $d_\alpha$ and $d_\beta$. Then for a given CFA size, the proposed CFA coding scheme, along with the corresponding demosaicing method, may give us a way to optimally maximize $d_g$, the allowable frequency support for the green image in terms of radius around the origin. As with any modeling problems, however, the assumption of bandlimitedness can be violated in real life and leakage of frequency components may corrupt the quality of the output image. The issues with noise associated with poor lighting conditions can complicate the problem further. On the other hand, in some embodiments, optical blurs and oversampling can easily compensate for the incompatibility of the assumed bandwidth.

Evaluation

Certain embodiments demonstrably perform better than existing methods and patterns in terms of mean-square reconstruction error and in terms of aliasing minimization.

Examples of Optimal Panchromatic CFA Patterns

Discussed are examples of N×N CFA patterns generated by conducting an exhaustive search for the optimal $\{\lambda_i, s_i, t_i\}$ over a parameter space restricted to satisfy the following rules:

$\|\lambda_i\|_\infty = \pi$ and $\lambda_i \notin \{(-\pi,0),(0,-\pi)\}$ (Proposition 1)
$\lambda_i \in 2\pi \mathbb{Z}^2/N$ (induces N×N periodicity)
Number of distinct carrier frequencies is limited to two
Red-green-blue ratio in $x_i$ is 1:1:1 or 1:2:1

Each set of parameters satisfying the above constraints represent different embodiments, to however, analyzed are the embodiment for which the combination yielded the largest singular values for the choice of weights $\{s_i, t_i\}$. (Choices of weights discussed above).

TABLE I

PANCHROMATIC CFA PATTERNS SPECIFIED IN TERMS OF $\{\lambda_i, s_i, t_i\}$

| Pattern | $\{\lambda_i, s_i, t_i\}$ | i = 0 | i = 1 | N | R:G:B |
|---|---|---|---|---|---|
| V | $\lambda_i$ | $(\pi, \pi/2)$ | $(\pi, \pi)$ | $4 \times 4$, | 1:1:1 |
|   | red $s_i$ | 1 + 1i | 1 | $8 \times 8$ |  |
|   | blue $t_i$ | 1 + 1i | −1 |  |  |
| X | $\lambda_i$ | $(\pi, \pi/2)$ | $(\pi, \pi)$ | $4 \times 4$, | 1:2:1 |
|   | red $s_i$ | 1 + 1i | 0 | $8 \times 8$ |  |
|   | blue $t_i$ | 0 | 1 |  |  |
| Y | $\lambda_i$ | $(\pi, 2\pi/3)$ | $(2\pi/3, \pi)$ | $6 \times 6$ | 1:1:1 |
|   | red $s_i$ | 1i | 1i |  |  |
|   | blue $t_i$ | 1i | −1i |  |  |
| Z | $\lambda_i$ | $(\pi, 1\pi/3)$ | $(\pi, \pi)$ | $6 \times 6$ | 1:2:1 |
|   | red $s_i$ | 3 + 4i | 1 |  |  |
|   | blue $t_i$ | 3 − 4i | 1 |  |  |

The resultant optimal parameters are described in Table I for N=4, 6, 8; and the corresponding patterns are shown in FIG. 21(*a*)-(*h*). FIG. 21(*a*)-(*d*) illustrate examples of CFA patterns generated using the parameters recited in Table I, and FIGS. 21(*e*)-(*h*) illustrate their corresponding "lighthouse" log-magnitude spectra. In these examples, each of these new patterns is panchromatic, and may be asymmetric in the horizontal and vertical directions; all use fewer than N×N color filters in practice. Moreover, there are equal numbers of "neighboring" colors for each color used in the CFA pattern—(some conventional approaches would indicate that this feature simplifies the characterization of cross-talk noise (photon and electron leakages)).

Reduction of Aliasing Effects Using Examples of New CFA Patterns

To investigate the potential of these example patterns to reduce aliasing effects, two sets of test images were used to provide full-color proxy data: a standard set of twenty known Kodak images originally acquired on film, and a set of six images measured at multiple wavelengths, available at http://spectral.joensuu.fi, University of Joensuu Color Group, "Spectral database." In keeping with standard practice, simulated data y(n) were obtained for each CFA pattern by "sensing" these images according to (C).

Describing in more detail issues inherent in our image test sets, and in particular the latter set of images measured at multiple wavelengths: while the known standard test set of Kodak images provide a widely accepted means of comparing various algorithms, it is known that numerical simulations using this test set are subject to uncertainties about how the digital image data were acquired (e.g., resolution, illumination) and whether they have undergone any additional processing (e.g., white-balancing, gamma correction). To reduce these uncertainties to yield better-controlled experiments, adopted in evaluations are directly measured multi-wavelength image data (identified above) as an additional form of full-color proxy. In this example, the quantum efficiencies of pure-color CFA values were taken directly from the data sheet of a popular Sony sensor (Sony Corporation, "Diagonal 6 mm (type 1/3) progressive scan ccd image sensor with square pixel for color cameras," available at http://products.sel.sony.com/semi/PDF/ICX204AK.pdf, 2004); those of some embodiments of the proposed panchromatic designs are assumed to be linear combinations of these prototype pure-color responses. To generate the reduction in aliasing effects yielded by examples of the new CFA designs, recall from discussion above of (D) and (F) that sensor data $Y(\omega)$ can be interpreted as a superposition of baseband luminance channel $x_l$ chrominance information in the form of frequency-shifted versions of $X_\alpha$ and $X_\beta$. The mean square error of a linear filter $h_l$ acting on y to estimate $x_l$ has the form $\Sigma_n \|h_l(n)*y(n) - x_l(n)\|^2$. Barring additional assumptions, the optimal filter in this example is given by Wiener-Hopf, whose expected squared error is described in greater detail below.

The Wiener-Hopf filter in this example may be defined in the Fourier domain as $H_l(\omega) = S_{x_l,y}(\omega)/S_y(\omega)$, where $S_y$ is the power spectral density of y and $S_{x_l,y}$ is the cross-spectral density of $x_l$ and y. If $\{x_\alpha, x_l, x_\beta\}$ are in turn assumed mutually independent, it follows from (G) that:

$$S_{x_l,y}(\omega) = \gamma S_{x_l}(\omega),$$

$$S_y(\omega) = \gamma^2 S_{x_l}(\omega) = \rho^2 S_{x_\alpha,x_\beta}(\omega),$$

$$S_{x_\alpha,x_\beta}(\omega) = \sum_i \left[ \{|s_i|^2 S_{x_\alpha} + |t_i|^2 S_{x_\beta}\}(\omega + \lambda_i) + \{|s_i|^2 S_{x_\alpha} + |t_i|^2 S_{x_\beta}\}(\omega - \lambda_i) \right].$$

The expected squared error may be computed from:

$$J_{x_l} = \int_{[-\pi,\pi]^2} \frac{S_{x_l}(\omega) S_y(\omega) - |S_{x_l,y}(j\omega)|^2}{S_y(\omega)} d\omega$$

$$= \int_{[-\pi,\pi]^2} \frac{\rho^2 S_{x_l}(\omega) S_{x_\alpha,x_\beta}(\omega)}{S_y(\omega)} d\omega.$$

The distortion y with respect to $x_\alpha$ and $x_\beta$ is likewise:

$$J_{x_\alpha,x_\beta} = \int_{[-\pi,\pi]^2} \frac{\gamma^2 S_{x_l}(\omega) S_{x_\alpha,x_\beta}(\omega)}{S_y(\omega)} d\omega$$

$$= \frac{\gamma^2 J_{x_l}}{\rho^2}.$$

Differences in the number of carrier frequencies $\{\lambda_i\}$ and the relative sizes of the weights $\{s_i, t_i\}$ render $J_{x_\alpha,x_\beta}$ less useful for comparing the performance of two distinct CFA patterns directly. However, the central role of $S_{x_l}(\omega) S_{x_\alpha,x_\beta}(\omega)$ in both $J_{x_\alpha,x_\beta}$ and (I) implies that both are useful analytical tools to understand aliasing effects associated with a particular CFA.

For the case of mutually independent $\{x_\alpha, x_l, x_\beta\}$ to follow form (G) as:

$$J_{x_l} := \int_{[-\pi,\pi]^2} \frac{\rho^2 S_{x_l}(\omega) S_{x_\alpha,x_\beta}(\omega)}{S_y(\omega)} d\omega, \quad (I)$$

where S denotes a (cross-) power spectral density. In this example, the quantity $S_{x_l}(\omega) S_{x_\alpha,x_\beta}(\omega)$ corresponds to the inner product between the expected squared magnitudes of $X_l$ and the modulated versions of $X_\alpha$ and $X_\beta$; it evaluates to zero in the absence of aliasing, but is large when aliasing is severe. Thus the integrand in (I) can be taken as a measure of aliasing relative to the magnitude of the sensor data, and is useful for comparing the performance of different CFA patterns.

In Table II, shown in FIG. 22, aliasing measurements $J_{x_l}$ are reported for both sets of test images. In general, there is a significant decrease in aliasing severity when using proposed CFA designs V and Y (patterns with a 1:1:1 ratio of red-green-blue) rather than pure-color CFA patterns—a trend which is consistent across both sets of test images. The degree of aliasing associated can be visualized with various CFAs by comparing the spectral content of the sensor data, as shown in FIG. 18 and the bottom row of FIG. 21. In one example, owing to its higher modulation frequencies, the chrominance information illustrated in FIG. 21 is disjoint from the baseband luminance information. This reduces the overall risk of aliasing, relative to existing patterns—though any particular aliasing effects will depend on image content. For example, when presented with strong vertical image features, Pattern Z, of Table I, is at a lower risk of aliasing than the Bayer pattern, but at a higher risk than Patterns V-Y, of Table I.

Improved Linear Reconstruction Using New Examples of CFA Patterns

To evaluate the potential of Patterns V-Z, of Table I, for improved demosaicking performance, we employed two contemporary nonlinear demosaicing algorithms the first authored by B. K. Gunturk, Y. Altunbasak, and R. M. Mersereau, in "Color plane interpolation using alternating projections," IEEE Trans. Image Process., vol. 11, no. 9, pp. 997-1013, September 2002 (hereinafter "EVAL1"), the second authored by K. Hirakawa and T. W. Parks, in "Adaptive homogeneity-directed demosaicing algorithm," IEEE Trans. Image Process., vol. 14, no. 3, pp. 360-369, March 2005 (hereinafter "EVAL2"), to serve as a baseline in conjunction with the Bayer CFA pattern. We then employed the simple linear demosaicking scheme discussed above for new panchromatic Patterns V-Z, in which the sensor data y(n) were subjected to bandpass filtering in order to reconstruct the full-color image $\hat{x}(n)$ according to (H).

Figures 23A, 23B, 23C, 23D, 23E, 23F:
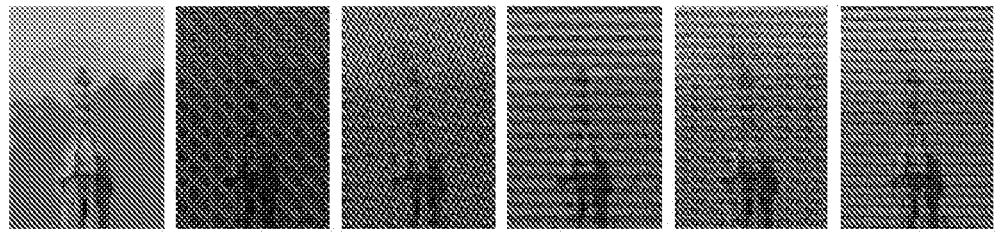
FIG. 23(a)-(l) illustrate detail of an original image and examples of sensor images captured with examples of CFAs and the corresponding reconstructions.
Figures 23G, 23H, 23I, 23J, 23K, 23L:
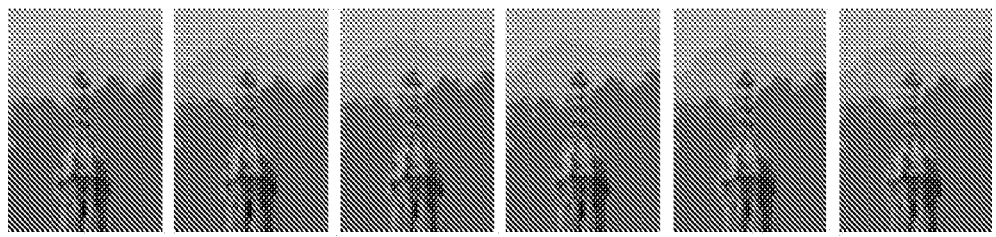
Figures 24A, 24B, 24C, 24D, 24E, 24F:
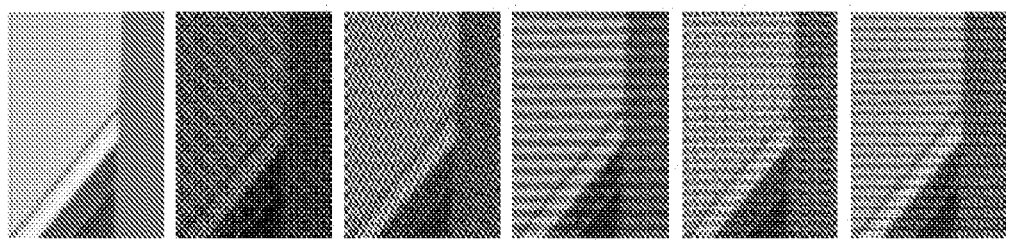
FIG. 24(a)-(l) illustrate an original image, sensors images examples, and their corresponding reconstructions.
Figures 24G, 24H, 24I, 24J, 24K, 24L:
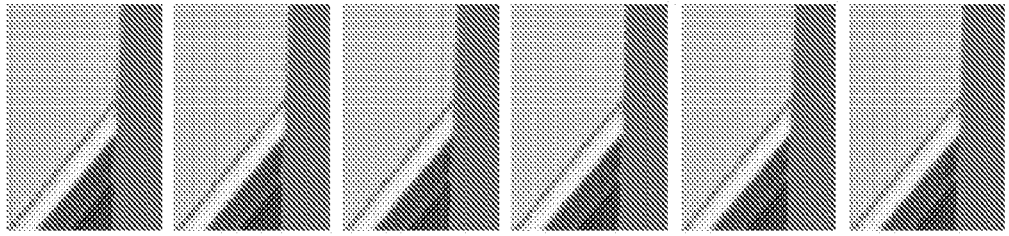
Figure 27A:
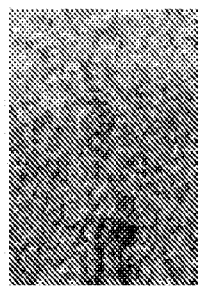
FIG. 27(a)-(f) illustrate examples of reconstruction of sensor data without denoising methods applied.
Figure 27B:
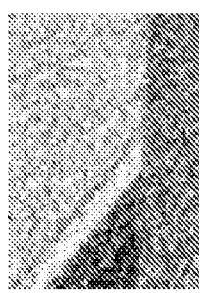
Figure 27C:
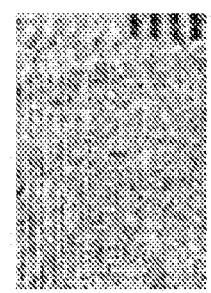
Figure 27D:
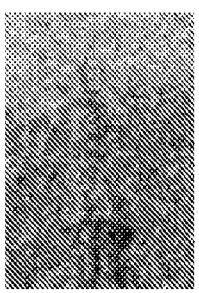
Figure 27E:
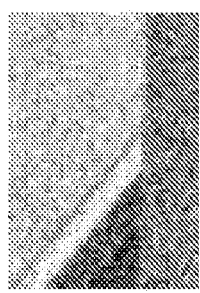
Figure 27F:
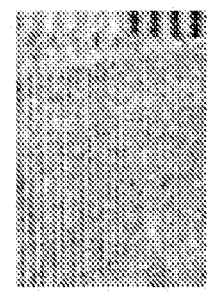
Figure 28A:
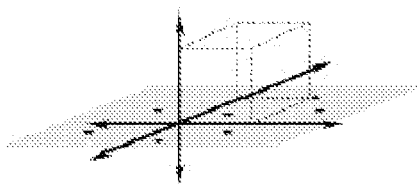
FIGS. 28(a)-(e) illustrate examples of color filter array design.
Figure 28B:
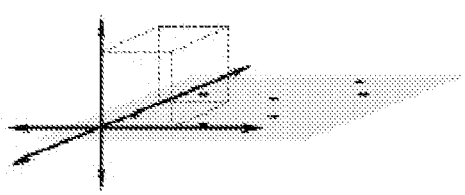
Figure 28C:
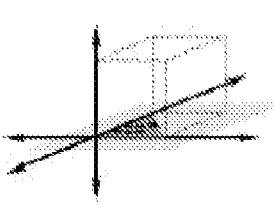
Figure 28D:
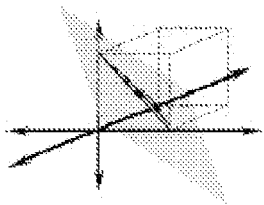
Figure 28E:
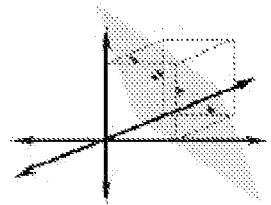

FIGS. 23-25(b-f) show simulated sensor data y(n), acquired respectively via the Bayer pattern and example Patterns V-Z, and are represented using an orthogonal projection of the full-color test images onto the subspace spanned by each respective color filter. FIG. 23(a)-(f) illustrates (a) detail of original "structure 11"; (b)-(f) illustrate sensor images using a Bayer pattern, Pattern V, Pattern X, Pattern Y, and Pattern Z, respectively. FIG. 23(g)-(l) shows (g) state of the art nonlinear reconstruction of (b) according to EVAL1; (h)-(l) show optimal linear reconstruction of (b)-(f), respectively. FIG. 24(a)-(f) describes examples of: (a) Detail of original "house" image; (b)-(f) Sensor images using Bayer pattern, pattern V, pattern X, pattern Y, and pattern Z, respectively. FIG. 24(g)-(l) shows: (g) State-of-the-art nonlinear reconstruction of (b) according to EVAL1; (h-l) optimal linear reconstruction of (b-f), respectively.

By visual inspection, the contiguity of the image features such as edges are better preserved better in the proposed sensor images relative to the Bayer sensor image. For example, it is more difficult to discern object boundaries in FIG. 24(b) than in FIGS. 24(c-f). Although, it is known that any color image reconstruction depends on the choice of algorithm as well as the choice of CFA pattern, demosaicking experiments provide some sense of the performance gains and trends that we may expect from the new class of spatio-spectral CFA designs introduced.

To this end, FIGS. 23-25(g-l) show examples of reconstructions corresponding to each sensor image. In comparison to the iterative, nonlinear demosaicking method of EVAL1, shown is the reconstructions corresponding to examples of new panchromatic CFAs are significantly less prone to severe aliasing effects; the examples suffer much less from zippering artifacts yet preserve the sharpness of image features.

FIG. 25(a)-(f) illustrates: (a) detail of original "lighthouse" image; (b)-(f) Sensor images using Bayer pattern, pattern V, pattern X, pattern Y, and pattern Z, respectively. FIGS. 25(g)-(l) show: (g) state-of-the-art nonlinear reconstruction of (b) according to EVAL1; (h)-(l) optimal linear reconstruction of (b-f), respectively.

Other noticeable differences are the less-jagged diagonal edges in FIGS. 24(i-l), and that certain textured regions, such as the ones in FIGS. 25(i-l), do not suffer from artifacts.

These observations are reflected in the measurements of mean-square reconstruction error listed in Table III, FIG. 26, whereupon it may be seen that entirely linear reconstructions under Patterns V and X consistently outperform even the state-of-the-art demosaicking algorithms applied to test data acquired under the Bayer pattern. Compared to a linear demosaicking of the Bayer sensor image for the same computational complexity, the proposed CFAs show significant and consistent improvements in both visual quality and mean-square reconstruction error. Overall, the differences for multi-wavelength data are that the demosaicking algorithm of EVAL2 now outperforms the method in EVAL1, and is comparable to the optimal linear reconstruction based on the color filter array of Pattern V.

The enhanced quantum efficiencies of the panchromatic color filters afforded by these new patterns also yield increased robustness to sensor noise. As an example, FIG. 27 shows reconstructions corresponding to those of FIGS. 23-25, but for simulated sensor data subjected to Poisson noise, with no denoising applied. In particular FIGS. 27(a)-(f) illustrates: reconstruction in noise (no denoising methods applied) (a) state-of-the-art reconstruction of Bayer sensor data in FIGS. 23-25(b) under the influence of noise according to EVAL1; (d)-(f) optimal linear reconstruction of Pattern V sensor data in FIGS. 23-25(c) under the influence of noise.

The corresponding noise contributions are seen by inspection to be less severe in reconstructions obtained from Pattern X than from the Bayer pattern, suggesting the potential for new reconstruction methods to lead to more accurate means of joint denoising and demosaicking.

The image formation of display in human vision is often modeled by the contrast sensitivity function (CSF), which has a low-pass effect to filter out the granularity of individual elements, and the use of the CFA patterns is ubiquitous in today's cathode-ray tube, plasma, and liquid crystal display media. The most well known of the color schemes involve the canonical primary colors of light: red, green, and blue. In some cases, inclusion of a fourth color such as white is considered.

Subpixel rendering and anti-aliasing are some well-known techniques to take advantage of the pixel geometry and arrangement to increase the perceived resolution of the display. The maximal resolution of the display, however, is ultimately limited fundamentally by the choice of the pre-determined CFA pattern. More specifically, the bandwidths of the stimuli that drive the intensity level of the subpixel is typically lower than that of the image features we would like to represent. In this paper, we explicitly quantify the information loss associated with the CFA-based image representation in terms of spectral wavelength as well as the spatial sampling requirements. We then propose a framework for designing and analyzing alternatives to the existing CFA patterns for color image display devices, which overcomes the shortcomings of the previous patterns.

Let $n \in \mathbb{Z}^2$ be location index and $x(n)=(x_1(n),x_2(n),x_3(n))^T$ be the corresponding red, green, blue (RGB) color triple. Given a two-dimensional signal, terminologies such as frequency and spectral are to be interpreted in the context of two dimensional Fourier transforms, which is also denoted by $\mathcal{F}(\bullet)$. This is not to be confused with spectral wavelength, the wavelengths of the light in the sense of color science. This paper is concerned with the design of CFA, which is a spatially varying pattern. Although the image data that drive the light emitting element are sometimes referred to as CFA image in the literature, we use stimuli to avoid confusion with CFA, the coding of color which is not dependent on the image signal content.

Analysis of Display Stimuli

Let $M \in \mathbb{R}^{3 \times 8}$ such that $y(n) = Mx(n) \in \mathbb{R}^3$ is the linear transformation decomposing the color defined in RGB color space into luminance component $y_1(n)$ and two chrominance components $y_2(n), y_3(n)$ (e.g. YUV, YIQ, YCbCr). Because the high frequency contents of $x_1, x_2, x_3$ are highly redundant, it is often accepted that $y_2$ and $y_3$ are bandlimited. See FIG. 29(a-c). This is strongly supported by the fact that the Pearson product-moment correlation coefficient of a color image measured between the color channels is typically larger than 0.9. It is then not surprising that CSF has far wider passband on $y_1$ when compared to that of $y_2$ and $y_3$.

Figure 29A:
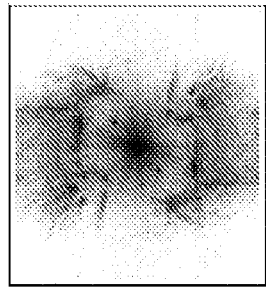
FIGS. 29 (a)-(f) illustrate examples of the log-magnitude of co-effeciencts displayed as pixel intensity.
Figure 29B:
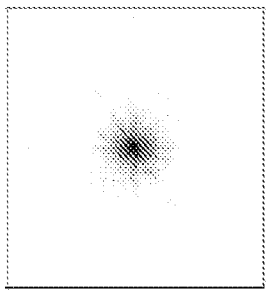
Figure 29C:
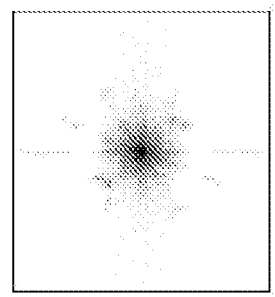
Figure 29D:
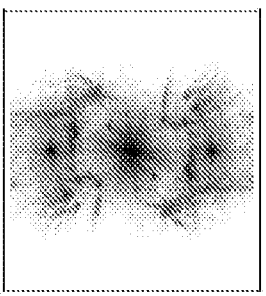
Figure 29E:
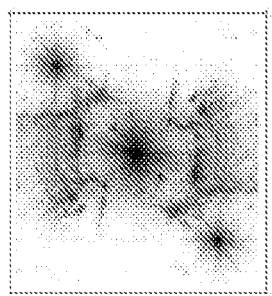
Figure 29F:
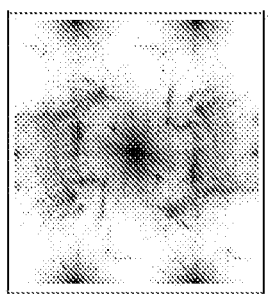

In one example, let $c(n) = (c_1(n), c_2(n), c_3(n))^T \in \{e_1, e_2, e_3\}$ be the red, green, and blue indicator for CFA color at pixel location n, respectively, where $e_i \in \mathbb{R}^3$ denotes the standard basis. The stimuli $u(n) \in \mathbb{R}$ and displayed image $v(n) \in \mathbb{R}^3$:

$$u(n) = \tilde{c}^T(n)x(n) = \tilde{c}^T(n)M^{-1}Mx(n) = \phi^T(n)y(n)$$

$$v(n) = c(n)u(n),$$

where $\tilde{c} = c$ typically and $\phi \equiv M^{-T}\tilde{c}$. Most luminance-chrominance decompositions are designed such that $y_2 = y_3 = 0$ when $x_1 = x_2 = x_3$. Consequently, it can readily be shown that $\phi_2(n)$ and $\phi_3(n)$ are pure sinusoids, where the corresponding frequencies are $$\left(\frac{2\pi}{3}, 0\right) \text{ and } \left(\frac{2\pi}{3}, \frac{2\pi}{3}\right)$$

for vertical and diagonal stripe sampling, respectively. Thus, the Fourier transform of the stimuli is a sum of the chrominance signals modulated by $$\left(\frac{2\pi}{3}, 0\right) \text{ or } \left(\frac{2\pi}{3}, \frac{2\pi}{3}\right)$$

and the luminance signal. FIGS. 29(d-e) illustrate examples of spectra, revealing severe aliasing between the luminance and the chrominance components near the modulation frequencies. FIG. 29(f) illustrates the log-magnitude of co-effeciencts displayed as pixel intensity, with DC found the center, for a proposed CFA.

In one embodiment, let $h_i(n)$ be the CSF for $y_i(n)$ and '*' denotes convolution. The low-level human visual response to a color image $x(n)$ is $W(x) = (W_1(x), W_2(x), W_3(x))$ where $W_i(x)(n) = h_i(n) * y_i(n)$. Recall that multiplication in the spatial domain implicates a convolution in the Fourier domain, and in one embodiment, the passband of $h_i$ is wide enough such that $h_i(n) * y_i(n) = y_i(n)$. In another embodiment, choose such that $\{c, \tilde{c}\}$ such that $W(x) = W(v)$. To do so, examine the properties of $W(v)$:

$$W_i(v)(n) = h_i(n) * z_i(n)$$

$$z(n) \equiv Mv(n) = Mc(n)u(n) = \psi(n)\phi^T(n)y(n),$$

where $\psi = Mc$. Then our condition can be rewritten as:

$$y_i(n) \approx h_i(n) * (\psi_i(n)\phi^T(n)y(n)). \tag{AA}$$

Let $\phi_i(n) = k_i \psi_i(n)$ for some constant $k_i$. Then (AA) can be viewed as a classical amplitude modulation problem, where multiple signals of interest are transmitted over the same media by modulating first via the multiplication in the time domain. Thus the carrier frequencies $\psi_i = \phi_i$ must be chosen such that:

$h_i(n) * (\psi_i(n)\phi_j(n)) = 1$ when i=j;

$h_i(n) * (\psi_i(n)\phi_j(n)) = 0$ when i≠j;

$u = \phi_1 y_1 + \phi_2 y_2 + \phi_3 y_3$ is alias free;

$u \geq 0$.

In one example, when i≠j we would like the frequency contents of $\psi_i(n)\phi_j(n)$ to be sufficiently high such that $\psi_i(n)\phi_j(n)y_j(n)$ is outside the passband for $h_i(n)$. Since the bandwidth of $y_1(n)$ is the largest, we set $\phi_1(n) = k_1\psi_1(n) = 1$, $\forall n$. One possible strategy is to modulate $y_2$ and $y_3$ via the multiplication with $\phi_2$ and $\phi_3$ such that the 2D Fourier transform of the frequency-modulated chrominance signals occupy the regions in the frequency domain not used by $y_1$.

In some embodiments, an example process includes designing $\phi$ and $\psi$ in the frequency domain, recovering their inverse Fourier transforms to find the equivalent representation in the spatial domain, and computing $\tilde{c} = M^T\phi$ and $c = M^{-1}\psi$. In one example, $\{\phi_2, \phi_3\}$ have two-dimensional Fourier transform of the following from:

$$\mathcal{F}(\phi_2)(\omega) = \sum_i s_i \delta(\omega + \tau_i) + \bar{s}_i \delta(\omega - \tau_i) \tag{AB}$$

$$\mathcal{F}(\phi_3)(\omega) = \sum_i t_i \delta(\omega + \tau_i) + \bar{t}_i \delta(\omega - \tau_i)$$

where $\tau_i \in \mathbb{R}^2$, $\delta(\bullet)$ is the Dirac delta function, and $\bar{s}_i$ denotes complex conjugate of $s_i$. Note that the symmetry properties in (AB) guarantees that the inverse Fourier transform is real. The overall Fourier transform of the stimuli is a sum of luminance and frequency-modulated chrominances:

$$\mathcal{F}(u) = \mathcal{F}(\phi^T, y)$$

$$= \mathcal{F}(y_1)(\omega) + \sum_i (s_i \mathcal{F}(y_2) + t_i \mathcal{F}(y_3))(\omega + \tau_i) +$$

$$\sum_i (\bar{s}_i \mathcal{F}(y_2) + \bar{t}_i \mathcal{F}(y_3))(\omega - \tau_i).$$

Note that the design parameters of the color filter consist of carrier frequencies $\{\tau_i\}$ and their weights $\{s_i, t_i\}$. In one example, an optimal CFA pattern achieves partitioning of $y_1(n), y_2(n), y_3(n)$ in the frequency domain representation of the stimuli. By choosing a carrier $\tau_i$ sufficiently far from the baseband (i.e., high-frequency), the chances of $\phi_2 y_2$ and $\phi_3 y_3$ overlapping with $\phi_1 y_1$ in the frequency domain is minimized while $\psi_1 \phi_2, \psi_1 \phi_3, \psi_2 \phi_1$, and $\psi_3 \phi_1$ fall outside of the passband for $h_1, h_1, h_2$, and $h_3$, respectively. As a result, the effective spatial resolution of image display is increased because the size of the areas in $\mathcal{F}(y_1)$ that do not overlap with the modulated chrominance signals are far larger than that of the existing CFA patterns. Furthermore, according to another aspect, a CFA pattern with the carrier frequencies fixed away from DC is consequently less sensitive to the directionality of the image features.

The requirement that u be non-negative can be met by setting $\{s_i, t_i\}$ relatively small compared to the DC value (compensated for by $k_2$ and $k_3$). Furthermore, the choice of carrier frequencies may be restricted to rational multiples of $\pi$ so that the inverse Fourier transform of (AB) is periodic. For example, $\tau_i$ lying on multiples of $$\frac{\pi}{2}$$

induces a 4×4 CFA pattern. One unique aspect of the proposed CFA scheme is that the resulting pattern does not consist of pure red, green, and blue samples, but rather of a mixture at every subpixel position.

A design of CFA pattern satisfying the proposed design criteria set forth above is not unique. Thus further evaluation may be beneficial. Consider an example of a CFA pattern induced with the following parameters:

$$M = \begin{bmatrix} 0.5774 & 0.5774 & 0.5774 \\ -0.5774 & 0.7887 & -0.2113 \\ -0.5774 & -0.2113 & 0.7887 \end{bmatrix}$$

$$\mathcal{F}(\phi_2)(\omega) = \frac{3+3i}{8}\delta\left(\omega + \left(\frac{\pi}{2}, \pi\right)^T\right) + \frac{3-3i}{8}\delta\left(\omega - \left(\frac{\pi}{2}, \pi\right)^T\right)$$

$$\mathcal{F}(\phi_3)(\omega) = \frac{3-3i}{8}\delta\left(\omega + \left(\frac{\pi}{2}, \pi\right)^T\right) + \frac{3+3i}{8}\delta\left(\omega - \left(\frac{\pi}{2}, \pi\right)^T\right).$$

Figure 31:
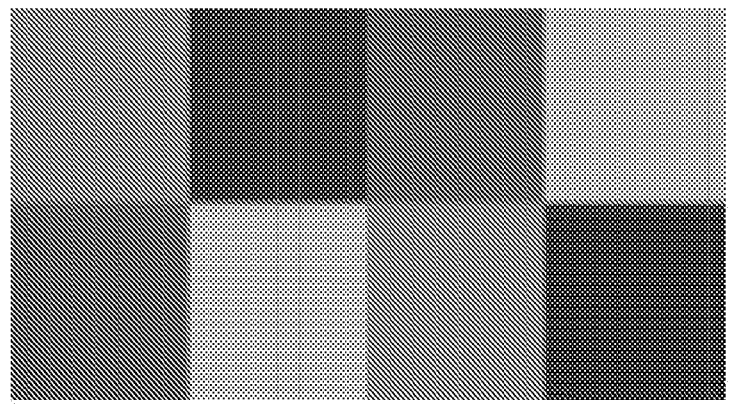
FIG. 31 illustrates an example of an induced CFA pattern.

The proposed example of a pattern implies a periodic structure of size 2×4, and though as it appears on FIG. 31 that it consists of the usual red, green, and blue in addition to light blue, every color in this figure is actually a mixture of all primaries (it is easy to verify that arranging red, green, blue plus a fourth color in similar 2×4 lattice pattern would result in a sub-optimal performance). FIG. 31 illustrates an example of an induced CFA pattern.

FIG. 30(a)-(d) shows examples of stimuli and display of a widely available color image, "Barbara," using the above pattern. As apparent from the figure, the vertical stripe CFA is subject to severe aliasing in high-frequency regions such as the scarf and the pants of "Barbara" image (shown in FIG. 30(a)). Although the diagonal stripe CFA is a clear improvement over the vertical, it is unable to suppress the aliasing completely in the textured regions (FIG. 30(b)). The proposed CFA, however, is able to resolve the high-frequency content of the image (FIG. 30(c)). In particular, the textures on the scarf and the pants, which are oriented in many directions, are recognizable without major artifacts. The improvements in FIG. 30 can be explained via the Fourier transform of the stimuli u in FIG. 29(f). The distance between DC and the frequency-modulated chrominance signals in the two-dimensional Fourier domain are far greater, and aliasing is much less likely to occur.

Figure 30A:
FIGS. 30(a)-(d) show examples of stimuli and display of a widely available color image.
Figure 30B:
Figure 30C:
Figure 30D:

Additionally according to another aspect, the stimuli u(n) (FIG. 30(d)) can be regarded as a grayscale representation of the color image x(n) with additional information about its chromaticity content embedded inside low-visibility, high-frequency textures. Such mapping gives rise to a reversible coding of color images in black-and-white prints, a technique proven useful in scanning and printing applications.

According to another aspect, the display device CFA is evaluated in terms of throughput of stimuli as limited by aliasing. It is shown the spectral replicas of the chrominance signals induced by existing CFA patterns are centered around frequencies that are not sufficiently far from the DC, consequently overlapping with the luminance signal spectrum and reducing the throughput of the stimuli. By reinterpreting the interactions between the stimuli, display CFA, and CSF in terms of amplitude modulation, an alternative CFA coding scheme that modulates the chrominance signals to a higher frequency relative to common schemes is provided in some embodiments.

Other Input and Output Devices

Although the above examples were described in terms of a color filter array, it should be understood that the present invention is not so limited. Rather embodiments of the present invention may include any input device, including any input device configured to measure one or more magnitudes of electromagnetic radiation. Some embodiments may include any electromagnetic spectral filter rather than being limited to the color filters described above. In some embodiments in which electromagnetic radiation outside of the visible spectrum is included in a spectral filter and measured by a electromagnetic radiation sensitive element, an arrangement of filters may be referred to as a multi-spectral filter array rather than a color filter array.

Furthermore, embodiments of the present invention are not limited to input devices. Some embodiments of the present invention may include arrangements of electromagnetic output elements, such as LEDs, or LCD pixels of a computer monitor that are configured to output one wavelength or a band of wavelengths of electromagnetic radiation.

In typical display output applications, images are typically realized via a spatial subsampling procedure implemented as a high-resolution color display pattern, a physical construction whereby each pixel location displays only a single color (e.g., a single wavelength or a single set of wavelengths).

In one aspect of the invention, by considering the spectral wavelength sampling requirements as well as the spatial sampling requirements associated with the image display process, we may create a new paradigm for designing display schemes. Specifically, in some embodiments, the pattern may be used as means to modulate output image signals in the frequency domain, thereby positioning at least some aliased components outside the passbands of a respective contrast sensitivity function, chrominance and/or luminance, of the human eye.

One example method of arranging electromagnetic output elements of predetermined wavelengths for the purpose of displaying color images is described below. Previously, we considered the triple $(c_r(n), c_g(n), c_b(n))$ to represent color filter array (CFA) values. In some embodiments of an output device, consider $(c_r(n), c_g(n), c_b(n))$ to represent color components of display elements instead (e.g. color phosphors, LED's, and the like). In one embodiment, a design choice of a linear combination of the display elements $0 \leq c_r(n), c_g(n), c_b(n) \leq 1$ may yield a pattern in the frequency domain, such that no spectral copy appears on the horizontal or vertical axes, thereby reducing or eliminating aliasing effects in displayed color images. In other embodiments, as described above with respect to CFA patterns, output element patterns may be arranged in any fashion to position spectral copies at desired positions in a frequency domain representation.

A specific example of this display configuration, designed in the Fourier transform domain, is given in the table of FIG. 16. It should be understood that the table is given as an example only. In the embodiment illustrated by the table, two dimensional Fourier transforms are denoted by $\mathcal{F}(\bullet)$, $\delta(\bullet)$ is a Dirac delta function. In some embodiments, as in the example of the table in FIG. 16, $c_g(n)$ may be constant for all locations.

It is also recognized that humans' eyes observe in luminance and chrominance components, where the luminance contrast sensitivity function (CSF) is nearly all-pass, while the chrominance CSF has much narrower bandwidth. The spatio-spectral sampling design scheme for display devices proposed above allows some embodiments to exploit these biomimetic properties by modulating the difference images outside of the passbands of each respective CSF.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A computer implemented method for image processing, the method comprising the acts of: transforming, by a processor, image data into at least one baseband signal and at least one difference signal in a frequency domain representation, wherein the at least one baseband signal comprises a luminance component of a captured image; minimizing the overlap between the at least one baseband signal and the at least one difference signal in the frequency domain representation; minimizing deviation of the baseband luminance signal, wherein the act of minimizing deviation of the baseband luminance signal further comprises establishing a color mixture to account for an average illuminant color change; establishing physical characteristics of a color filter array and respective color mixture based at least in part on a resulting position of a representation of the difference signal and a resulting position of a representation of the baseband signal in the frequency domain; and constraining the range of values associated with the physical characteristics of the color filter array to physically realizable values.

2. The method of claim 1, further comprising an act of establishing physical characteristics of a color filter array based at least in part on a resulting position of a representation of the difference signal and a resulting position of a representation of the baseband signal in the frequency domain.

3. The method of claim 2, wherein the physical characteristics include a color of at least one color filter comprising a color filter array.

4. The method of claim 2, wherein the physical characteristics include includes at least one of spatial positioning of at least one filter in a color filter array and a geometric arrangement of at least one filter in a color filter array.

5. The method of claim 2, wherein the physical characteristics are based, at least in part, on an average illuminant color.

6. The method of claim 1, wherein the act of minimizing the overlap between the at least one baseband signal and the at least one difference signal in the frequency domain further comprises determining a desired position for at least one spectral representation in the frequency domain for the at least one difference signal.

7. The method of claim 6, further comprising an act of modulating a value for the at least one difference signal to attain the desired position.

8. The method of claim 7, further comprising an act of modulating, equally, values for a plurality of difference signals to attain a plurality of desired positions.

9. The method of claim 7, wherein the act of modulating a value for the at least one difference image channel to attain the desired position further comprises applying a multiplication factor to the value of the at least one difference signal.

10. The method of claim 9, wherein the multiplication factor is based, at least in part on a DC component of at least one color component.

11. The method of claim 1, wherein the act of minimizing the overlap between the at least one baseband signal and the at least one difference signal in the frequency domain further comprises restricting a carrier frequency of at least one difference signal in a frequency domain representation.

12. The method of claim 1, further comprising acts of:
establishing a range of values associated with image data transformations; and
generating filter array characteristics that conform to the range of values associated with the image data transformations.

13. The method of claim 1, further comprising acts of:
establishing a range of values associated with a physical characteristic of a color filter array;
determining an effect on the frequency domain representation of an image by varying the range of values associated with a physical characteristic of a color filter array; and
creating maximal and minimal values for at least one range of values associated with physical characteristic of a color filter array.

14. The method of claim 13, wherein creating maximal and minimal values for at least one range of values associated with physical characteristic of a color filter array further comprising performing inverse transformations of the frequency domain representation.

15. The method of claim 1, further comprising an act of reconstructing a captured image employing a completely linear reconstruction process.

* * * * *